United States Patent
Aust et al.

(10) Patent No.: US 9,554,330 B2
(45) Date of Patent: Jan. 24, 2017

(54) WIRELESS COMMUNICATION DEVICE

(71) Applicants: Stefan Aust, Tokyo (JP); Toshiyasu Tanaka, Tokyo (JP); Tetsuya Ito, Tokyo (JP)

(72) Inventors: Stefan Aust, Tokyo (JP); Toshiyasu Tanaka, Tokyo (JP); Tetsuya Ito, Tokyo (JP)

(73) Assignee: NEC Communication Systems, Ltd., Tokyo (JP)

( * ) Notice: Subject to any disclaimer, the term of this patent is extended or adjusted under 35 U.S.C. 154(b) by 227 days.

(21) Appl. No.: 14/356,897

(22) PCT Filed: Nov. 16, 2012

(86) PCT No.: PCT/JP2012/007371
§ 371 (c)(1),
(2) Date: May 8, 2014

(87) PCT Pub. No.: WO2013/076945
PCT Pub. Date: May 30, 2013

(65) Prior Publication Data
US 2014/0313963 A1  Oct. 23, 2014

(30) Foreign Application Priority Data

Nov. 25, 2011 (JP) .................................. 2011-257263
Dec. 7, 2011 (JP) .................................. 2011-267603

(51) Int. Cl.
*H04W 52/02* (2009.01)

(52) U.S. Cl.
CPC ..... *H04W 52/0229* (2013.01); *H04W 52/0216* (2013.01); *H04W 52/0235* (2013.01); *H04W 52/0274* (2013.01); *Y02B 60/50* (2013.01)

(58) Field of Classification Search
USPC ........................................................ 370/311
See application file for complete search history.

(56) References Cited

U.S. PATENT DOCUMENTS

2005/0215227 A1* 9/2005 Vu ..................... H04W 52/0277
455/343.2
2007/0286111 A1* 12/2007 Corson ............... H04W 40/244
370/319
(Continued)

FOREIGN PATENT DOCUMENTS

JP    2009-124461 A    6/2009
JP    2009290804 A    12/2009
(Continued)

OTHER PUBLICATIONS

Japanese Office Action issued by the Japan Patent Office for Japanese Application No. 2011-267603 dated Oct. 6, 2015 (6 pages).

(Continued)

*Primary Examiner* — Omar Ghowrwal
*Assistant Examiner* — Angel Brockman
(74) *Attorney, Agent, or Firm* — Wilmer Cutler Pickering Hale and Dorr LLP

(57) ABSTRACT

A wireless communication device 81 operates in either a ROD mode or a non-ROD mode. The non-ROD mode sets the state of the device to an active state that the device can perform wireless communication compliant with a first communication scheme with a communication destination device 82. The ROD mode: sets the state of the device to either the active state or a sleep state that the device can receive an activation instruction signal compliant with a second communication scheme requiring smaller electric power to receive a signal than the first communication scheme and cannot perform wireless communication compliant with the first communication scheme with the communication destination device; sets the state of the device to the sleep state when a predetermined sleep condition is (Continued)

satisfied; and sets the state of the device to the active state when the device receives the activation instruction signal.

18 Claims, 24 Drawing Sheets

(56) References Cited

U.S. PATENT DOCUMENTS

| | | | | |
|---|---|---|---|---|
| 2010/0056230 A1* | 3/2010 | Chan | ............... | H04W 52/0264 455/574 |
| 2010/0097969 A1* | 4/2010 | De Kimpe | ........ | H04W 52/0216 370/311 |
| 2011/0280170 A1 | 11/2011 | Bowser et al. | | |

FOREIGN PATENT DOCUMENTS

| | | |
|---|---|---|
| JP | 2010130096 A | 6/2010 |
| JP | 2010278763 A | 12/2010 |
| WO | WO-2011001615 A1 | 1/2011 |

OTHER PUBLICATIONS

Kondo, Y. et al., "Radio-On-Demand Wake-up using Wireless LAN Signal," The Institute of Electronics Information and Communication Engineers, IEICE Technical Report, NS2010-185, 7 pages (Mar. 2011).

Yoshimura, K. et al., "Experimental development of power saving AP," The Institute of Electronics Information and Communication Engineers, IEICE Technical Report, CAS2010-112, SIPC2010-128, CS2010-82, 7 pages (Mar. 2011).

International Search Report corresponding to PCT/JP2012/007371dated Dec. 18, 2012 (4 pages).

Shigemi Ishida et al., "A Multi-step Wake-up Scheme for Low-Power-Listening Wireless Communication System," IEICE Technical Report, Apr. 16, 2008, vol. 107, No. 525, pp. 355-360, IN2007-218.

Kaname Fujimoto, et al., "Power Saving Scheme with Low-Utilization Station Aggregation for Radio-On-Demand Networks," Communications, Computers and Signal Processing (PacRim), 2011 IEEE Pacific Rim Conference on Aug. 26, 2011, pp. 625-630.

Japanese Office Action corresponding to Japanese Application No. 2011-257263, dated Aug. 4, 2015, 10 pages.

\* cited by examiner

Fig.3

| WIRELESS TERMINAL IDENTIFICATION INFORMATION | ROD INFORMATION |
|---|---|
| ST#1 | ROD ALLOWED |
| ST#2 | ROD ALLOWED |
| ST#3 | NO ROD |
| ⋮ | ⋮ |

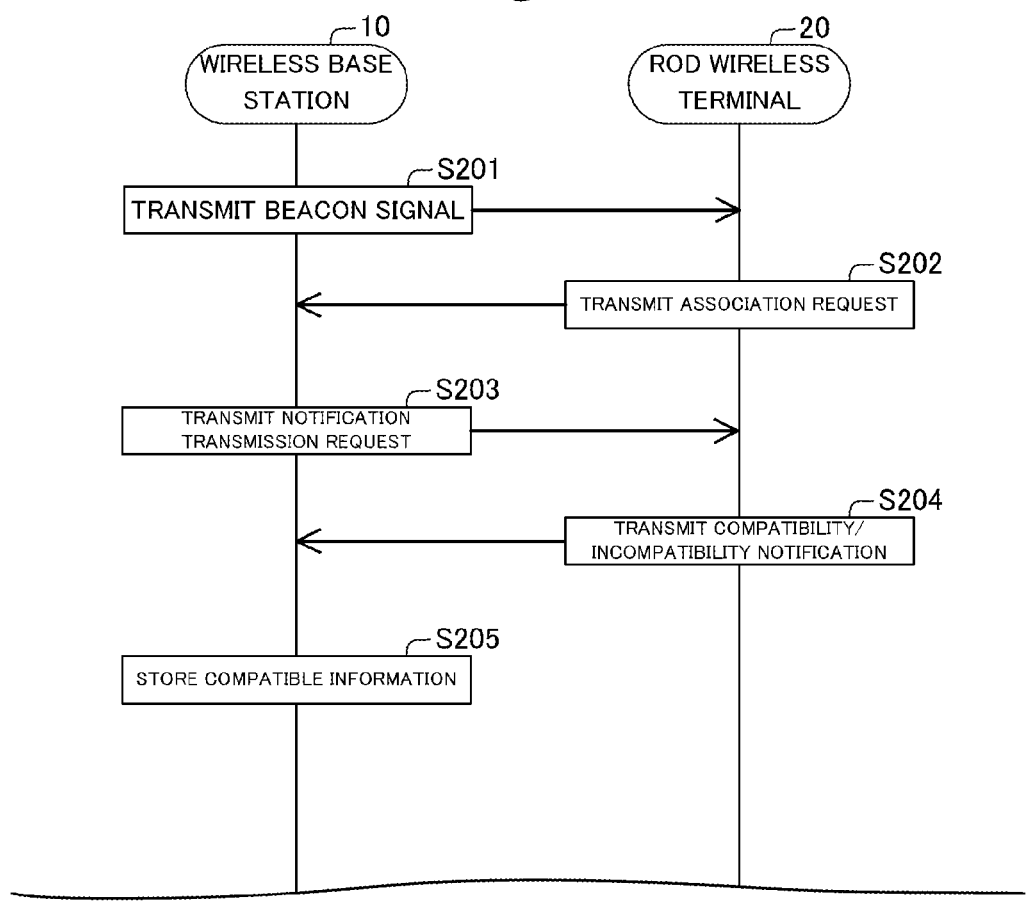

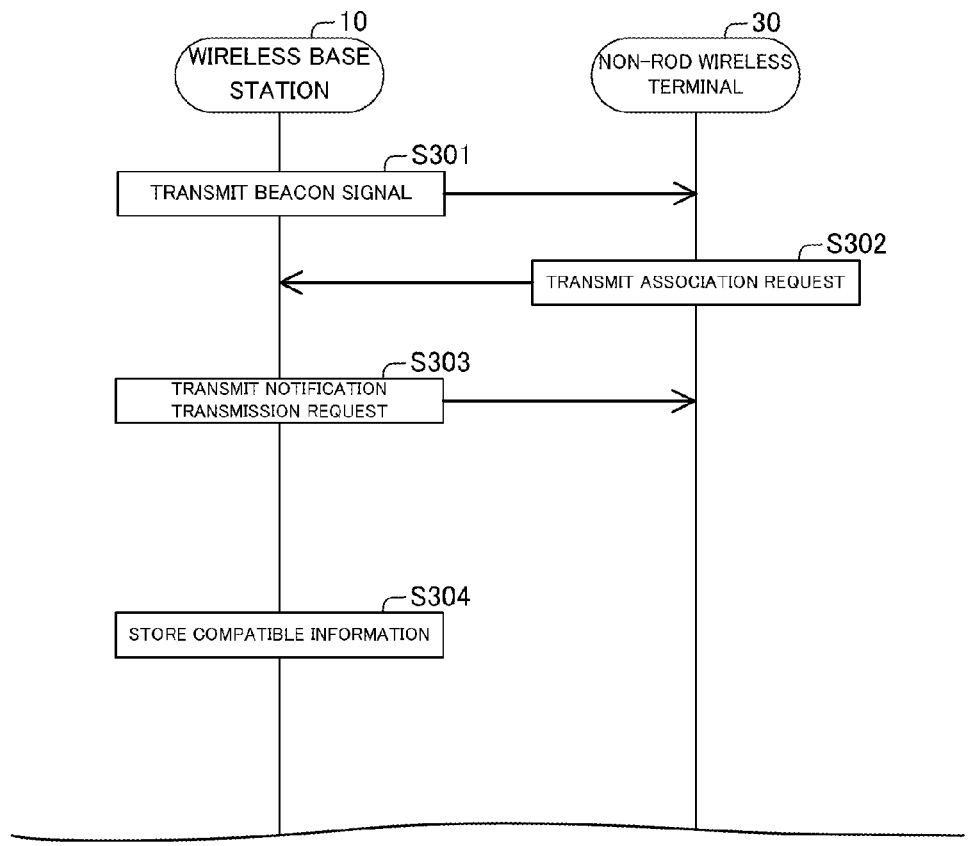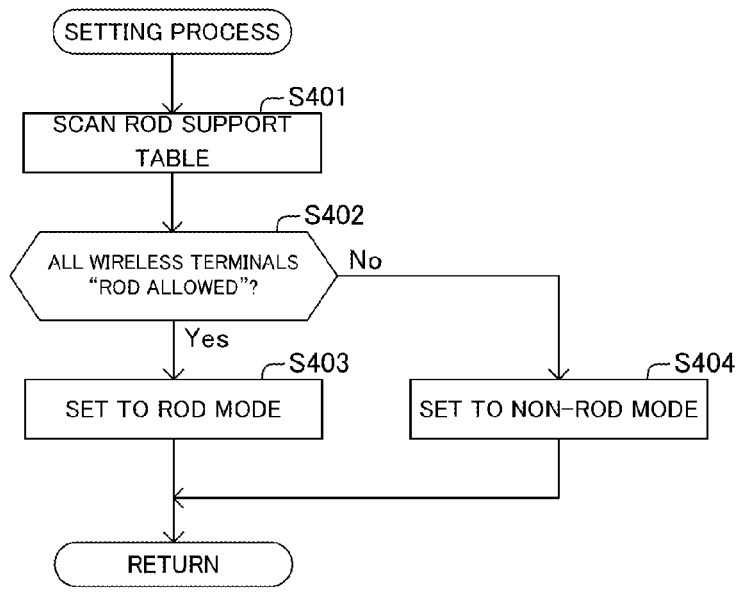

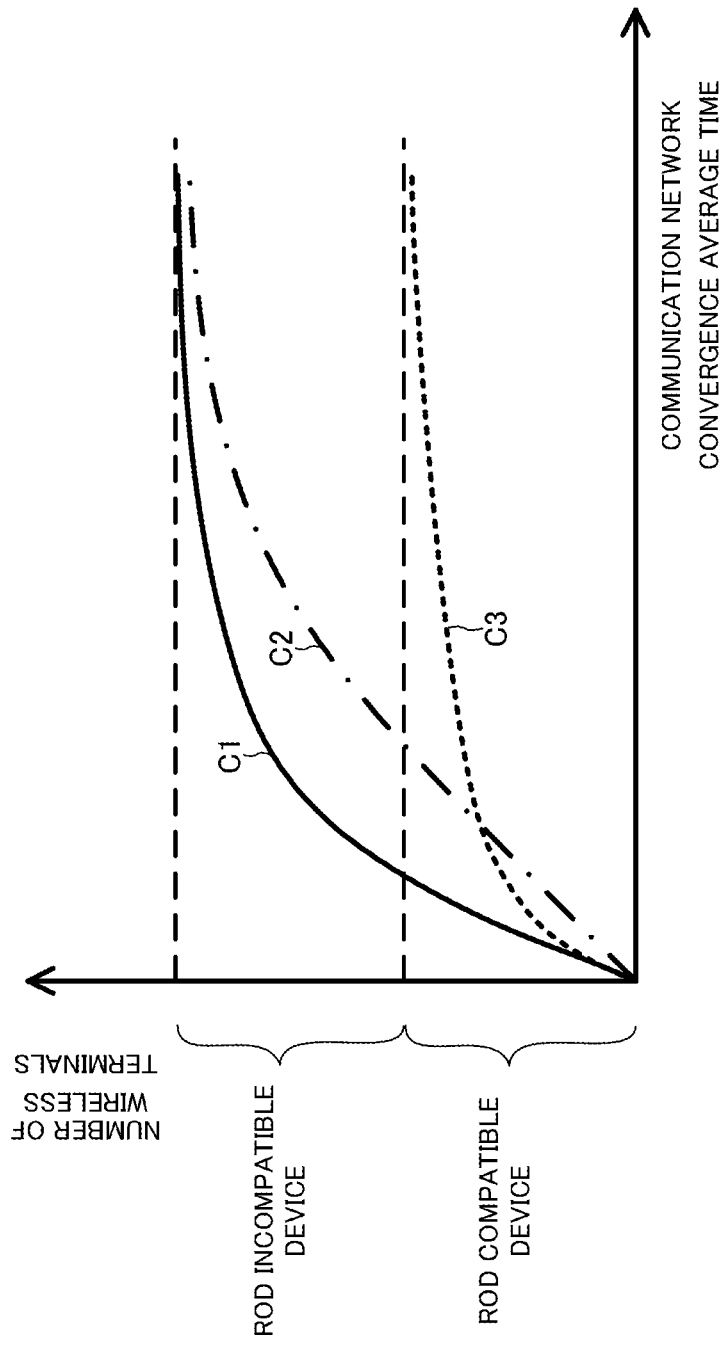

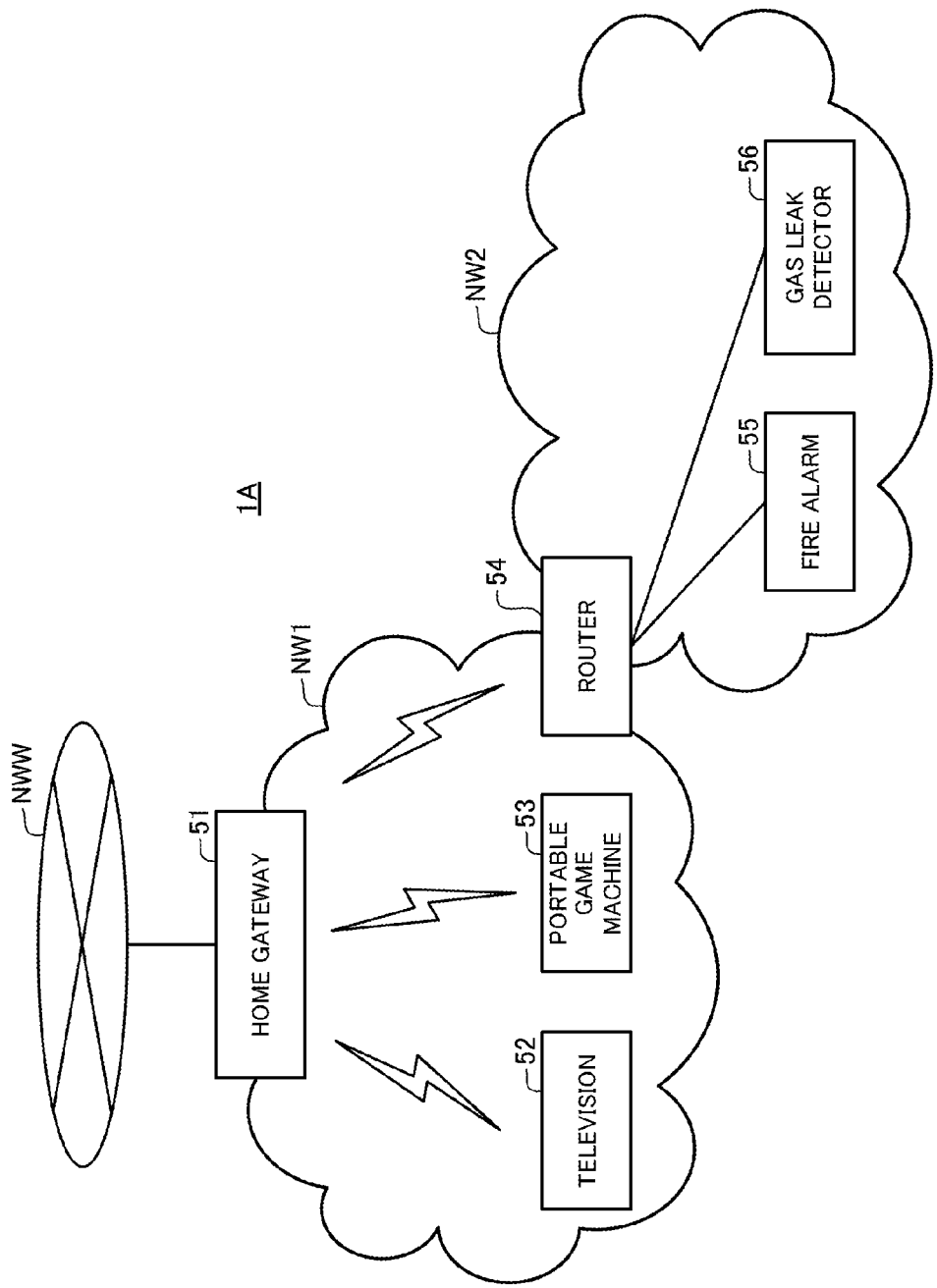

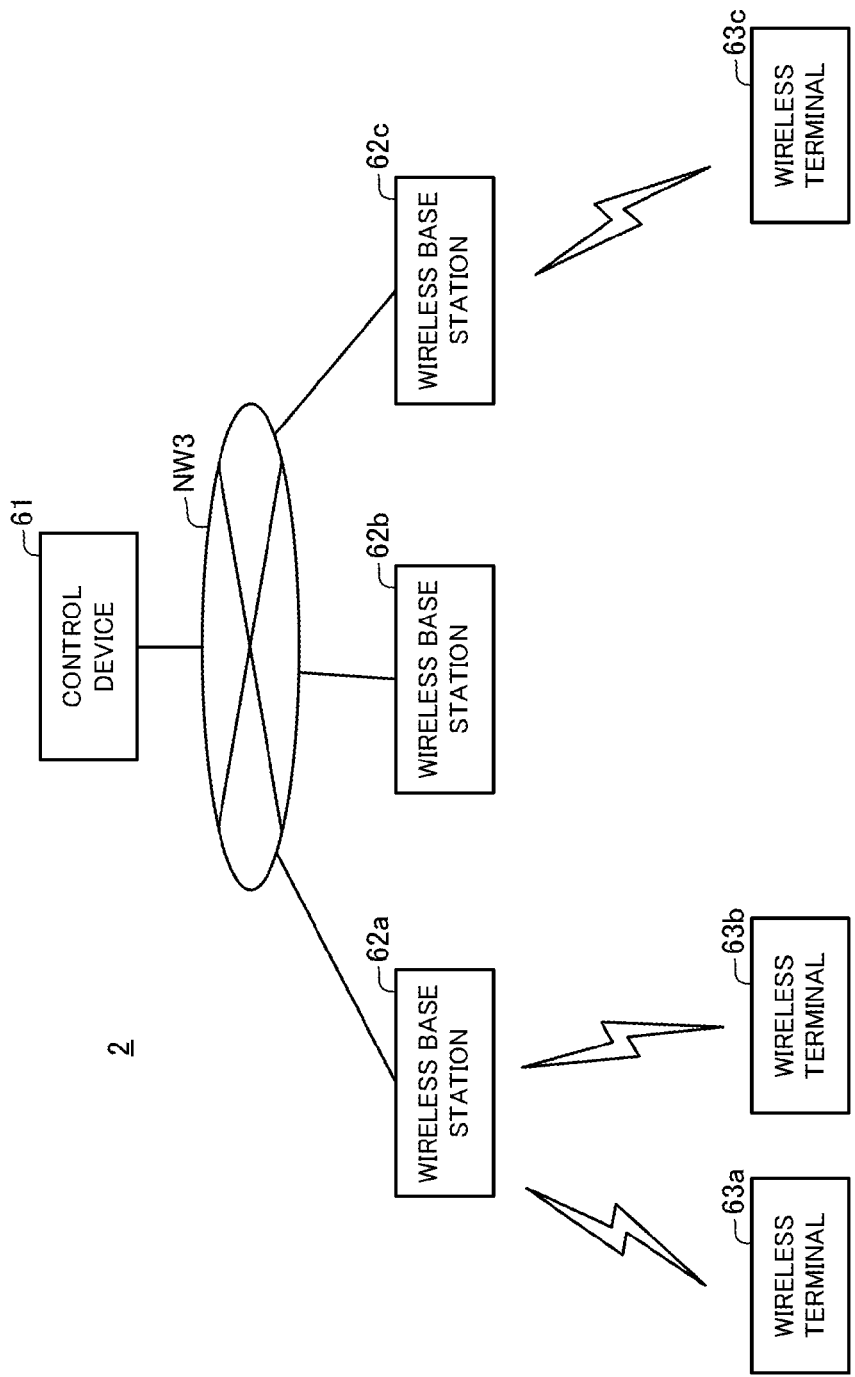

Fig.18

| WIRELESS TERMINAL IDENTIFICATION INFORMATION | ROD INFORMATION | REQUIREMENT LEVEL INFORMATION | COMMUNICATION AMOUNT INFORMATION |
|---|---|---|---|
| ST#1 | ROD ALLOWED | 1 | NONE |
| ST#2 | ROD ALLOWED | 2 | LITTLE |
| ST#3 | NO ROD |  | NONE |
| ⋮ | ⋮ | ⋮ | ⋮ |

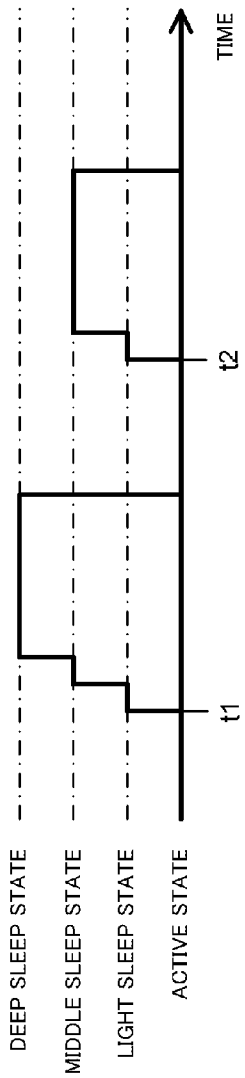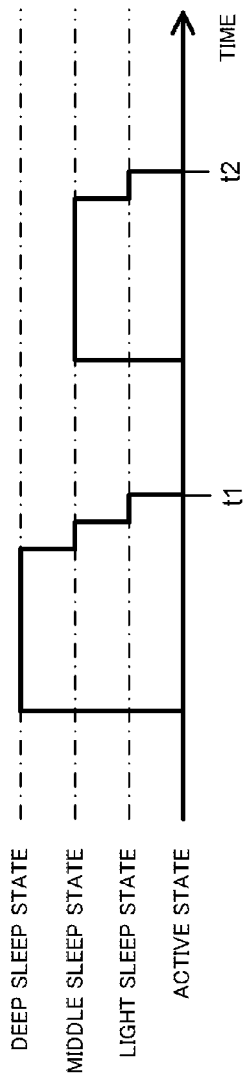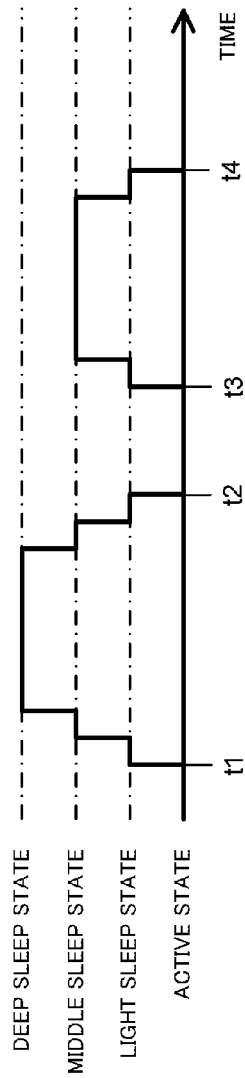

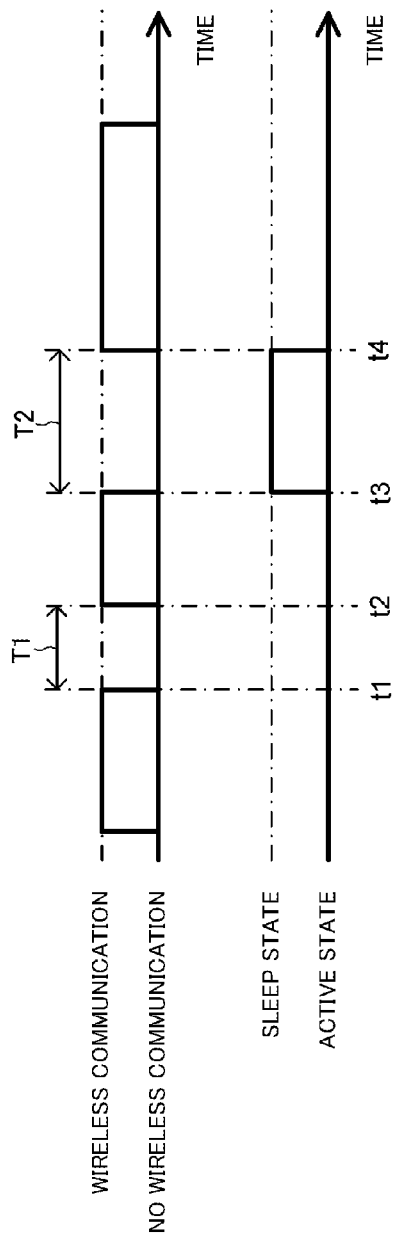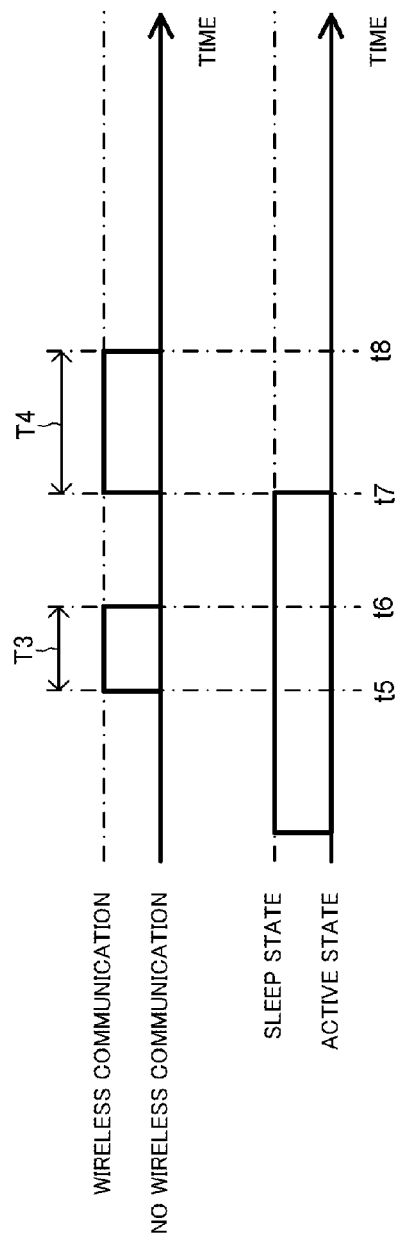

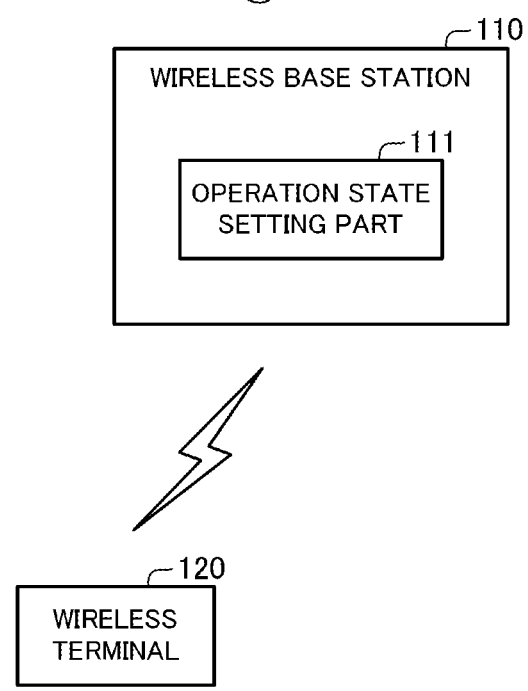

WIRELESS COMMUNICATION DEVICE

CROSS-REFERENCE TO RELATED APPLICATIONS

This application is a national stage application of International Application No. PCT/JP2012/007371 entitled "Wireless Communication Device," filed on Nov. 16, 2012, which claims the benefit of the priority of Japanese Patent Application No. 2011-257263, filed on Nov. 25, 2011, and Japanese Patent Application No. 2011-267603, filed on Dec. 7, 2011, the disclosures of each of which are hereby incorporated by reference in their entirety.

TECHNICAL FIELD

The present invention relates to a wireless communication device configured to be capable of performing wireless communication with at least one communication destination device.

BACKGROUND ART

A wireless communication device configured to be capable of performing wireless communication with at least one communication destination device is known. As one of this type of wireless communication devices, a wireless communication device described in Patent Document 1 sets its state to an active state in which the wireless communication device can perform wireless communication with a communication destination device in accordance with a preset first communication scheme. The communication destination device performs wireless communication according to the first communication scheme with the wireless communication device.

Patent Document 1: Japanese Unexamined Patent Application Publication No. 2009-124461

The abovementioned wireless communication device keeps setting its state to the active state even when no communication destination device exists in a region where the wireless communication device can perform wireless communication. Therefore, there is a problem that the amount of electric power consumed by the wireless communication device becomes unnecessarily large.

Thus, it is considered to be favorable to configure a wireless communication device so that the wireless communication device sets its state to a sleep state when a predetermined sleep condition is satisfied. Herein, the sleep state is a state in which the wireless communication device can receive an activation instruction signal according to a second communication scheme requiring smaller electric power for reception of a signal than the first communication scheme and cannot perform wireless communication according to the first communication scheme with the communication destination device.

In general, a communication scheme in which a transmission rate is smaller needs smaller electric power for reception of a signal according to the communication scheme. Herein, the transmission rate is the amount of data transmitted per unit time. Therefore, the second communication scheme is a communication scheme in which the transmission rate is smaller than that in the first communication scheme.

In this case, the communication destination device transmits an activation instruction signal to the wireless communication device. Upon receiving the activation instruction signal, the wireless communication device sets its state to the active state. After that, the communication destination device performs communication with the wireless communication device. According to this, it is possible to decrease the amount of electric power consumed by the wireless communication device.

However, in a case where the communication destination device is a device incapable of transmitting an activation instruction signal, there is a fear that this communication destination device cannot perform communication with the wireless communication device. That is, according to the wireless communication device configured as described above, there is a fear that the amount of electric power consumed by the wireless communication device cannot be decreased and wireless communication with the communication destination device cannot be securely performed.

Therefore, an object of the present invention is to provide a wireless communication device that can solve the abovementioned problem, "in a case where the amount of electric power consumed by the wireless communication device is decreased, there is a possibility that wireless communication with the communication destination device cannot be securely performed."

On the other hand, it is desirable to keep the state of the wireless communication device (wireless base station) to the active state in order to securely perform wireless communication with the communication destination device incapable of transmitting an activation instruction signal, but there is also a case where it is favorable that decreasing the amount of electric power consumed by the wireless base station takes priority over performing wireless communication with the communication destination device incapable of transmitting an activation instruction signal. However, according to the wireless communication device configured as described above, there is a problem that it is impossible to properly set the state of the wireless communication device depending on the situation.

Therefore, another object of the present invention is to provide a wireless communication device that can solve the abovementioned problem, "there is a possibility that it is impossible to properly set the state of the wireless communication device depending on the situation."

SUMMARY

In order to achieve the objects, a wireless communication device as an aspect of the present invention is a device configured to be capable of performing wireless communication with at least one communication destination device.

Moreover, this wireless communication device is configured to operate in an operation mode, either a ROD (Radio on Demand) mode or a non-ROD mode.

The non-ROD mode is configured to set a state of the wireless communication device to an active state in which the wireless communication device can perform wireless communication compliant with a predetermined first communication scheme with the communication destination device.

The ROD mode is configured to: set the state of the wireless communication device to either the active state or a sleep state in which the wireless communication device can receive an activation instruction signal compliant with a second communication scheme requiring smaller electric power to receive a signal than the first communication scheme and cannot perform wireless communication compliant with the first communication scheme with the communication destination device; in a case where the state of the wireless communication device is the active state and a predetermined sleep condition is satisfied, set the state of the wireless communication device to the sleep state; and in a case where the state of the wireless communication device is the sleep state and the wireless communication device receives the activation instruction signal, set the state of the wireless communication device to the active state.

Further, a wireless communication device control method as another aspect of the present invention is applied to a wireless communication device configured to be capable of performing wireless communication with at least one communication destination device, and includes causing the wireless communication device to operate in an operation mode, either a ROD (Radio on Demand) mode or a non-ROD mode.

The non-ROD mode is configured to set a state of the wireless communication device to an active state in which the wireless communication device can perform wireless communication compliant with a predetermined first communication scheme with the communication destination device.

The ROD mode is configured to: set the state of the wireless communication device to either the active state or a sleep state in which the wireless communication device can receive an activation instruction signal compliant with a second communication scheme requiring smaller electric power to receive a signal than the first communication scheme and cannot perform wireless communication compliant with the first communication scheme with the communication destination device; in a case where the state of the wireless communication device is the active state and a predetermined sleep condition is satisfied, set the state of the wireless communication device to the sleep state; and in a case where the state of the wireless communication device is the sleep state and the wireless communication device receives the activation instruction signal, set the state of the wireless communication device to the active state.

Further, a wireless communication device control program as another aspect of the present invention is a program executed by a wireless communication device configured to be capable of performing wireless communication with at least one communication destination device.

Moreover, this wireless communication device control program includes instructions for causing the wireless communication device to perform operations including causing the wireless communication device to operate in an operation mode, either a ROD (Radio on Demand) mode or a non-ROD mode.

The non-ROD mode is configured to set a state of the wireless communication device to an active state in which the wireless communication device can perform wireless communication compliant with a predetermined first communication scheme with the communication destination device.

The ROD mode is configured to: set the state of the wireless communication device to either the active state or a sleep state in which the wireless communication device can receive an activation instruction signal compliant with a second communication scheme requiring smaller electric power to receive a signal than the first communication scheme and cannot perform wireless communication compliant with the first communication scheme with the communication destination device; in a case where the state of the wireless communication device is the active state and a predetermined sleep condition is satisfied, set the state of the wireless communication device to the sleep state; and in a case where the state of the wireless communication device is the sleep state and the wireless communication device receives the activation instruction signal, set the state of the wireless communication device to the active state.

Further, a wireless communication system as another aspect of the present invention is a system including a plurality of wireless communication devices each configured to be capable of performing wireless communication with at least one communication destination device.

Moreover, each of the wireless communication devices is a ROD (Radio on Demand) device or a non-ROD device.

The ROD device is configured to operate in an operation mode, either a ROD mode or a non-ROD mode.

The non-ROD device is configured to operate in the non-ROD mode.

The non-ROD mode is configured to set a state of the wireless communication device to an active state in which the wireless communication device can perform wireless communication compliant with a predetermined first communication scheme with the communication destination device.

The ROD mode is configured to: set the state of the wireless communication device to either the active state or a sleep state in which the wireless communication device can receive an activation instruction signal compliant with a second communication scheme requiring smaller electric power to receive a signal than the first communication scheme and cannot perform wireless communication compliant with the first communication scheme with the communication destination device; in a case where the state of the wireless communication device is the active state and a predetermined sleep condition is satisfied, set the state of the wireless communication device to the sleep state; and in a case where the state of the wireless communication device is the sleep state and the wireless communication device receives the activation instruction signal, set the state of the wireless communication device to the active state.

Further, a wireless communication system control method as another aspect of the present invention is applied to a wireless communication system including a plurality of wireless communication devices each configured to be capable of performing wireless communication with at least one communication destination device.

Each of the wireless communication devices is a ROD (Radio on Demand) device or a non-ROD device.

The wireless communication system control method includes:
  causing the ROD device to operate in an operation mode, either a ROD mode or a non-ROD mode; and
  causing the non-ROD device to operate in the non-ROD mode.

The non-ROD mode is configured to set a state of the wireless communication device to an active state in which the wireless communication device can perform wireless communication compliant with a predetermined first communication scheme with the communication destination device.

The ROD mode is configured to: set the state of the wireless communication device to either the active state or a sleep state in which the wireless communication device can receive an activation instruction signal compliant with a second communication scheme requiring smaller electric power to receive a signal than the first communication scheme and cannot perform wireless communication compliant with the first communication scheme with the communication destination device; in a case where the state of the wireless communication device is the active state and a predetermined sleep condition is satisfied, set the state of the wireless communication device to the sleep state; and in a case where the state of the wireless communication device is the sleep state and the wireless communication device receives the activation instruction signal, set the state of the wireless communication device to the active state.

Further, a control device as another aspect of the present invention is a device configured to be capable of performing communication with each of a plurality of wireless communication devices each configured to be capable of performing wireless communication with at least one communication destination device.

Moreover, each of the wireless communication devices is a ROD (Radio on Demand) device or a non-ROD device.

The ROD device is configured to operate in an operation mode, either a ROD mode or a non-ROD mode.

The non-ROD device is configured to operate in the non-ROD mode.

The non-ROD mode is configured to set a state of the wireless communication device to an active state in which the wireless communication device can perform wireless communication compliant with a predetermined first communication scheme with the communication destination device.

The ROD mode is configured to: set the state of the wireless communication device to either the active state or a sleep state in which the wireless communication device can receive an activation instruction signal compliant with a second communication scheme requiring smaller electric power to receive a signal than the first communication scheme and cannot perform wireless communication compliant with the first communication scheme with the communication destination device; in a case where the state of the wireless communication device is the active state and a predetermined sleep condition is satisfied, set the state of the wireless communication device to the sleep state; and in a case where the state of the wireless communication device is the sleep state and the wireless communication device receives the activation instruction signal, set the state of the wireless communication device to the active state.

The control device includes an operation mode setting means for setting the operation mode of each of the ROD devices among the wireless communication devices.

Further, a control device control method as another aspect of the present invention is applied to a control device configured to be capable of performing communication with each of a plurality of wireless communication devices each configured to be capable of performing wireless communication with at least one communication destination device.

Each of the wireless communication devices is a ROD (Radio on Demand) device or a non-ROD device.

The ROD device is configured to operate in an operation mode, either a ROD mode or a non-ROD mode.

The non-ROD device is configured to operate in the non-ROD mode.

The non-ROD mode is configured to set a state of the wireless communication device to an active state in which the wireless communication device can perform wireless communication compliant with a predetermined first communication scheme with the communication destination device.

The ROD mode is configured to: set the state of the wireless communication device to either the active state or a sleep state in which the wireless communication device can receive an activation instruction signal compliant with a second communication scheme requiring smaller electric power to receive a signal than the first communication scheme and cannot perform wireless communication compliant with the first communication scheme with the communication destination device; in a case where the state of the wireless communication device is the active state and a predetermined sleep condition is satisfied, set the state of the wireless communication device to the sleep state; and in a case where the state of the wireless communication device is the sleep state and the wireless communication device receives the activation instruction signal, set the state of the wireless communication device to the active state.

The control device control method is a method for causing the control device to set the operation mode of each of the ROD devices among the wireless communication devices.

Further, a control device control program as another aspect of the present invention is a program executed by a control device configured to be capable of performing communication with each of a plurality of wireless communication devices each configured to be capable of performing wireless communication with at least one communication destination device.

Moreover, each of the wireless communication devices is a ROD (Radio on Demand) device or a non-ROD device.

The ROD device is configured to operate in an operation mode, either a ROD mode or a non-ROD mode.

The non-ROD device is configured to operate in the non-ROD mode.

The non-ROD mode is configured to set a state of the wireless communication device to an active state in which the wireless communication device can perform wireless communication compliant with a predetermined first communication scheme with the communication destination device.

The ROD mode is configured to: set the state of the wireless communication device to either the active state or a sleep state in which the wireless communication device can receive an activation instruction signal compliant with a second communication scheme requiring smaller electric power to receive a signal than the first communication scheme and cannot perform wireless communication compliant with the first communication scheme with the communication destination device; in a case where the state of the wireless communication device is the active state and a predetermined sleep condition is satisfied, set the state of the wireless communication device to the sleep state; and in a case where the state of the wireless communication device is the sleep state and the wireless communication device receives the activation instruction signal, set the state of the wireless communication device to the active state.

The control device control program is a program including instructions for causing the control device to perform operations including setting the operation mode of each of the ROD devices among the wireless communication devices.

Further, a wireless communication system as another aspect of the present invention is a system including a plurality of wireless communication devices configured to be capable of performing wireless communication.

Moreover, each of the wireless communication devices configures a node in a mesh-type communication network.

Each of the wireless communication devices is a ROD (Radio on Demand) device or a non-ROD device.

The ROD device is configured to operate in an operation mode, either a ROD mode or a non-ROD mode.

The non-ROD device is configured to operate in the non-ROD mode.

The non-ROD mode is configured to set a state of the node to an active state in which the node can perform wireless communication compliant with a predetermined first communication scheme with an adjacent node that is adjacent to the node in the communication network.

The ROD mode is configured to: set the state of the node to either the active state or a sleep state in which the node can receive an activation instruction signal compliant with a second communication scheme requiring smaller electric power to receive a signal than the first communication scheme and cannot perform wireless communication compliant with the first communication scheme with the adjacent node; in a case where the state of the node is the active state and a predetermined sleep condition is satisfied, set the state of the node to the sleep state; and in a case where the state of the node is the sleep state and the node receives the activation instruction signal, set the state of the node to the active state.

Further, a wireless communication system control method as another aspect of the present invention is applied to a wireless communication system including a plurality of wireless communication devices configured to be capable of performing wireless communication.

Each of the wireless communication devices configures a node in a mesh-type communication network.

Each of the wireless communication devices is a ROD (Radio on Demand) device or a non-ROD device.

The wireless communication system control method includes:
causing the ROD device to operate in an operation mode, either a ROD mode or a non-ROD mode; and
causing the non-ROD device to operate in the non-ROD mode.

The non-ROD mode is configured to set a state of the node to an active state in which the node can perform wireless communication compliant with a predetermined first communication scheme with an adjacent node that is adjacent to the node in the communication network.

The ROD mode is configured to: set the state of the node to either the active state or a sleep state in which the node can receive an activation instruction signal compliant with a second communication scheme requiring smaller electric power to receive a signal than the first communication scheme and cannot perform wireless communication compliant with the first communication scheme with the adjacent node; in a case where the state of the node is the active state and a predetermined sleep condition is satisfied, set the state of the node to the sleep state; and in a case where the state of the node is the sleep state and the node receives the activation instruction signal, set the state of the node to the active state.

Further, a wireless communication device as another aspect of the present invention is a device configuring a node in a mesh-type communication network and configured to be capable of performing wireless communication with an adjacent node that is adjacent to the node in the communication network.

Moreover, this wireless communication device is configured to operate in an operation mode, either a ROD (Radio on Demand) mode or a non-ROD mode.

The non-ROD mode is configured to set a state of the node to an active state in which the node can perform wireless communication compliant with a predetermined first communication scheme with the adjacent node.

The ROD mode is configured to: set the state of the node to either the active state or a sleep state in which the node can receive an activation instruction signal compliant with a second communication scheme requiring smaller electric power to receive a signal than the first communication scheme and cannot perform wireless communication compliant with the first communication scheme with the adjacent node; in a case where the state of the node is the active state and a predetermined sleep condition is satisfied, set the state of the node to the sleep state; and in a case where the state of the node is the sleep state and the node receives the activation instruction signal, set the state of the node to the active state.

Further, a wireless communication device control method as another aspect of the present invention is applied to a wireless communication device configuring a node in a mesh-type communication network and configured to be capable of performing wireless communication with an adjacent node that is adjacent to the node in the communication network, and includes causing the wireless communication device to operate in an operation mode, either a ROD (Radio on Demand) mode or a non-ROD mode.

The non-ROD mode is configured to set a state of the node to an active state in which the node can perform wireless communication compliant with a predetermined first communication scheme with the adjacent node.

The ROD mode is configured to: set the state of the node to either the active state or a sleep state in which the node can receive an activation instruction signal compliant with a second communication scheme requiring smaller electric power to receive a signal than the first communication scheme and cannot perform wireless communication compliant with the first communication scheme with the adjacent node; in a case where the state of the node is the active state and a predetermined sleep condition is satisfied, set the state of the node to the sleep state; and in a case where the state of the node is the sleep state and the node receives the activation instruction signal, set the state of the node to the active state.

Further, a wireless communication device control program as another aspect of the present invention is a program executed by a wireless communication device configuring a node in a mesh-type communication network and configured to be capable of performing wireless communication with an adjacent node that is adjacent to the node in the communication network.

Moreover, this wireless communication device control program includes instructions for causing the wireless communication device to perform operations including causing the wireless communication device to operate in an operation mode, either a ROD (Radio on Demand) mode or a non-ROD mode.

The non-ROD mode is configured to set a state of the node to an active state in which the node can perform wireless communication compliant with a predetermined first communication scheme with the adjacent node.

The ROD mode is configured to: set the state of the node to either the active state or a sleep state in which the node can receive an activation instruction signal compliant with a second communication scheme requiring smaller electric power to receive a signal than the first communication scheme and cannot perform wireless communication compliant with the first communication scheme with the adjacent node; in a case where the state of the node is the active state and a predetermined sleep condition is satisfied, set the state of the node to the sleep state; and in a case where the state of the node is the sleep state and the node receives the activation instruction signal, set the state of the node to the active state.

Further, a wireless base station (a wireless communication device) as another aspect of the present invention is a wireless base station configured to be capable of performing wireless communication with at least one wireless terminal (communication destination device).

Moreover, this wireless base station includes an operation state setting means for setting a state of the wireless base station to an operation state, either an active state or at least one sleep state.

The active state is a state in which the wireless base station can perform wireless communication compliant with a predetermined first communication scheme with the wireless terminal.

The sleep state is a state in which the wireless base station can receive an activation instruction signal compliant with a second communication scheme requiring smaller electric power to receive a signal than the first communication scheme and cannot perform wireless communication compliant with the first communication scheme with the wireless terminal.

The operation state setting means is configured to select one ROD (Radio on Demand) level from among a plurality of ROD levels and set the state of the wireless base station based on the selected ROD level.

Further, a wireless base station control method as another aspect of the present invention is a method applied to a wireless base station configured to be capable of performing wireless communication with at least one wireless terminal.

Moreover, this wireless base station control method includes setting a state of the wireless base station to an operation state, either an active state or at least one sleep state.

The active state is a state in which the wireless base station can perform wireless communication compliant with a predetermined first communication scheme with the wireless terminal.

The sleep state is a state in which the wireless base station can receive an activation instruction signal compliant with a second communication scheme requiring smaller electric power to receive a signal than the first communication scheme and cannot perform wireless communication compliant with the first communication scheme with the wireless terminal.

The wireless base station control method is configured to select one ROD (Radio on Demand) level from among a plurality of ROD levels and set the state of the wireless base station based on the selected ROD level.

Further, a wireless base station control program as another aspect of the present invention is a program executed by a wireless base station configured to be capable of performing wireless communication with at least one wireless terminal.

Moreover, this wireless base station control program includes instructions for causing the wireless base station to perform operations including setting a state of the wireless base station to an operation state, either an active state or at least one sleep state.

The active state is a state in which the wireless base station can perform wireless communication compliant with a predetermined first communication scheme with the wireless terminal.

The sleep state is a state in which the wireless base station can receive an activation instruction signal compliant with a second communication scheme requiring smaller electric power to receive a signal than the first communication scheme and cannot perform wireless communication compliant with the first communication scheme with the wireless terminal.

The operations include selecting one ROD (Radio on Demand) level from among a plurality of ROD levels and setting the state of the wireless base station based on the selected ROD level.

Further, a wireless communication device as another aspect of the present invention is a wireless communication device configured to be capable of performing wireless communication with at least one communication destination device.

Moreover, this wireless communication device is configured to: set a state of the wireless communication device to either an active state in which the wireless communication device can perform wireless communication compliant with a predetermined first communication scheme with the communication destination device, or a sleep state in which the wireless communication device can receive an activation instruction signal compliant with a second communication scheme requiring smaller electric power to receive a signal than the first communication scheme and cannot perform wireless communication compliant with the first communication scheme with the communication destination device; and set the state of the wireless communication device depending on a communication setting of the communication destination device.

Further, a wireless communication device control method as another aspect of the present invention is a method applied to a wireless communication device configured to be capable of performing wireless communication with at least one communication destination device.

Moreover, this wireless communication device control method includes: setting a state of the wireless communication device to either an active state in which the wireless communication device can perform wireless communication compliant with a predetermined first communication scheme with the communication destination device, or a sleep state in which the wireless communication device can receive an activation instruction signal compliant with a second communication scheme requiring smaller electric power to receive a signal than the first communication scheme and cannot perform wireless communication compliant with the first communication scheme with the communication destination device; and setting the state of the wireless communication device depending on a communication setting of the communication destination device.

Further, a wireless communication device control program as another aspect of the present invention is a program executed by a wireless communication device configured to be capable of performing wireless communication with at least one communication destination device.

Moreover, this wireless communication device control program includes instructions for causing the wireless communication device to perform operations including: setting a state of the wireless communication device to either an active state in which the wireless communication device can perform wireless communication compliant with a predetermined first communication scheme with the communication destination device, or a sleep state in which the wireless communication device can receive an activation instruction signal compliant with a second communication scheme requiring smaller electric power to receive a signal than the first communication scheme and cannot perform wireless communication compliant with the first communication scheme with the communication destination device; and setting the state of the wireless communication device depending on a communication setting of the communication destination device.

With the configurations as described above, the present invention makes it possible to perform wireless communication with a communication destination device while decreasing the amount of consumed electric power. Moreover, the present invention makes it possible to properly set the state of a wireless base station (a wireless communication device) depending on the situation.

BRIEF DESCRIPTION OF DRAWINGS

FIG. 3 is a table showing a ROD support table stored by the wireless base station according to the first exemplary embodiment of the present invention;

FIG. 5 is a sequence diagram showing the operation of the wireless communication system according to the first exemplary embodiment of the present invention;

FIG. 6 is a sequence diagram showing the operation of the wireless communication system according to the first exemplary embodiment of the present invention;

FIG. 7 is a flowchart showing a setting process executed by the wireless base station according to the first exemplary embodiment of the present invention;

FIG. 8 is a graph showing the relation between the number of wireless terminals and a communication network convergence average time;

FIG. 9 is a diagram showing the schematic configuration of a wireless communication system according to a modified example 1 of the first exemplary embodiment of the present invention;

FIG. 10 is a diagram showing the schematic configuration of a wireless communication system according to a second exemplary embodiment of the present invention;

FIG. 18 is a table showing a ROD support table stored by the wireless base station according to the fifth exemplary embodiment of the present invention;

FIG. 23 is an explanation diagram conceptually showing change of the state of a wireless base station according to a modified example 4 of the fifth exemplary embodiment of the present invention;

FIG. 24 is an explanation diagram conceptually showing change of the state of a wireless base station according to a modified example 5 of the fifth exemplary embodiment of the present invention;

FIG. 25 is an explanation diagram conceptually showing change of the state of a wireless base station according to a modified example 6 of the fifth exemplary embodiment of the present invention;

FIG. 26 is an explanation diagram conceptually showing change of the state of a wireless base station according to a sixth exemplary embodiment of the present invention;

FIG. 27 is an explanation diagram conceptually showing change of the state of the wireless base station according to the sixth exemplary embodiment of the present invention;

FIG. 29 is a block diagram showing the configuration of a wireless base station according to a seventh exemplary embodiment of the present invention.

EXEMPLARY EMBODIMENTS

Below, exemplary embodiments of a wireless communication device, a wireless communication device control method, a wireless communication device control program, a wireless communication system, a wireless communication system control method, a control device, a control device control method, a control device control program, a wireless base station, a wireless base station control method and a wireless base station control program according to the present invention will be described referring to FIGS. 1 to 29.

First Exemplary Embodiment (Configuration)

Figure 1:
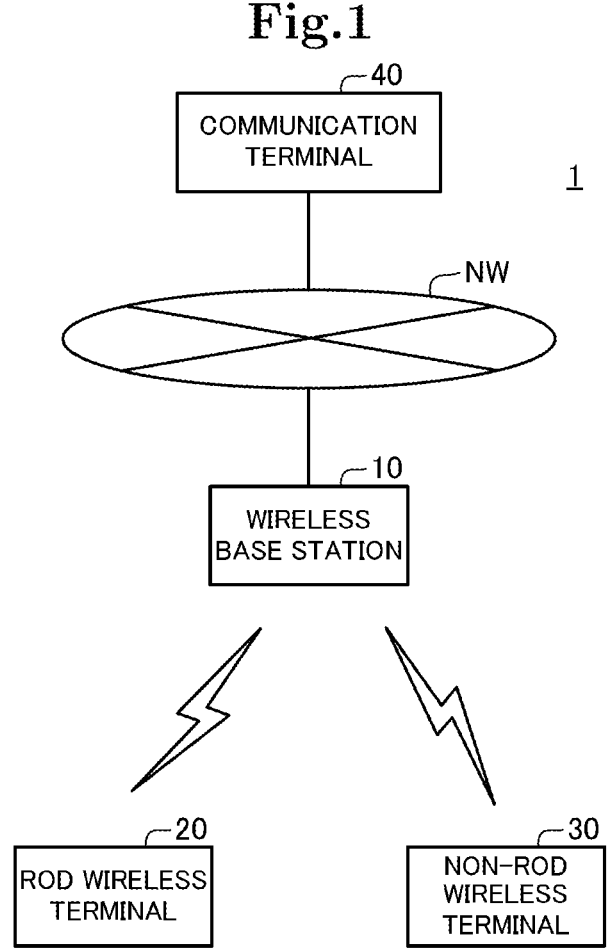
FIG. 1 is a diagram showing the schematic configuration of a wireless communication system according to a first exemplary embodiment of the present invention.

As shown in FIG. 1, a wireless communication system 1 according to a first exemplary embodiment includes a wireless base station 10, a ROD (Radio on Demand) wireless terminal 20, and a non-ROD wireless terminal 30, and a communication terminal 40.

In this exemplary embodiment, the wireless base station 10, the ROD wireless terminal 20 and the non-ROD wireless terminal 30 configure a wireless LAN (Local Area Network) (e.g., IEEE802.11a, IEEE802.11b, IEEE802.11g, IEEE802.11j, IEEE802.11n, or the like).

Meanwhile, the wireless base station 10, the ROD wireless terminal 20 and the non-ROD wireless terminal 30 may configure a mobile communication network, a short-distance wireless communication network (e.g., Bluetooth™, ZigBee™, and the like), WiMAX, a communication network defined by IEEE802.11ah, a communication network defined by IEEE1900.6, or the like.

The wireless base station 10 is referred to as a base station, Access Point, Base Station, or Node B. The ROD wireless terminal 20 and the non-ROD wireless terminal 30 are each referred to as a wireless terminal or Station.

For example, the wireless terminal 20, 30 is a personal computer, a mobile phone terminal, a PHS (Personal Handyphone System), a PDA (Personal Data Assistance, Personal Digital Assistant), a smartphone, a car navigation terminal, a game terminal, or the like.

The wireless base station 10 and the communication terminal 40 are connected so as to be capable of communicating with each other via a communication network (in this exemplary embodiment, a backbone communication network) NW.

The ROD wireless terminal 20 and the non-ROD wireless terminal 30 each perform wireless communication with the wireless base station 10, thereby performing communication with the communication terminal 40 via the wireless base station 10 (e.g., transmitting and receiving communication packets).

In this exemplary embodiment, the ROD wireless terminal 20 is carried by a first user. Therefore, the ROD wireless terminal 20 moves along with movement of the first user. Likewise, the non-ROD wireless terminal 30 is carried by a second user. Therefore, the non-ROD wireless terminal 30 moves along with movement of the second user.

The wireless communication system 1 may include a plurality of ROD wireless terminals 20. Moreover, the wireless communication system 1 may include a plurality of non-ROD wireless terminals 30.

The wireless base station 10 is configured to be capable of performing wireless communication with the ROD wireless terminal 20 and the non-ROD wireless terminal 30, respectively. To be specific, the wireless base station 10 is configured to be capable of performing wireless communication with the wireless terminal 20, 30 that a distance from the wireless base station 10 is shorter than a given threshold distance.

The ROD wireless terminal 20 is configured to be capable of transmitting a predetermined activation instruction signal (a wake-up signal). The non-ROD wireless terminal 30 is configured to be incapable of transmitting an activation instruction signal.

The wireless base station 10 configures a wireless communication device. The ROD wireless terminal 20 and the non-ROD wireless terminal 30 each configure a communication destination device.

Figure 2:
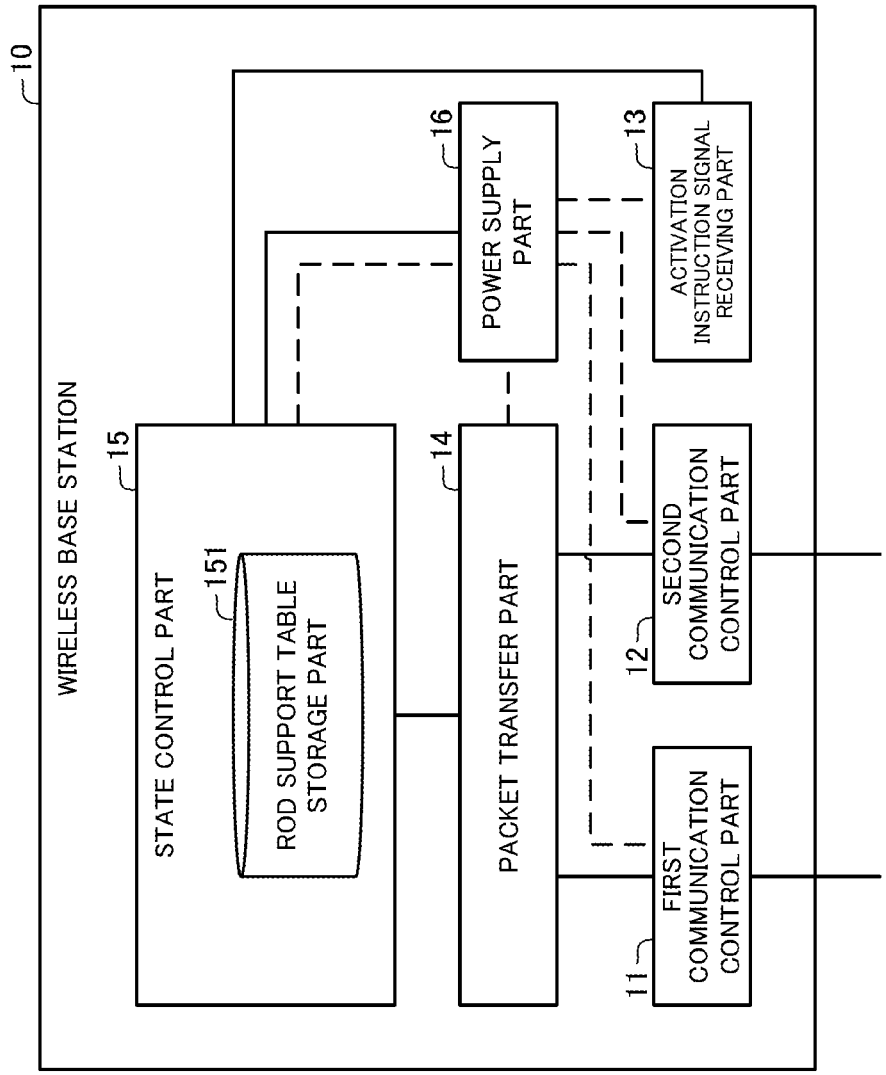
FIG. 2 is a block diagram showing the configuration of a wireless base station according to the first exemplary embodiment of the present invention.

To be more specific, as shown in FIG. 2, the wireless base station 10 includes a first communication control part 11, a second communication control part 12, an activation instruction signal receiving part 13, a packet transfer part 14, a state control part (a compatible information acquiring means) 15, and a power supply part 16.

The first communication control part 11 is configured to perform wireless communication compliant with a first communication scheme. In this exemplary embodiment, the first communication scheme is DSSS (Direct Sequence Spread Spectrum), CCK (Complementary Code Keying), OFDM (Orthogonal Frequency Division Multiplexing), or the like.

In this exemplary embodiment, the first communication scheme uses 2.4 GHz bandwidth or 5 GHz bandwidth as a frequency band.

The first communication control part 11 performs wireless communication with the wireless terminals 20 and 30, respectively.

Further, every time a preset transmission period passes, the first communication control part 11 transmits a beacon signal (a Beacon frame) for notifying that wireless communication with the wireless base station 10 is allowed. In this exemplary embodiment, a beacon signal includes an identifier (e.g., ESSID (Extended Service Set Identifier), BSSID (Basic Service Set Identifier), or the like) for identifying the wireless base station 10.

The second communication control part 12 is configured to perform wired communication (communication via a communication cable). The second communication control part 12 performs communication with the communication terminal 40 via the communication network NW.

The wireless base station 10 includes two communication control parts (the first communication control part 11 and the second communication control part 12), but may include three or more communication control parts.

The activation instruction signal receiving part 13 is configured to receive an activation instruction signal compliant with a second communication scheme. The second communication scheme is a communication scheme requiring smaller electric power for receiving a signal than the first communication scheme.

In this exemplary embodiment, the second communication scheme is OOK (On Off Keying), ASK (Amplitude Shift Keying), FSK (Frequency Shift Keying), or the like. In this exemplary embodiment, the second communication scheme uses the same frequency band as the first communication scheme, as a frequency band.

The packet transfer part 14 is configured to transmit a packet received via the first communication control part 11, via the second communication control part 12. Moreover, the packet transfer part 14 is configured to transmit a packet received via the second communication control part 12, via the first communication control part 11.

Further, when compatibility notification to be described later is received via the first communication control part 11, the packet transfer part 14 outputs the received compatibility notification to the state control part 15.

The state control part 15 has a ROD support table storage part 151. As shown in FIG. 3, the ROD support table storage part 151 stores a ROD support table including compatible information. One piece of compatible information includes wireless terminal identification information for identifying a wireless terminal and ROD information.

ROD information is information representing whether it is possible to transmit an activation instruction signal or not. In this exemplary embodiment, "ROD allowed" as ROD information represents that it is possible to transmit an activation instruction signal. Moreover, "No ROD" as ROD information represents that it is impossible to transmit an activation instruction signal.

The state control part 15 transmits a notification transmission request to the wireless terminals 20 and 30, respectively, via the first communication control part 11. A notification transmission request is information of a request for transmission of compatibility notification. Compatibility notification is information representing that it is possible to transmit an activation instruction signal.

When receiving a notification transmission request from the wireless base station 10, the ROD wireless terminal 20 transmits compatibility notification to the wireless base station 10. On the other hand, the non-ROD wireless terminal 30 does not transmit compatibility notification.

Upon receiving compatibility notification from the wireless terminal 20, 30 via the packet transfer part 14 within a preset standby time in response to a transmitted notification transmission request, the state control part 15 acquires, with respect to this wireless terminal 20, 30, compatible information representing that this wireless terminal 20, 30 can transmit an activation instruction signal (this wireless terminal is a ROD compatible device).

On the other hand, in the case of not receiving compatibility notification from the wireless terminal 20, 30 within the abovementioned standby time in response to a transmitted notification transmission request, the state control part 15 acquires, with respect to this wireless terminal 20, 30, compatible information representing that this wireless terminal 20, 30 cannot transmit an activation instruction signal (i.e., this wireless terminal is a ROD incompatible device).

Thus, the state control part 15 acquires compatible information with respect to the respective wireless terminals 20 and 30. Then, the state control part 15 causes the ROD support table storage part 151 to store the acquired compatible information. The abovementioned compatible information is information representing whether the wireless terminal 20, 30 is a ROD compatible device or a ROD incompatible device, and therefore, is also information representing the communication setting of the wireless terminal 20, 30.

The power supply part 16 is configured to be capable of supplying electric power to the first communication control part 11, the second communication control part 12, the activation instruction signal receiving part 13, the packet transfer part 14 and the state control part 15, respectively, via a power supply line. The power supply part 16 is configured in a manner that the state is switched between a power supply state that electric power is supplied to the first communication control part 11 and a power shutoff state that supply of electric power to the first communication control part 11 is ceased.

When the state of the power supply part 16 is set to the power supply state, it corresponds to that the state of the wireless base station 10 is set to the active state. Moreover, when the state of the power supply part 16 is set to the power shutoff state, it corresponds to that the state of the wireless base station 10 is set to the sleep state.

Further, the wireless base station 10 is configured to operate in either a ROD mode or a non-ROD mode.

In a case where the wireless base station 10 operates in the non-ROD mode, the wireless base station 10 sets its state to the active state at all times. Moreover, in a case where the wireless base station 10 operates in the non-ROD mode, the wireless base station 10 sets a transmission period to a first transmission period when a predetermined first power-saving condition is not satisfied and, on the other hand, sets a transmission period to a second transmission period, which is longer than the first transmission period, when the first power saving condition is satisfied.

For example, the first power-saving condition is a condition that wireless communication has not been executed during a period from a moment that is a preset first threshold time before a current moment to the current moment.

In a case where the wireless base station 10 operates in the non-ROD mode, the wireless base station 10 transmits operation stop notification and shuts off supply of electric power to the wireless base station 10 when a predetermined second power-saving condition is satisfied.

Herein, operation stop notification is information for notifying that the wireless base station 10 is due to stop operation. Moreover, the second power-saving condition is a condition that wireless communication has not been executed during a period from a moment that is a preset second threshold time before a current moment to the current moment. For example, it is favorable that the second threshold time is longer than the first threshold time.

For example, the wireless base station 10 may use a method defined by IEEE802.11v (BBS Transition Management).

Further, in a case where the wireless base station 10 operates in the ROD mode, the wireless base station 10 sets its state to either the active state or the sleep state.

Moreover, in a case where the wireless base station 10 operates in the ROD mode, the wireless base station 10 sets the state of the wireless base station 10 to the sleep state when the state of the wireless base station 10 is the active state and a predetermined sleep condition is satisfied. For example, the sleep condition is a condition that wireless communication has not been executed during a period from a moment that is a preset third threshold time before a current moment to the current moment.

Besides, in a case where the wireless base station 10 operates in the ROD mode, the wireless base station 10 sets its state to the active state in a case where the state of the wireless base station 10 is the sleep state and an activation instruction signal is received.

The state control part 15 sets the operation mode to the ROD mode or the non-ROD mode at predetermined setting timing (e.g., every time a preset period passes, or every time the ROD support table stored in the ROD support table storage part 151 is changed).

To be specific, the state control part 15 sets the operation mode to the ROD mode in a case where the compatible information all include "ROD allowed" as ROD information (i.e., a case where the acquired compatible information represents that the wireless terminals 20 and 30 are all ROD compatible devices). Consequently, the wireless base station 10 operates in the set operation mode (ROD mode).

On the other hand, the state control part 15 sets the operation mode to the non-ROD mode in a case where at least one of the compatible information stored in the ROD support table storage part 151 includes "No ROD" as ROD information (i.e., a case where the acquired compatible information represents that at least one of the wireless terminals 20 and 30 is a ROD incompatible device). Consequently, the wireless base station 10 operates in the set operation mode (non-ROD mode).

(Operation)

Next, the operation of the abovementioned wireless communication system 1 will be described.

Figure 4:
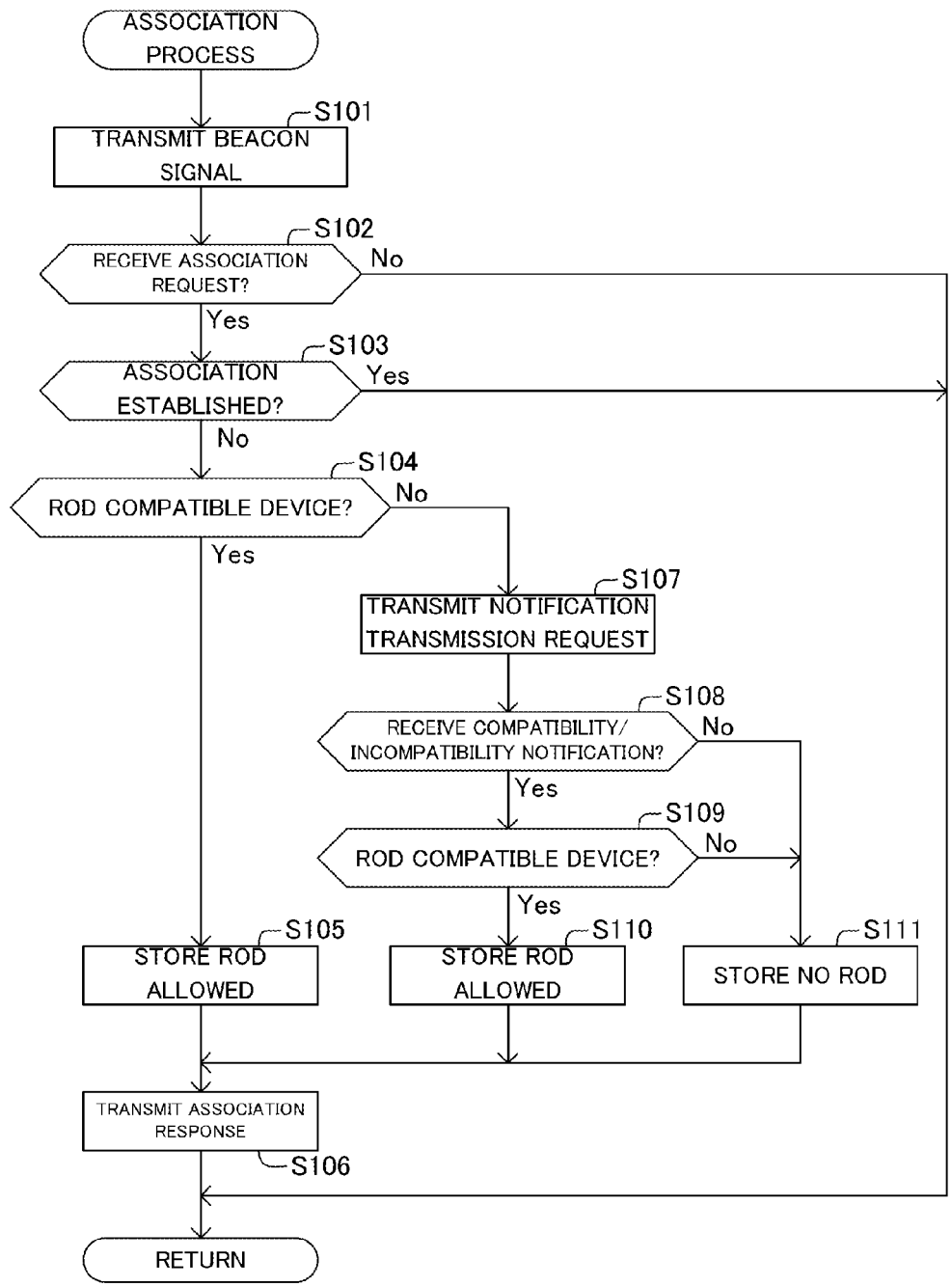
FIG. 4 is a flowchart showing an association process executed by the wireless base station according to the first exemplary embodiment of the present invention.

The wireless base station 10 is configured to execute an association process shown by a flowchart in FIG. 4 every time a transmission period passes in a case where the state of the wireless base station 10 is set to the active state.

To be specific, upon starting execution of the association process, the wireless base station 10 transmits a beacon signal (step S101). This beacon signal includes ROD support information. The ROD support information is information that represents supporting a ROD function. The ROD function is a function that it is possible to operate the wireless base station 10 in the ROD mode.

The wireless base station 10 is configured to, when receiving a probe request (a Probe Request frame) from the wireless terminal 20, 30, transmit a probe response (a Probe Response frame) to this wireless terminal 20, 30, and thereafter, execute the association process of executing processes in steps S102 to S111. The probe response also includes ROD support information.

On the other hand, the ROD wireless terminal 20 receives a beacon signal from the wireless base station 10. In a case where the received beacon signal includes ROD support information, the ROD wireless terminal 20 transmits an association request (an Association Request frame) including compatibility notification to the wireless base station 10.

In a case where the received beacon signal does not include ROD support information, the ROD wireless terminal 20 transmits an association request that does not include compatibility notification. Meanwhile, the ROD wireless terminal 20 may be configured to transmit an association request that does not include compatibility notification even when the received beacon signal includes ROD support information.

Further, the non-ROD wireless terminal 30 receives a beacon signal from the wireless base station 10. The non-ROD wireless terminal 30 transmits an association request that does not include compatibility notification regardless of whether the received beacon signal includes ROD support information or not, to the wireless base station 10.

First, a case where the wireless base station 10 receives an association request including compatibility notification from the ROD wireless terminal 20 will be described.

In this case, the wireless base station 10 determines "Yes" in determination whether it has received the association request or not in step S102, and proceeds to step S103. Then, the wireless base station 10 determines whether association between the wireless terminal (the ROD wireless terminal 20) that has transmitted the association request and the wireless base station 10 has already been established or not.

Because association between the wireless base station 10 and the ROD wireless terminal 20 has not been established yet at this moment, the wireless base station 10 determines "No" and proceeds to step S104. Then, the wireless base station 10 determines whether the wireless terminal (the ROD wireless terminal 20) having transmitted the association request is a ROD compatible device or not (whether the association request includes compatibility notification or not).

Therefore, the wireless base station 10 determines "Yes," and proceeds to step S105 to newly store compatible information that includes wireless terminal identification information for identifying the wireless terminal (the ROD wireless terminal 20) having transmitted the association request and ROD information representing "ROD allowed" (i.e., add to the ROD support table).

After that, the wireless base station 10 transmits an association response (an Association Response frame) to the wireless terminal (the ROD wireless terminal 20) having transmitted the association request (step S106). Then, the wireless base station 10 ends execution of the association process shown in FIG. 4.

Next, a case where the wireless base station 10 receives an association request that does not include compatibility notification from the ROD wireless terminal 20 will be described. FIG. 5 is a sequence diagram showing the outline of the operation of the wireless base station 10 and the ROD wireless terminal 20.

In this case, the wireless base station 10 transmits a beacon signal in the same manner as described above (step S101 in FIG. 4, and step S201 in FIG. 5).

Then, the ROD wireless terminal 20 transmits an association request that does not include compatibility notification to the wireless base station 10 (step S202 in FIG. 5).

Therefore, in step S104, the wireless base station 10 determines "No" and proceeds to step S107.

Then, the wireless base station 10 transmits a notification transmission request to the wireless terminal (the ROD wireless terminal 20) having transmitted the association request (step S203 in FIG. 5).

Meanwhile, the ROD wireless terminal 20 receives the notification transmission request from the wireless base station 10. When receiving the notification transmission request, the ROD wireless terminal 20 transmits compatibility notification as compatibility/incompatibility notification to the wireless base station 10 (step S204 in FIG. 5).

Herein, compatibility/incompatibility notification is compatibility notification or incompatibility notification. The incompatibility notification is information representing that it is impossible to transmit an activation instruction signal. Thus, the wireless base station 10 receives the compatibility/incompatibility notification from the ROD wireless terminal 20.

Therefore, in determination in step S108 whether the wireless base station 10 has received the compatibility/incompatibility notification before a standby time passes from transmission of the notification transmission request, the wireless base station 10 determines "Yes" and proceeds to step S109. Then, the wireless base station 10 determines whether the wireless terminal (the ROD wireless terminal 20) having transmitted the association request is a ROD compatible device or not (whether the wireless base station 10 has received compatibility notification in response to the notification transmission request or not.

Therefore, the wireless base station 10 determines "Yes," and proceeds to step S110 to newly store compatible information that includes wireless terminal identification information for identifying the wireless terminal (the ROD wireless terminal 20) having transmitted the association request and ROD information representing "ROD allowed" (step S205 in FIG. 5).

After that, the wireless base station 10 transmits an association response to the wireless terminal (the ROD wireless terminal 20) having transmitted the association request (step S106). Then, the wireless base station 10 ends execution of the association process shown in FIG. 4.

Next, a case where the wireless base station 10 receives an association request that does not include compatibility notification from the non-ROD wireless terminal 30 will be described. FIG. 6 is a sequence diagram showing the outline of the operation of the wireless base station 10 and the non-ROD wireless terminal 30.

In this case, the wireless base station 10 transmits a beacon signal in the same manner as described above (step S101 in FIG. 4, and step S301 in FIG. 6).

Then, the non-ROD wireless terminal 30 transmits an association request that does not include compatibility notification to the wireless base station 10 (step S302 in FIG. 6). Therefore, when proceeding to step S104, the wireless base station 10 determines "No" and proceeds to step S107.

Then, the wireless base station 10 transmits a notification transmission request to the wireless terminal (the non-ROD wireless terminal 30) having transmitted the association request (step S303 in FIG. 6).

Meanwhile, the non-ROD wireless terminal 30 receives the notification transmission request from the wireless base station 10. The non-ROD wireless terminal 30 does not transmit compatibility/incompatibility notification even when receiving a notification transmission request. The non-ROD wireless terminal 30 may be configured to, in the case of receiving a notification transmission request, transmit incompatibility notification as compatibility/incompatibility notification to the wireless base station 10.

Therefore, in determination in step S108 whether the wireless base station has received compatibility/incompatibility notification before a standby time passes after transmission of the notification transmission request, the wireless base station 10 determines "No" and proceeds to step S111.

Then, the wireless base station 10 newly stores compatible information that includes wireless terminal identification information for identifying the wireless terminal (non-ROD wireless terminal 30) having transmitted the association request and ROD information representing "No ROD" (step S304 in FIG. 6).

After that, the wireless base station 10 transmits an association response to the wireless terminal (the non-ROD wireless terminal 30) having transmitted the association request (step S106). Then, the wireless base station 10 ends execution of the association process shown in FIG. 4.

In the case of receiving incompatibility notification as compatibility/incompatibility notification from the non-ROD wireless terminal 30, the wireless base station 10 determines "Yes" in step S108, determines "No" in step S109, and proceeds to step S111. Also in this case, the wireless base station 10 newly stores compatible information that includes wireless terminal identification information for identifying the wireless terminal (non-ROD wireless terminal 30) having transmitted the association request and ROD information representing "No ROD."

Further, in a case where association has already been established between a wireless terminal having transmitted an association request and the wireless base station 10, the wireless base station 10 determines "Yes" in step S103, and ends execution of the association process shown in FIG. 4.

Further, in a case where the wireless base station 10 has not received an association request before a preset timeout period passes from transmission of a beacon signal, the wireless base station 10 determines "No" in step S102, and ends execution of the association process shown in FIG. 4.

The wireless base station 10 is configured to, in a case where the state of the wireless base station 10 is set to the active state, execute a setting process shown by a flowchart in FIG. 7 at a setting timing (in this exemplary embodiment, every time the ROD support table stored in the ROD support table storage part 151 is changed).

To be specific, upon starting execution of the setting process, the wireless base station 10 scans the ROD support table stored in the ROD support table storage part 151 (i.e., acquires compatible information stored in the ROD support table storage part 151) (step S401).

Then, the wireless base station 10 determines whether all wireless terminals capable of performing wireless communication with the wireless base station 10 (i.e., all wireless terminals having transmitted association requests) are capable of transmitting activation instruction signals or not. That is, the wireless base station 10 determines whether all of the compatible information included in the ROD support table includes "ROD allowed" as ROD information or not.

It is assumed that both the ROD wireless terminal 20 and the non-ROD wireless terminal 30 transmit association requests to the wireless base station 10. In this case, compatible information included in the ROD support table includes first compatible information including "ROD allowed" as ROD information, and second compatible information including "No ROD" as ROD information.

Therefore, the wireless base station 10 determines "No," and proceeds to step S404 to set the operation mode of the wireless base station 10 to the non-ROD mode. Then, the wireless base station 10 ends execution of the setting process shown in FIG. 7.

Further, it is assumed that only the ROD wireless terminal 20 has transmitted an association request to the wireless base station 10. In this case, compatible information included in the ROD support table includes only the first compatible information including "ROD allowed" as ROD information.

Therefore, the wireless base station 10 determines "Yes" in step S402, and proceeds to step S403 to set the operation mode of the wireless base station 10 to the ROD mode. Then, the wireless base station 10 ends execution of the setting process shown in FIG. 7.

Further, it is assumed that only the non-ROD wireless terminal 30 has transmitted an association request to the wireless base station 10. In this case, compatible information included in the ROD support table includes only the second compatible information including "No ROD" as ROD information.

Therefore, the wireless base station 10 determines "No" in step S402, and proceeds to step S404 to set the operation mode of the wireless base station 10 to the non-ROD mode. Then, the wireless base station 10 ends execution of the setting process shown in FIG. 7.

As described above, the wireless base station 10 according to the first exemplary embodiment of the present invention is configured to operate in either the ROD mode or the non-ROD mode.

According to this, even when a communication destination device capable of transmitting an activation instruction signal (in this exemplary embodiment, the ROD wireless terminal 20) and a communication destination device incapable of transmitting an activation instruction signal (in this exemplary embodiment, the non-ROD wireless terminal 30) both exist, the wireless base station 10 can securely perform wireless communication with the communication destination device while reducing the amount of electric power consumed by the wireless base station 10.

Further, the wireless base station 10 according to the first exemplary embodiment of the present invention is configured to transmit a notification transmission request to each of the communication destination devices. Additionally, the wireless base station 10 is configured to, when receiving the compatibility notification from the communication destination device in response to the transmitted notification transmission request, acquire compatible information representing that the communication destination device is a ROD compatible device with respect to the communication destination device. Besides, the wireless base station 10 is configured to, when not receiving the compatibility notification from the communication destination device in response to the transmitted notification transmission request, acquire compatible information representing that the communication destination device is a ROD incompatible device with respect to the communication destination device.

According to this, it is possible to securely acquire compatible information with respect to all of the communication destination devices.

The wireless base station 10 according to the first exemplary embodiment of the present invention is configured to, in the non-ROD mode, set a transmission period to a first transmission period in a case where a first power-saving condition is not satisfied and, on the other hand, set the transmission period to a second transmission period that is longer than the first transmission period in a case where the first power-saving condition is satisfied.

According to this, it is possible to reduce the amount of electric power consumed by the wireless base station 10 even when the wireless base station 10 operates in the non-ROD mode.

Meanwhile, the wireless base station 10 according to the first exemplary embodiment of the present invention is configured to, in the non-ROD mode, in a case where a second power-saving condition is satisfied, transmit operation stop notification for notifying that the wireless base station 10 is due to stop operation and also shut off supply of electric power to the wireless base station 10.

According to this, it is possible to reduce the amount of electric power consumed by the wireless base station 10 even when the wireless base station 10 is operating in the non-ROD mode.

An effect exerted by the wireless base station 10 according to the first exemplary embodiment of the present invention will be described referring to FIG. 8. FIG. 8 is a graph showing the relation between the number of wireless terminals capable of performing wireless communication with the wireless base station 10 (i.e., a wireless terminal number) and communication network convergence average time.

The communication network convergence average time represents the average of time required for a communication network NW to become stable after wireless communication between a wireless terminal and the wireless base station 10 stops after association is established between the wireless terminal and the wireless base station 10.

A wireless terminal capable of transmitting an activation instruction signal among wireless terminals is referred to as a ROD compatible device. A wireless terminal incapable of transmitting an activation instruction signal among wireless terminals is referred to as a ROD incompatible device.

As the wireless terminal number becomes relatively large, the communication network NW stops convergence. Therefore, in FIG. 8, as the wireless terminal number becomes larger, the communication network convergence average time becomes longer.

Further, as the communication network convergence average time becomes longer, a time that the state of the wireless base station 10 is set to the sleep state becomes shorter. Therefore, as the communication network convergence average time becomes longer, the amount of electric power consumed by the wireless base station 10 becomes larger.

In FIG. 8, a solid line C1 is a graph with respect to a wireless communication system according to a comparative example that includes the wireless base station 10 according to the first exemplary embodiment and wireless terminals including both a ROD compatible device and a ROD incompatible device.

A dashed-dotted line C2 is a graph with respect to a wireless communication system according to a first comparative example that includes a wireless base station configured to set an operation mode in accordance with an instruction inputted by a user and wireless terminals including both a ROD compatible device and a ROD incompatible device.

A dotted line C3 is a graph with respect to a wireless communication system according to a second comparative example that includes a wireless base station operating in the ROD mode at all times and wireless terminals including only ROD compatible devices.

In the second comparative example, the wireless base station operates in the ROD mode at all times. Therefore, there is a case where a ROD incompatible device cannot perform wireless communication with the wireless base station.

Further, in the first comparative example, because the user inputs an instruction, it requires an extra delay time to change the operation mode. Therefore, in the first comparative example, the communication network convergence average time for the same wireless terminal number becomes longer than in the first exemplary embodiment.

Thus, according to the wireless base station 10 of the first exemplary embodiment, it is possible to make the communication network convergence average time shorter, and therefore, it is possible to make the amount of electric power consumed by the wireless base station 10 smaller. Moreover, according to the wireless base station 10 of the first exemplary embodiment, it is possible to securely perform wireless communication also with a ROD incompatible device.

The wireless base station 10 of the first exemplary embodiment may be configured in a manner that the power supply part 16 supplies electric power to the activation instruction signal receiving part 13 only when supply of electric power to the first communication control part 11 is ceased.

A wireless communication system 1A according to a modified example 1 of the first exemplary embodiment includes a home gateway 51, a television 52, a portable game machine 53, a router 54, a fire alarm 55 and a gas leak detector 56 as shown in FIG. 9.

In this example, the home gateway 51, the television 52, the portable game terminal 53, and the router 54 configure a first communication network NW1 (in this exemplary embodiment, a wireless LAN). Alternatively, the first communication network NW1 may be a mobile communication network, a short-distance wireless communication network, WiMAX, or the like.

The home gateway 51 is connected to an internet NWW.

Further, the router 54, the fire alarm 55 and the gas leak detector 56 configure a second communication network NW2 (in this exemplary embodiment, a wired LAN). Alternatively, the second communication network NW2 may be a wireless LAN, a mobile communication network, a short-distance wireless communication network, WiMAX, or the like.

In other words, the router 54 is a device that configures the first communication network NW1 configured by the home gateway 51, the television 52, the portable game machine 53 and the router 54 and also configures the second communication network NW2 different from the first communication network NW1.

The home gateway 51 has the same configuration as the wireless base station 10 in the first exemplary embodiment. Moreover, the television 52, the portable game machine 53 and the router 54 each have the same configuration as the ROD wireless terminal 20 or the non-ROD wireless terminal 30 according to the first exemplary embodiment.

According to the wireless communication system 1A of the first modified example, it is also possible to exert the same actions and effects as the wireless communication system 1 of the first exemplary embodiment.

Second Exemplary Embodiment

Next, a wireless communication system according to a second exemplary embodiment of the present invention will be described. The wireless communication system according to the second exemplary embodiment is different from the wireless communication system according to the first exemplary embodiment in including a plurality of wireless communication devices and a control device configured to set the operation modes of the respective wireless communication devices. Therefore, a description will be made below focusing on the different point.

A wireless communication system 2 according to the second exemplary embodiment includes a control device (a network controller) 61, a plurality of (in this exemplary embodiment, three) wireless base stations 62a, 62b and 62c, and a plurality of (in this exemplary embodiment, three) wireless terminals 63a, 63b and 63c as shown in FIG. 10.

The wireless communication system 2 may include one, two, four or more wireless base stations. Moreover, the wireless communication system 2 may include one, two, four or more wireless terminals. Moreover, the wireless base stations 62a, 62b and 62c may be routers or LAN switches.

The control device 61 is connected with each of the wireless base stations 62a, 62b and 62c so as to be capable of performing communication with each other via a communication network NW3. Alternatively, the control device 61 may be directly connected with each of the wireless base stations 62a, 62b and 62c.

Each of the wireless base stations 62a, 62b and 62c is configured to be capable of performing wireless communication with the wireless terminals 63a, 63b and 63c. To be specific, each of the wireless base stations 62a, 62b and 62c is configured to be capable of performing wireless communication with the wireless terminals 63a, 63b and 63c that a distance from the wireless base station is shorter than a given threshold distance.

Each of the wireless terminals 63a, 63b and 63c is a ROD compatible device capable of transmitting an activation instruction signal or a ROD incompatible device incapable of transmitting an activation instruction signal.

The wireless base stations 62a, 62b and 62c each configure a wireless communication device. Moreover, the wireless terminals 63a, 63b and 63c each configure a communication destination device.

In this exemplary embodiment, the wireless terminals 63a, 63b and 63c are carried by different users, respectively. Therefore, each of the wireless terminals 63a, 63b and 63c moves along with movement of the user carrying the wireless terminal.

Each of the wireless base stations 62a, 62b and 62c is configured to operate in either the ROD mode or the non-ROD mode. That is, each of the wireless base stations 62a, 62b and 62c is a ROD device.

The operation in the ROD mode of each of the wireless base stations 62a, 62b and 62c is the same as the operation in the ROD mode of the wireless base station 10 according to the first exemplary embodiment. Moreover, the operation in the non-ROD mode of each of the wireless base stations 62a, 62b and 62c is the same as the operation in the non-ROD mode of the wireless base station 10 according to the first exemplary embodiment.

The wireless base stations 62a, 62b and 62c each execute the association process shown in FIG. 4 in the same manner as the wireless base station 10 according to the first exemplary embodiment. Therefore, each of the wireless base stations 62a, 62b and 62c acquires compatible information with respect to each of the wireless terminals capable of performing wireless communication with the wireless base station, and adds the acquired compatible information to the ROD support table.

At predetermined setting timing (e.g., every time a preset period passes, or every time the ROD support table stored in the ROD support table storage part 151 is changed), each of the wireless base stations 62a, 62b and 62c transmits the ROD support table to the control device 61, instead of executing the setting process shown in FIG. 7.

Further, the respective wireless base stations 62a, 62b and 62c receive operation mode setting information from the control device 61. The operation mode setting information is information representing the ROD mode or information representing the non-ROD mode. In the case of receiving the operation mode setting information, each of the wireless base stations 62a, 62b and 62c sets the operation mode to an operation mode representing by the operation mode setting information.

Figure 11:
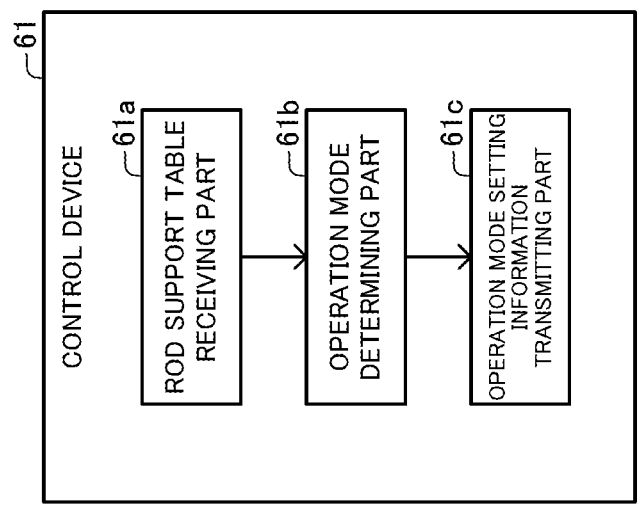
FIG. 11 is a block diagram showing the configuration of a control device according to the second exemplary embodiment of the present invention.

The control device 61 includes a ROD support table receiving part 61a, an operation mode determining part 61b and an operation mode setting information transmitting part 61c as shown in FIG. 11. The ROD support table receiving part 61a configures a compatible information acquiring means. The operation mode determining part 61b and the operation mode setting information transmitting part 61c configure an operation mode setting means.

Meanwhile, the ROD support table receiving part 61a receives a ROD support table from each of the wireless terminals 63a, 63b and 63c. The ROD support table receiving part 61a stores the received ROD support table so as to correspond to information for identifying the wireless terminal having transmitted the ROD support table.

The operation mode determining part 61b determines the operation mode based on the ROD support table stored in the ROD support table receiving part 61a, with respect to each of the wireless terminals 63a, 63b and 63c. To be specific, based on the ROD support table stored so as to correspond to information for identifying a wireless terminal as the target of determination of the operation mode (a target wireless terminal), the operation mode determining part 61b determines the operation mode of the target wireless terminal.

In the same manner as the wireless base station 10 according to the first exemplary embodiment, the operation mode determining part 61b selects the ROD mode as the operation mode in a case where all of the compatible information included in the ROD support table include "ROD allowed" as ROD information. On the other hand, the operation mode determining part 61b selects the non-ROD mode as the operation mode in a case where at least one of the compatible information included in the ROD support table includes "No ROD" as ROD information.

The operation mode setting information transmitting part 61c transmits operation mode setting information representing an operation mode determined by the operation mode determining part 61b, to the wireless terminal as the target of determination of the operation mode.

That is, the control device 61 executes the setting process shown in FIG. 7 individually with respect to each of the wireless base stations 62a, 62b and 62c. In the second exemplary embodiment, in the setting process, the control device 61 transmits operation mode setting information to the wireless base station, thereby setting the operation mode of the wireless base station.

Therefore, for example, in a case where the wireless terminals 63a, 63b and 63c are all ROD compatible devices, the control device 61 sets the operation modes of all of the wireless base stations 62a, 62b and 62c to the ROD mode.

For example, it is assumed that the wireless terminal 63a and the wireless terminal 63b are ROD compatible devices and the wireless terminal 63c is a ROD incompatible device. Moreover, it is assumed that the wireless terminal 63a and the wireless terminal 63b can perform wireless communication with the wireless base station 62a and the wireless terminal 63c can perform wireless communication with the wireless base station 62c. In this case, the control device 61 sets the operation modes of the wireless base stations 62a and 62b to the ROD mode and sets the operation mode of the wireless base station 62c to the non-ROD mode.

Thus, the wireless communication system 2 according to the second exemplary embodiment can exert the same actions and effects as the wireless communication system 1 according to the first exemplary embodiment.

The wireless communication system 2 may further include a wireless base station serving as a non-ROD device configured to operate only in the non-ROD mode.

Next, the wireless communication system 2 according to a modified example 1 of the second exemplary embodiment will be described. The control device 61 according to this modified example 1 sets the operation modes of all of the wireless base stations 62a, 62b and 62c to the same operation mode.

To be specific, in a case where all of the compatible information included in all of the stored ROD support tables include "ROD allowed" as ROD information, respectively, the control device 61 selects the ROD mode as the operation mode. On the other hand, in a case where at least one of the compatible information included in all of the stored ROD support tables includes "No ROD" as ROD information, the control device 61 selects the non-ROD mode as the operation mode.

Then, the control device 61 transmits operation mode setting information representing the selected operation mode to the respective wireless terminals 63a, 63b and 63c.

Therefore, for example, in a case where all of the wireless terminals 63a, 63b and 63c are ROD compatible devices, the control device 61 sets the operation modes of all of the wireless base stations 62a, 62b and 62c to the ROD mode.

Further, for example, in a case where the wireless terminal 63a and the wireless terminal 63b are ROD compatible devices and the wireless terminal 63c is a ROD incompatible device, the control device 61 sets the operation modes of all of the wireless base stations 62a, 62b and 62c to the non-ROD mode.

According to this, even when a ROD incompatible device becomes able to perform wireless communication with any wireless base station (ROD device), the ROD incompatible device can securely perform wireless communication with the wireless base station.

Figure 12:
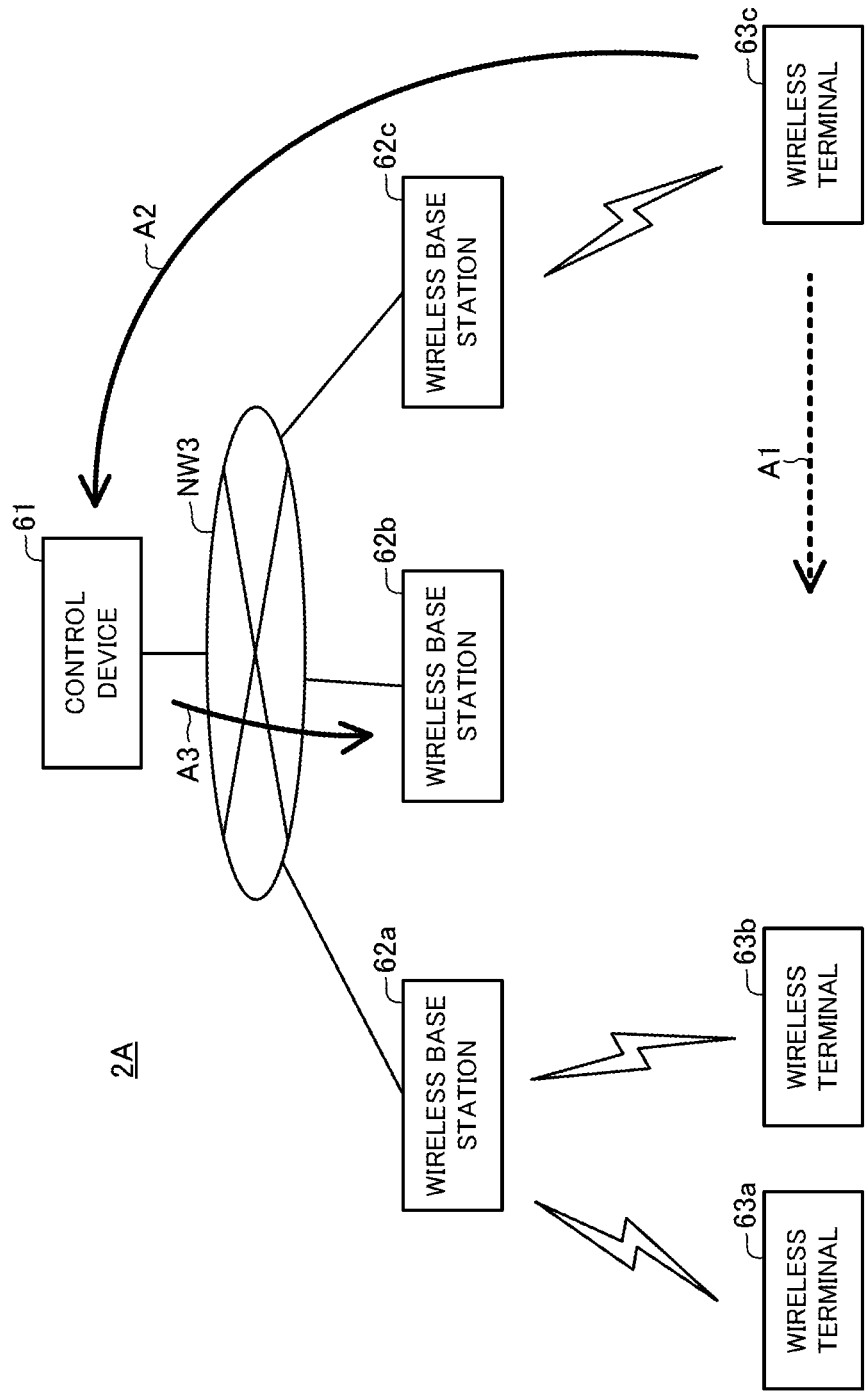
FIG. 12 is a diagram showing the schematic configuration of a wireless communication system according to a modified example 2 of the second exemplary embodiment of the present invention.

Next, a wireless communication system 2A according to a modified example 2 of the second exemplary embodiment as shown in FIG. 12 will be described. In this example, it is assumed that the wireless terminal 63a and the wireless terminal 63b are ROD compatible devices, respectively, and the wireless terminal 63c is a ROD incompatible device.

In the wireless communication system 2A according to the modified example 2, the wireless terminal 63c as the ROD incompatible device acquires location information representing the location of the terminal itself, and transmits the acquired location information to the control device 61 via the wireless base station 62c. Alternatively, the wireless communication system 2A may be configured in a manner that a wireless base station capable of performing wireless communication with a ROD incompatible device acquires location information representing the location of the ROD incompatible device and transmit the acquired location information to the control device 61.

The control device 61 determines a wireless base station with which the wireless terminal 63c should establish association, based on the received location information. The control device 61 executes a change process in a case where the determined wireless base station (a second wireless base station) is different from a wireless base station (a first wireless base station) that is associated with the wireless terminal 63c (that can perform wireless communication with the wireless terminal 63c) at a current moment.

The change process includes a process of setting the operation mode of the second wireless base station to the non-ROD mode and a process of setting the operation mode of the first wireless base station to the ROD mode. To be specific, the change process includes a process of, when the state of the second wireless base station is the sleep state, transmitting an activation instruction signal to the second wireless base station and thereafter transmitting operation mode setting information to the second wireless base station.

Assuming the wireless terminal 63a and the wireless terminal 63b can perform wireless communication with the wireless base station 62a, respectively, and the wireless terminal 63c can perform wireless communication with the wireless base station 62c, the control device 61 sets the operation modes of the respective wireless base station 62a and 62b to the ROD mode, and sets the operation mode of the wireless base station 62c to the non-ROD mode.

Assuming the wireless terminal 63c thereafter moves to a location where the wireless terminal 63c should establish association with the wireless base station 62b (arrow A1 in FIG. 12), the control device 61 determines a wireless base station with which the wireless terminal 63c should establish association, based on location information transmitted by the wireless terminal 63c to the control device 61 (arrow A2 in FIG. 12).

Then, in a case where the state of the wireless base station 62b is the sleep state, the control device 61 transmits an activation instruction signal to the wireless base station 62b (arrow A3 in FIG. 12). Moreover, the control device 61 transmits operation mode setting information representing the non-ROD mode to the wireless base station 62b, and operation mode setting information representing the ROD mode to the wireless base station 62c.

Thus, in a case where a wireless base station capable of performing wireless communication with the wireless terminal 63c serving as a ROD incompatible device changes from the wireless base station 62c (the first wireless communication device) to the wireless base station 62b (the second wireless communication device), the control device 61 according to the modified example 2 sets the operation mode of the wireless base station 62b to the non-ROD mode, and sets the operation mode of the wireless base station 62c to the ROD mode.

According to this, in a case where the wireless terminal 63c as a ROD incompatible device moves and thereby becomes able to perform wireless communication with the wireless base station 62b, the wireless terminal 63c can securely perform wireless communication with the wireless base station 62b. Moreover, it is possible to reduce the amount of electric power consumed by the wireless base station 62c.

Figure 13:
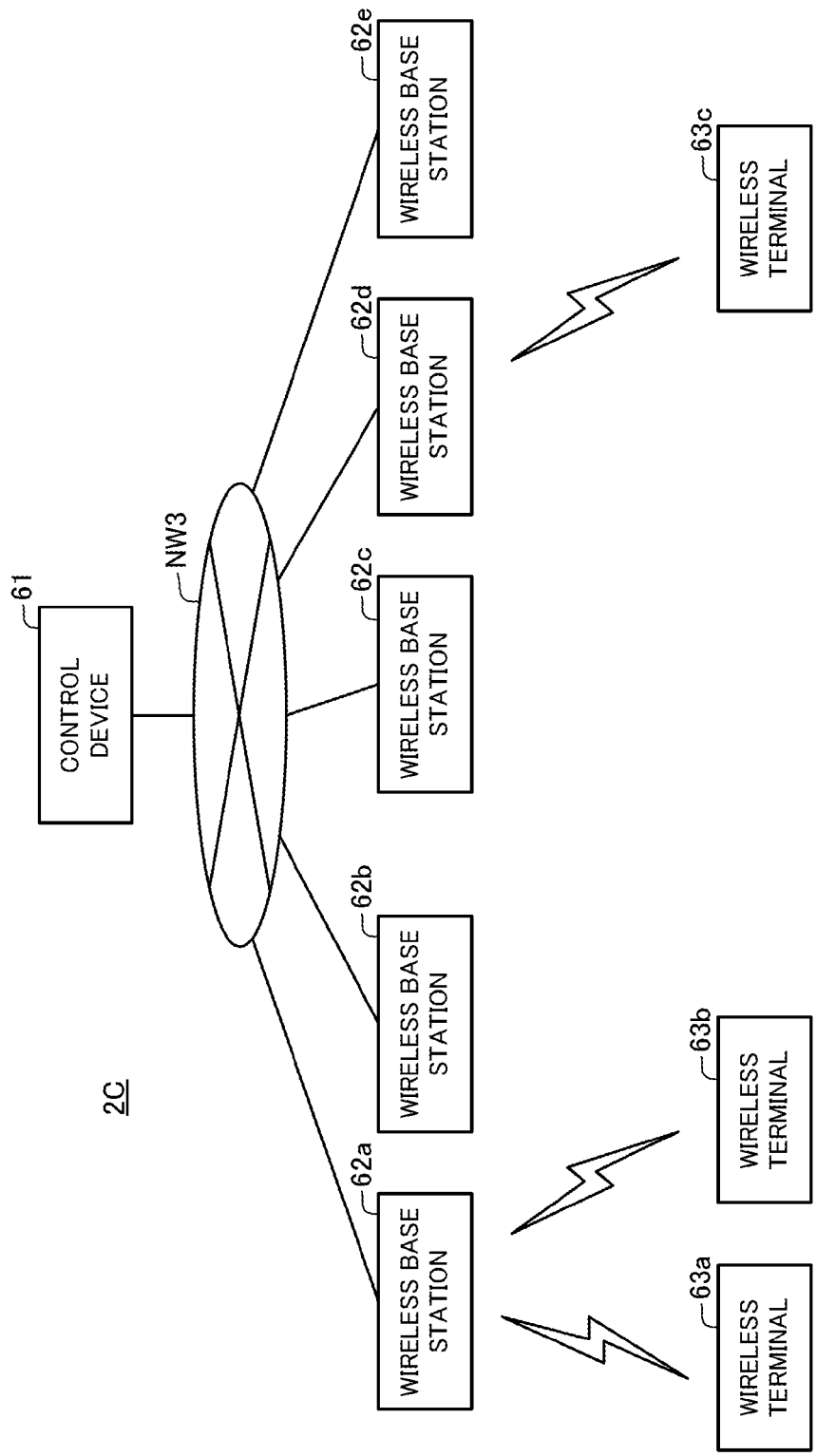
FIG. 13 is a diagram showing the schematic configuration of a wireless communication system according to a modified example 3 of the second exemplary embodiment of the present invention.

Next, a wireless communication system 2C according to a modified example 3 of the second exemplary embodiment as shown in FIG. 13 will be described. The wireless communication system 2C according to this modified example 3 includes two wireless base stations 62d and 62e in addition to the three wireless base stations 62a, 62b and 62c.

The two wireless base stations 62d and 62e are also configured in the same manner as the wireless base stations 62a, 62b and 62c. That is, each of the wireless base stations 62a to 62e is a ROD device. The wireless communication system 2C may further include a wireless base station serving as a non-ROD device.

The control device 61 according to the modified example 3 includes a location information acquiring part (a location information acquiring means) that acquires location information representing the location of each of the wireless base stations 62a to 62e.

Moreover, at the time of setting the operation mode of any one (a first ROD device) of the wireless base stations 62a to 62e to the non-ROD mode, the control device 61 specifies a wireless base station (a second ROD device) located in the vicinity of the first ROD device based on the acquired location information.

In this example, the control device 61 specifies a ROD device that a distance from the first ROD device is equal to or less than a preset threshold distance, as a ROD device located in the vicinity of the first ROD device. Alternatively, the control device 61 may be configured to specify a ROD device located nearest from the first ROD device, as a ROD device located in the vicinity of the first ROD device.

In addition, the control device 61 also sets the operation mode of the specified second ROD device to the non-ROD mode.

In this example, a wireless base station that is a ROD device operating in the ROD mode configures a ROD mode cluster. Moreover, a wireless base station that is a ROD device operating in the non-ROD mode and a wireless base station that is a non-ROD device configure a non-ROD mode cluster.

It is assumed that the wireless terminal 63a and the wireless terminal 63b are ROD compatible devices, respectively, and the wireless terminal 63c is a ROD incompatible device. Moreover, it is assumed that the wireless terminal 63a and the wireless terminal 63b can perform wireless communication with the wireless base station 62a, respectively, and the wireless terminal 63c can perform wireless communication with the wireless base station 62d. In addition, it is assumed that a distance between the wireless base station 62d and the wireless base station 62c and a distance between the wireless base station 62d and the wireless base station 62e are equal to or less than a threshold distance.

In this case, the control device 61 sets the operation modes of the wireless base stations 62a and 62b to the ROD mode and sets the operation mode of the wireless base station 62d to the non-ROD mode. Moreover, at the time of setting the operation mode of the wireless base station 62d to the non-ROD mode, the control device 61 also sets the operation modes of the wireless base stations 62c and 62e to the non-ROD mode.

According to this, in a case where the wireless terminal 63c (a ROD incompatible device) having been performing wireless communication with the wireless base station 62d (a first ROD device) moves and thereby becomes able to perform wireless communication with the wireless base station 62c or 62e (a second ROD device), the wireless terminal 63c can securely perform wireless communication with the second ROD device.

Third Exemplary Embodiment

Next, a system according to a third exemplary embodiment of the present invention will be described. The system according to the third exemplary embodiment is different from the wireless communication system according to the first exemplary embodiment in that the system includes a plurality of wireless communication devices and the plurality of wireless communication devices each configure a node in a mesh-type communication network. Therefore, a description will be made below focusing on the different point.

Figure 14:
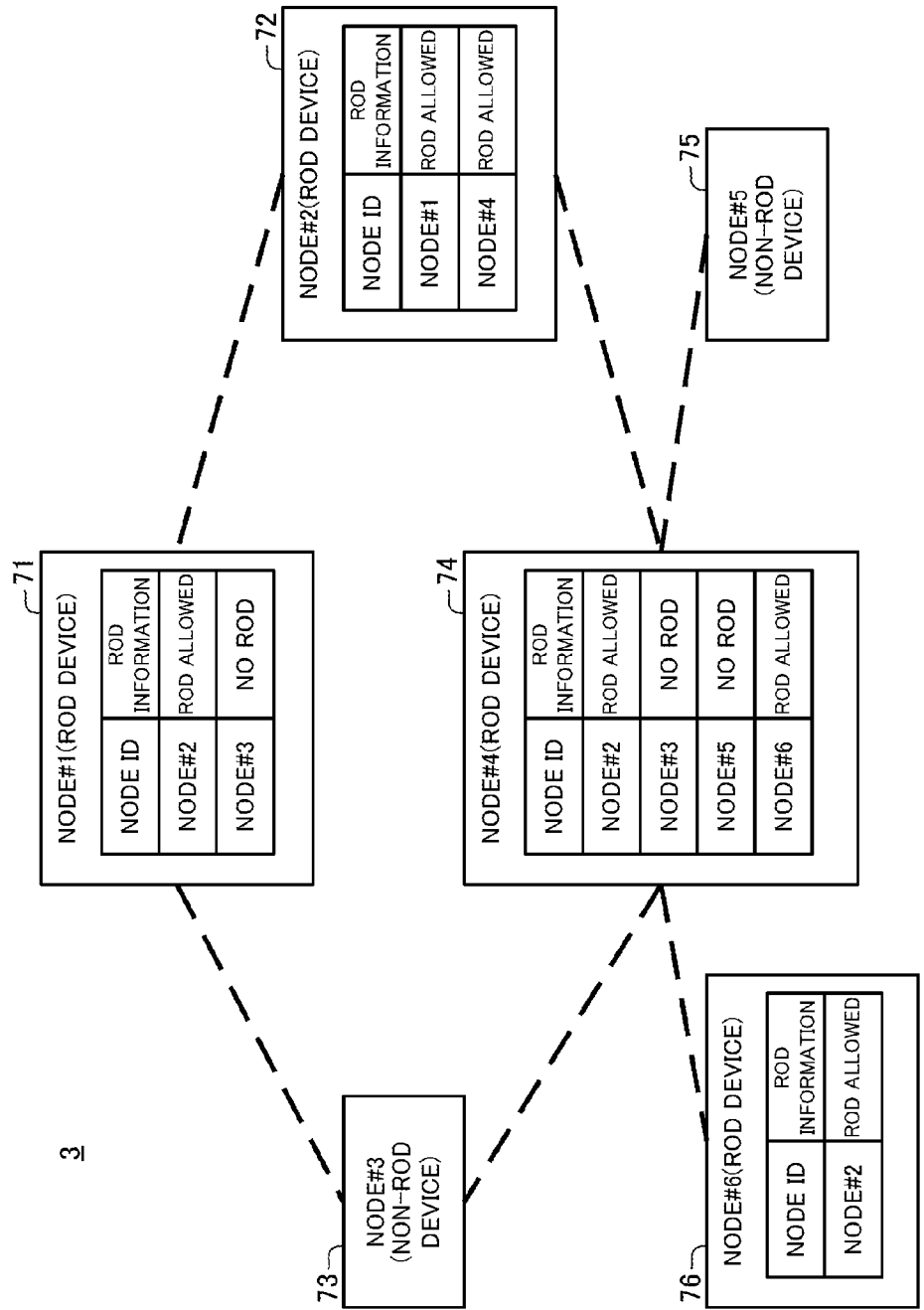
FIG. 14 is a diagram showing the schematic configuration of a wireless communication system according to a third exemplary embodiment of the present invention.

As shown in FIG. 14, a wireless communication system 3 according to the third exemplary embodiment includes a plurality of (in this exemplary embodiment, six) wireless communication devices 71 to 76. Alternatively, the wireless communication system 3 may include five or less wireless communication devices, or seven or more wireless communication devices.

The wireless communication devices 71 to 76 are configured to be capable of performing wireless communication. The wireless communication devices 71 to 76 each configure a node in a mesh-type communication network. The wireless communication devices 71 to 76 are also referred to as nodes #1 to #6, respectively.

In this exemplary embodiment, the wireless communication device 71 is connected so as to be capable of performing wireless communication with the wireless communication devices 72 and 73, respectively. Moreover, the wireless communication device 74 is connected so as to be capable of performing wireless communication with the wireless communication devices 72, 73, 75 and 76, respectively.

Each of the wireless communication devices 71 to 76 is a ROD device or a non-ROD device. In this exemplary embodiment, each of the wireless communication devices 71, 72, 74 and 76 is a ROD device. Moreover, each of the wireless communication devices 73 and 75 is a non-ROD device.

The respective ROD devices 71, 72, 74 and 76 according to the third exemplary embodiment are configured to operate in either the ROD mode or the non-ROD mode in the same manner as the wireless base station 10 according to the first exemplary embodiment. Moreover, the respective non-ROD devices 73 and 75 according to the third exemplary embodiment are configured to operate in the non-ROD mode.

The ROD devices 71, 72 74 and 76 each store a ROD support table including compatible information. One piece of compatible information includes wireless communication device identification information (a node ID) for identifying one of the wireless communication devices 71 to 76 and ROD information.

The ROD device 71, 72, 74, 76 transmits a notification transmission request to each of adjacent nodes that are nodes adjacent to the node itself (i.e., connected to the node itself so as to be capable of performing wireless communication) in the communication network. A notification transmission request is information of a request for transmission of compatibility notification. Compatibility notification is information representing that it is possible to transmit an activation instruction signal.

When receiving a notification transmission request from an adjacent node, the ROD device 71, 72, 74, 76 transmits compatibility notification to the adjacent node (a compatibility notification transmitting means). On the other hand, the non-ROD device 73, 75 does not transmit compatibility notification.

In the case of receiving compatibility notification from an adjacent node within a preset standby time in response to the transmitted notification transmission request, the ROD device 71, 72, 74, 76 acquires, with respect to the adjacent node, compatible information representing that the adjacent node can transmit an activation instruction signal (the adjacent node is a ROD device).

On the other hand, in the case of not receiving compatibility notification from an adjacent node within the abovementioned standby time in response to a transmitted notification transmission request, the ROD device 71, 72, 74, 76 acquires, with respect to the adjacent node, compatible information representing that the adjacent node cannot transmit an activation instruction signal (the adjacent node is a non-ROD device).

Thus, each of the ROD devices 71, 72, 74 and 76 acquires compatible information with respect to each adjacent node (a compatible information acquiring means). Then, each of the ROD devices 71, 72, 74 and 76 stores the acquired compatible information (updates the ROD support table).

Alternatively, each of the ROD devices 71, 72, 74 and 76 may be configured to transmit a HELLO message including compatibility notification. In this case, when a HELLO message received from an adjacent node includes compatibility notification, the ROD device 71, 72, 74, 76 acquires, with respect to the adjacent node, compatible information representing that the adjacent node can transmit an activation instruction signal (the adjacent not is a ROD device).

In a case where the ROD device 71, 72, 74, 76 operates in the non-ROD mode, the ROD device 71, 72, 74, 76 sets the state of the node itself to the active state at all times.

Further, in a case where the ROD device 71, 72, 74, 76 operates in the ROD mode, the ROD device 71, 72, 74, 76 sets the state of the node itself to either the active state or the sleep state.

In a case where the ROD device 71, 72, 74, 76 operates in the ROD mode, the ROD device 71, 72, 74, 76 sets the state of the node itself to the sleep state when the state of the node itself is the active state and a predetermined sleep condition is satisfied. For example, the sleep condition is a condition that wireless communication has not been executed during a period from a moment that is a preset third threshold time before a current moment to the current moment.

In a case where the ROD device 71, 72, 74, 76 operates in the ROD mode, the ROD device 71, 72, 74, 76 sets the state of the node itself to the active state when the state of the node itself is the sleep state and an activation instruction signal is received from an adjacent node.

The ROD device 71, 72, 74, 76 sets the operation mode of the node itself to the ROD mode or the non-ROD mode at predetermined setting timing (e.g., every time a preset period passes, or every time the stored ROD support table is changed).

To be specific, the ROD device 71, 72, 74, 76 sets the operation mode to the ROD mode in a case where all of the compatible information stored by the node itself include "ROD allowed" as ROD information (i.e., in a case where the acquired compatible information represents that all of the adjacent nodes are ROD devices). Consequently, the ROD device 71, 72, 74, 76 operates in the set operation mode (the ROD mode).

On the other hand, the ROD device 71, 72, 74, 76 sets the operation mode to the non-ROD mode in a case where at least one of the compatible information stored by the node itself includes "No ROD" as ROD information (i.e., in a case where the acquired compatible information represents that at least one of the adjacent nodes is a non-ROD device). Consequently, the ROD device 71, 72, 74, 76 operates in the set operation mode (the non-ROD mode).

Each of the ROD devices 71, 72, 74 and 76 is configured to be capable of transmitting an activation instruction signal to an adjacent node. On the other hand, each of the non-ROD devices 73 and 75 is configured to be incapable of transmitting an activation instruction signal.

Therefore, in the wireless communication system 3 according to the third exemplary embodiment, each of the ROD devices 71 and 74 sets the operation mode of the node itself to the non-ROD mode. Moreover, each of the ROD devices 72 and 76 sets the operation mode of the node itself to the ROD mode.

Thus, the wireless communication system 3 according to the third exemplary embodiment can exert the same actions and effects as the wireless communication system 1 according to the first exemplary embodiment.

Next, the wireless communication system 3 according to a modified example 1 of the third exemplary embodiment will be described. The wireless communication system 3 according to the modified example 3 determines a path for transmitting data so as to pass through a non-ROD device more preferentially than a ROD device. To be specific, at the time of using a routing algorithm, the wireless communication system 3 uses a ROD support table as one of elements for determining routing metrics.

Therefore, for example, in the case of determining a path connecting the node #1 and the node #6, the wireless communication system 3 selects a second path passing through the nodes #1, #3, #4 and #6 more preferentially than a first path passing through the nodes #1, #2, #4 and #6 (i.e., determines as a path for transmitting data).

A non-ROD device is set to the active state at all times. On the other hand, a ROD device can be set to the sleep state. Therefore, according to the abovementioned configuration, it is possible to increase the number of ROD devices whose states are set to the sleep state. As a result, it is possible to avoid useless increase of the amount of electric power consumed by the wireless communication system 3.

Further, the wireless communication system 3 according to a modified example 2 of the third exemplary embodiment will be described. The wireless communication system 3 according to the modified example 2 determines a path for transmitting data so as to pass through a node that has a non-ROD device as an adjacent node more preferentially than a node that does not have a non-ROD device as an adjacent node.

A node that has a non-ROD device as an adjacent node is set to the active state at all times. On the other hand, a node that does not have a non-ROD device as an adjacent node can be set to the sleep state. Therefore, according to the abovementioned configuration, it is possible to increase the number of ROD devices whose states are set to the sleep state. As a result, it is possible to avoid useless increase of the amount of electric power consumed by the wireless communication system 3.

Fourth Exemplary Embodiment

Figure 15:
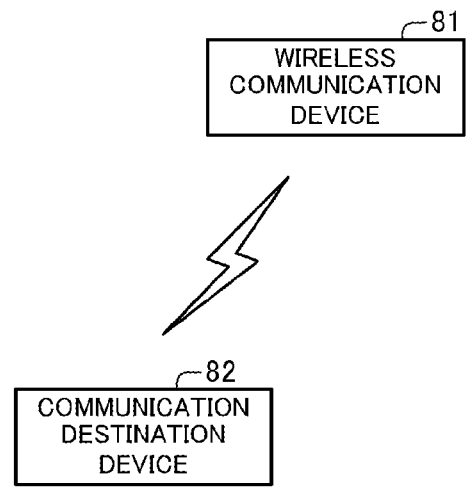
FIG. 15 is a diagram showing the schematic configuration of a wireless communication device according to a fourth exemplary embodiment of the present invention.

Next, a communication system according to a fourth exemplary embodiment of the present invention will be described referring to FIG. 15.

A wireless communication device 81 according to the fourth exemplary embodiment is a device configured to be capable of performing wireless communication with at least one communication destination device 82.

Moreover, this wireless communication device 81 is configured to operate in an operation mode, either a ROD (Radio on Demand) mode or a non-ROD mode.

The non-ROD mode is configured to set a state of the wireless communication device 81 to an active state in which the wireless communication device can perform wireless communication compliant with a predetermined first communication scheme with the communication destination device 82.

The ROD mode is configured to: set the state of the wireless communication device 81 to either the active state or a sleep state in which the wireless communication device can receive an activation instruction signal compliant with a second communication scheme requiring smaller electric power to receive a signal than the first communication scheme and cannot perform wireless communication compliant with the first communication scheme with the communication destination device 82; in a case where the state of the wireless communication device 81 is the active state and a predetermined sleep condition is satisfied, set the state of the wireless communication device 81 to the sleep state; and in a case where the state of the wireless communication device 81 is the sleep state and the wireless communication device receives the activation instruction signal, set the state of the wireless communication device 81 to the active state.

According to this, even when a communication destination device capable of transmitting an activation instruction signal and a communication destination device incapable of transmitting an activation instruction signal both exist, it is possible to securely perform wireless communication with the communication destination devices while reducing the amount of electric power consumed by the wireless communication device 81.

Fifth Exemplary Embodiment (Configuration)

Figure 16:
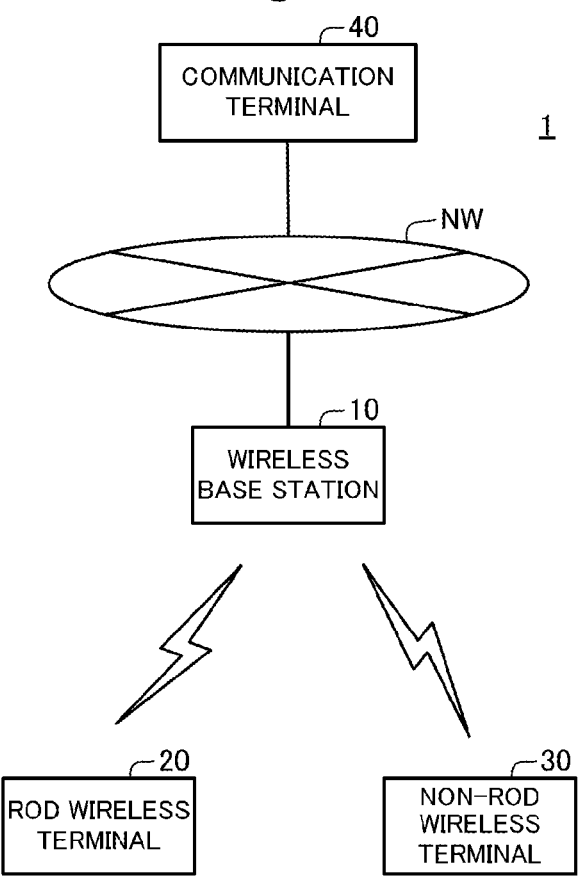
FIG. 16 is a diagram showing the schematic configuration of a wireless communication system according to a fifth exemplary embodiment of the present invention.

As shown in FIG. 16, the wireless communication system 1 according to a fifth exemplary embodiment includes the wireless base station 10, the ROD (Radio on Demand) wireless terminal 20, the non-ROD wireless terminal 30, and the communication terminal 40.

In this exemplary embodiment, the wireless base station 10, the ROD wireless terminal 20 and the non-ROD wireless terminal 30 configure a wireless LAN (Local Area Network) (e.g., IEEE802.11a, IEEE802.11b, IEEE802.11g, IEEE802.11j, IEEE802.11n, or the like).

Meanwhile, the wireless base station 10, the ROD wireless terminal 20 and the non-ROD wireless terminal 30 may configure a mobile communication network, a short-distance wireless communication network (e.g., Bluetooth™, ZigBee™, and the like), WiMAX, a communication network defined by IEEE802.11ah, a communication network defined by IEEE1900.6, or the like.

Further, the wireless base station 10 is referred to as a base station, Access Point, Base Station, or Node B. The ROD wireless terminal 20 and the non-ROD wireless terminal 30 are each referred to as a wireless terminal or Station.

For example, each of the wireless terminals 20 and 30 is a personal computer, a mobile phone terminal, a PHS (Personal Handyphone System), a PDA (Personal Data Assistance, Personal Digital Assistant), a smartphone, a car navigation terminal, a game terminal, or the like.

The wireless base station 10 and the communication terminal 40 are connected so as to be capable of communicating with each other via a communication network (in this exemplary embodiment, a backbone communication network) NW.

The ROD wireless terminal 20 and the non-ROD wireless terminal 30 each perform wireless communication with the wireless base station 10, thereby performing communication with the communication terminal 40 via the wireless base station 10 (e.g., transmitting and receiving communication packets).

In this exemplary embodiment, the ROD wireless terminal 20 is carried by a first user. Therefore, the ROD wireless terminal 20 moves along with movement of the first user. Likewise, the non-ROD wireless terminal 30 is carried by a second user. Therefore, the non-ROD wireless terminal 30 moves along with movement of the second user.

Meanwhile, the wireless communication system 1 may include a plurality of ROD wireless terminals 20. Moreover, the wireless communication system 1 may include a plurality of non-ROD wireless terminals 30.

The wireless base station 10 is configured to be capable of performing wireless communication with the ROD wireless terminal 20 and the non-ROD wireless terminal 30. To be specific, the wireless base station 10 is configured to be capable of performing wireless communication with the wireless terminal 20, 30 that a distance from the wireless base station 10 is shorter than a given threshold distance.

The ROD wireless terminal 20 is configured to be capable of transmitting a predetermined activation instruction signal (a wake-up signal). The non-ROD wireless terminal 30 is configured to be incapable of transmitting an activation instruction signal.

Figure 17:
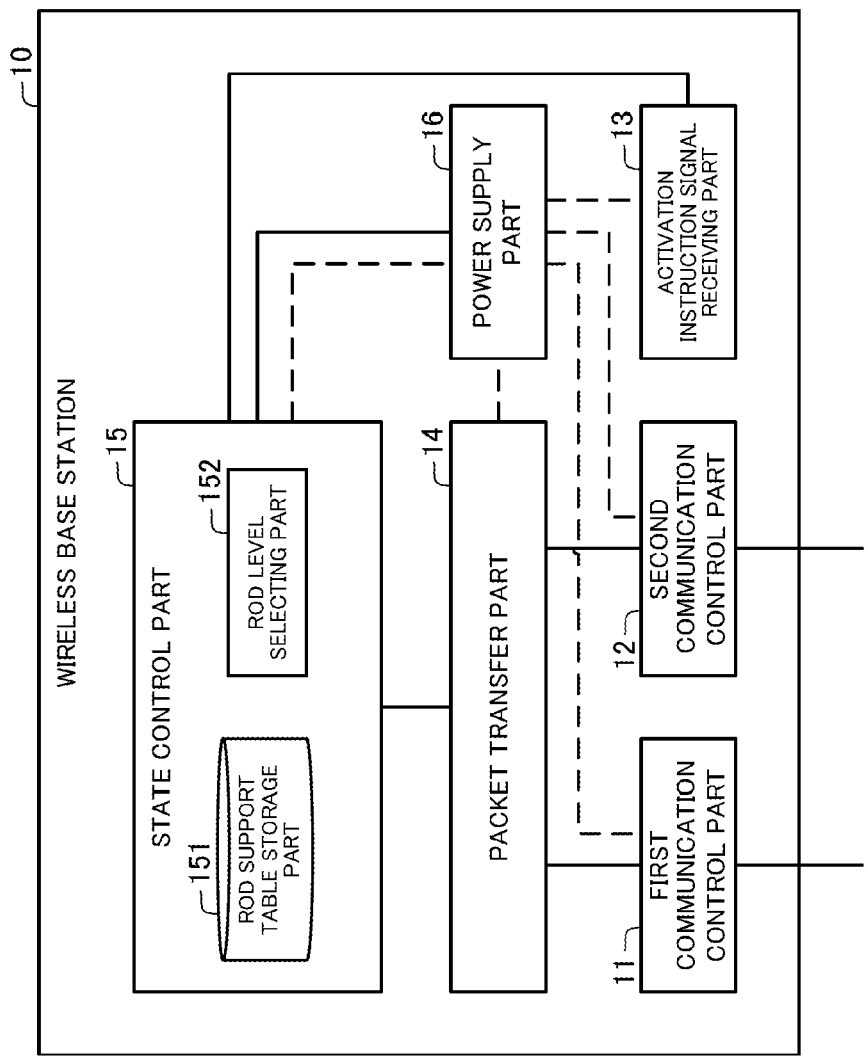
FIG. 17 is a block diagram showing the configuration of a wireless base station according to the fifth exemplary embodiment of the present invention.

To be more specific, as shown in FIG. 17, the wireless base station 10 includes the first communication control part 11, the second communication control part 12, the activation instruction signal receiving part 13, the packet transfer part 14, the state control part (compatible information setting means) 15, and the power supply part 16.

The first communication control part 11 is configured to perform wireless communication compliant with a first communication scheme. In this exemplary embodiment, the first communication scheme is DSSS (Direct Sequence Spread Spectrum), CCK (Complementary Code Keying), OFDM (Orthogonal Frequency Division Multiplexing), or the like.

In this exemplary embodiment, the first communication scheme uses 2.4 GHz bandwidth or 5 GHz bandwidth as a frequency band.

The first communication control part 11 performs wireless communication with the respective wireless terminals 20 and 30.

Further, every time a preset transmission period passes, the first communication control part 11 transmits a beacon signal (a Beacon frame) for notifying that wireless communication with the wireless base station 10 is allowed. In this exemplary embodiment, a beacon signal includes an identifier for identifying the wireless base station 10 (e.g., ESSID (Extended Service Set Identifier), BSSID (Basic Service Set Identifier), or the like).

The second communication control part 12 is configured to perform wired communication (communication via a communication cable). The second communication control part 12 performs communication with the communication terminal 40 via the communication network NW.

The wireless base station 10 includes two communication control parts (the first communication control part 11 and the second communication control part 12), but may include three or more communication control parts.

The activation instruction signal receiving part 13 is configured to receive an activation instruction signal compliant with a second communication scheme. The second communication scheme is a communication scheme that requires smaller electric power for receiving a signal than the first communication scheme.

In this exemplary embodiment, the second communication scheme is OOK (On Off Keying), ASK (Amplitude Shift Keying), FSK (Frequency Shift Keying), or the like. In this exemplary embodiment, the second communication scheme uses the same frequency band as the first communication scheme, as a frequency band.

The packet transfer part 14 is configured to transmit a packet received via the first communication control part 11, via the second communication control part 12. Moreover, the packet transfer part 14 is configured to transmit a packet received via the second communication control part 12, via the first communication control part 11.

Further, upon receiving wireless terminal information to be described later via the first communication control part 11, the packet transfer part 14 outputs the received wireless terminal information to the state control part 15.

The state control part 15 sets the state of the wireless base station 10 to any of operation states including an active state and a plurality of (in this exemplary embodiment, three) sleep states. The active state is a state where it is possible to perform wireless communication compliant with a predetermined first communication scheme with the wireless terminals 20 and 30. Each of the sleep states is a state where it is possible to receive an activation instruction signal compliant with a second communication scheme and it is impossible to perform wireless communication compliant with the first communication scheme with the wireless terminals 20 and 30.

In this exemplary embodiment, the sleep states are a light sleep state (a first sleep state), a middle sleep state (a second sleep state), and a deep sleep state (a third sleep state). The sleep states may be four or more sleep states, or may be two sleep states. Moreover, the state control part 15 may be configured to set the state of the wireless base station 10 to one of operation states including the active state or one sleep state.

The state control part 15 selects (determines) one ROD level from among a plurality of ROD levels, and sets the state of the wireless base station 10 based on the selected ROD level. A ROD level is information for specifying a method of controlling the state of the wireless base station 10.

The state control part 15 has a ROD support table storage part 151 and a ROD level selecting part 152. The ROD support table storage part 151 stores a ROD support table including compatible information as shown in FIG. 18. One piece of compatible information includes wireless terminal identification information for identifying a wireless terminal, ROD information, requirement level information, and communication amount information.

ROD information is information representing whether it is possible to transmit an activation instruction signal. In this exemplary embodiment, "ROD allowed" as ROD information represents that it is possible to transmit an activation instruction signal. "No ROD" as ROD information represents that it is impossible to transmit an activation instruction signal.

Requirement level information is information representing a ROD level required by the user of the wireless terminal 20, 30. Requirement level information is included in wireless terminal information transmitted by the wireless terminal 20, 30. Requirement level information may be information inputted by the user of the wireless terminal 20, 30, or may be information generated by the wireless terminal 20, 30.

Communication amount information is information representing the amount of transmitted data (a communication amount) in wireless communication performed between the wireless terminal 20, 30 and the wireless base station 10. In this exemplary embodiment, communication amount information represents a communication amount during a period from a moment that is a preset time before to a current moment.

The state control part 15 transmits an information transmission request to each of the wireless terminals 20 and 30 via the first communication control part 11. The information transmission request is information of a request for transmission of wireless terminal information.

Upon receiving an information transmission request from the wireless base station 10, the ROD wireless terminal 20 transmits wireless terminal information to the wireless base station 10. On the other hand, the non-ROD wireless terminal 30 does not transmit wireless terminal information.

Upon receiving wireless terminal information from the wireless terminal 20, 30 via the packet transfer part 14 within a preset standby time in response to a transmitted information transmission request, the state control part 15 acquires, with respect to this wireless terminal 20, 30, ROD information representing that this wireless terminal 20, 30 can transmit an activation instruction signal (this wireless terminal is a ROD wireless terminal) and requirement level information included in the wireless terminal information.

On the other hand, in the case of not receiving wireless terminal information from the wireless terminal 20, 30 within the standby time in response to a transmitted information transmission request, the state control part 15 acquires, with respect to this wireless terminal 20, 30, ROD information representing that this wireless terminal 20, 30 cannot transmit an activation instruction signal (this wireless terminal is a non-ROD wireless terminal).

Further, the state control part 15 acquires communication amount information representing the amount of transmitted data (a communication amount) in wireless communication performed between the first communication control part 11 and the wireless terminal 20, 30, for each wireless terminal.

Thus, the state control part 15 acquires compatible information including the acquired ROD information, requirement level information and communication amount information, with respect to each of the wireless terminals 20 and 30. Then, the state control part 15 causes the ROD support table storage part 151 to store the acquired compatible information. Because the compatible information is information representing whether the wireless terminal 20, 30 is a ROD wireless terminal or a non-ROD wireless terminal, and information representing a ROD level required by the wireless terminal 20, 30, the compatible information is also information representing the communication setting of this wireless terminal 20, 30.

The ROD level selecting part 152 selects (determines) one ROD level from among a plurality of ROD levels based on the compatible information stored in the ROD support table storage part 151. In this exemplary embodiment, the ROD levels are four ROD levels representing values from 0 to 3.

The power supply part 16 is configured to be capable of supplying electric power to the first communication control part 11, the second communication control part 12, the activation instruction signal receiving part 13, the packet transfer part 14 and the state control part 15, respectively, via a power supply line. The first communication control part 11, the second communication control part 12, the activation instruction signal receiving part 13, the packet transfer part 14 and the state control part 15 each configure a module that operates by supply of electric power by the power supply part 16.

The power supply part 16 is configured so that its state is switched between a power supply state to supply electric power and a power shutoff state to stop supply of electric power, with respect to the first communication control part 11, the second communication control part 12, the activation instruction signal receiving part 13, the packet transfer part 14 and the state control part 15, respectively.

In this exemplary embodiment, when the state of the power supply part 16 is set to the power supply state with respect to all of the first communication control part 11, the second communication control part 12, the activation instruction signal receiving part 13, the packet transfer part 14 and the state control part 15, it corresponds to that the state of the wireless base station 10 is set to the active state.

Further, when the state of the power supply part 16 is set to the power supply state with respect to the second communication control state 12, the activation instruction signal receiving part 13, the packet transfer part 14 and the state control part 15, and moreover, the state of the power supply part 16 is set to the power shutoff state with respect to the first communication part 11, it corresponds to that the state of the wireless base station 10 is set to the light sleep state.

Alternatively, when the state of the power supply part 16 is set to the power supply state with respect to the first communication control part 11, the second communication control part 12, the activation instruction signal receiving part 13 and the state control part 15, and moreover, the state of the power supply part 16 is set to the power shutoff state with respect to the packet transfer part 14, it may correspond to that the state of the wireless base station 10 is set to the light sleep state.

Further, when the state of the power supply part 16 is set to the power supply state with respect to the second communication control part 12, the activation instruction signal receiving part 13 and the state control part 15, and moreover, the state of the power supply part 16 is set to the power shutoff state with respect to the first communication control part 11 and the packet transfer part 14, it corresponds to that the state of the wireless base station 10 is set to the middle sleep state.

Further, when the state of the power supply part 16 is set to the power supply state with respect to the activation instruction signal receiving part 13 and the state control part 15, and moreover, the state of the power supply part 16 is set to the power shutoff state with respect to the first communication control part 11, the second communication control part 12 and the packet transfer part 14, it corresponds to that the state of the wireless base station 10 is set to the deep sleep state.

Thus, in a case where the state of the wireless base station 10 is set to the deep sleep state, the amount of electric power consumed by the wireless base station 10 (power consumption) is less than in the other sleep states. On the other hand, in a case where the state of the wireless base station 10 is set to the light sleep state, the power consumption is more than in the other sleep states.

In other words, the sleep states are different from each other in power consumption.

Further, a delay time required for changing the state of the wireless base station 10 from the sleep state to the active state is the longest when the state is the deep sleep state, and is the shortest when the state is the light sleep state. In other words, QoS (Quality of Service) for the users of the wireless terminals 20 and 30 is higher in the middle sleep state than in the deep sleep state, and higher in the light sleep state than in the middle sleep state.

In this exemplary embodiment, the state control part 15 previously associates a ROD level indicating 0, which is a ROD incompatibility value, with the active state. Moreover, the state control part 15 previously associates a ROD level indicating 1 with the light sleep state. Moreover, the state control part 15 previously associates a ROD level indicating 2 with the middle sleep state. Moreover, the state control part 15 previously associates a ROD level indicating 3 with the deep sleep state.

The state control part 15 executes non-ROD control when a ROD level selected by the ROD level selecting part 152 indicates the ROD incompatibility value (in this exemplary embodiment, 0). On the other hand, the state control part 15 executes ROD control when a ROD level selected by the ROD level selecting part 152 indicates a value other than the ROD incompatibility value.

In this exemplary embodiment, the non-ROD control is control of setting the state of the wireless base station 10 to the active state at all times.

Further, the ROD control is control of setting the state of the wireless base station 10 to a sleep state associated with a ROD level selected by the ROD level selecting part 152 when the state of the wireless base station 10 is the active state and a given sleep condition is satisfied. Moreover, the ROD control is control of setting the state of the wireless base station 10 to the active state when the state of the wireless base station 10 is the sleep state and an activation instruction signal is received.

For example, the sleep condition is a condition that wireless communication has not been performed during a period from a moment that is a preset first threshold time before a current moment to the current moment. Alternatively, the sleep condition may be a condition that an idle time is longer than a preset threshold.

Herein, the idle time is a time of a period from a moment that wireless communication between the wireless terminal 20, 30 and the wireless base station 10 ends to a moment that next wireless communication starts. For example, the idle time is estimated by the wireless base station 10 by using a method disclosed in Non-Patent Document 1. Non-Patent Document 1: Shoichi Kagawa, Hiroyuki Iizuka, Koichi Yoshimura, Tetsuya Ito, Nobuyoshi Komuro, Shiro Sakata, "Flow-Characteristics Based Sleep Control on Wireless LAN Access Point," IEICE technical report, vol. 110, no. 441, CS2010-124, pp 305-310, March 2011

Further, the state control part 15 may be configured to, when the state of the wireless base station 10 is set to one of the sleep states and a given change condition is satisfied, set the state of the wireless base station 10 to the other sleep states. For example, the change condition is a condition that wireless communication has not been performed during a period from a moment that is a preset second threshold time before a current moment to the current moment.

To be specific, when the state of the wireless base station 10 is the light sleep state and the change condition is satisfied, the state control part 15 sets the state of the wireless base station 10 to the middle sleep state. Moreover, when the state of the wireless base station 10 is the middle sleep state and the change condition is satisfied, the state control part 15 sets the state of the wireless base station 10 to the deep sleep state.

Meanwhile, when the state of the wireless base station 10 is the light sleep state and the change condition is satisfied, the state control part 15 may set the state of the wireless base station 10 to the deep sleep state.

(Operation)

Next, the operation of the abovementioned wireless communication system 1 will be described.

Figure 19:
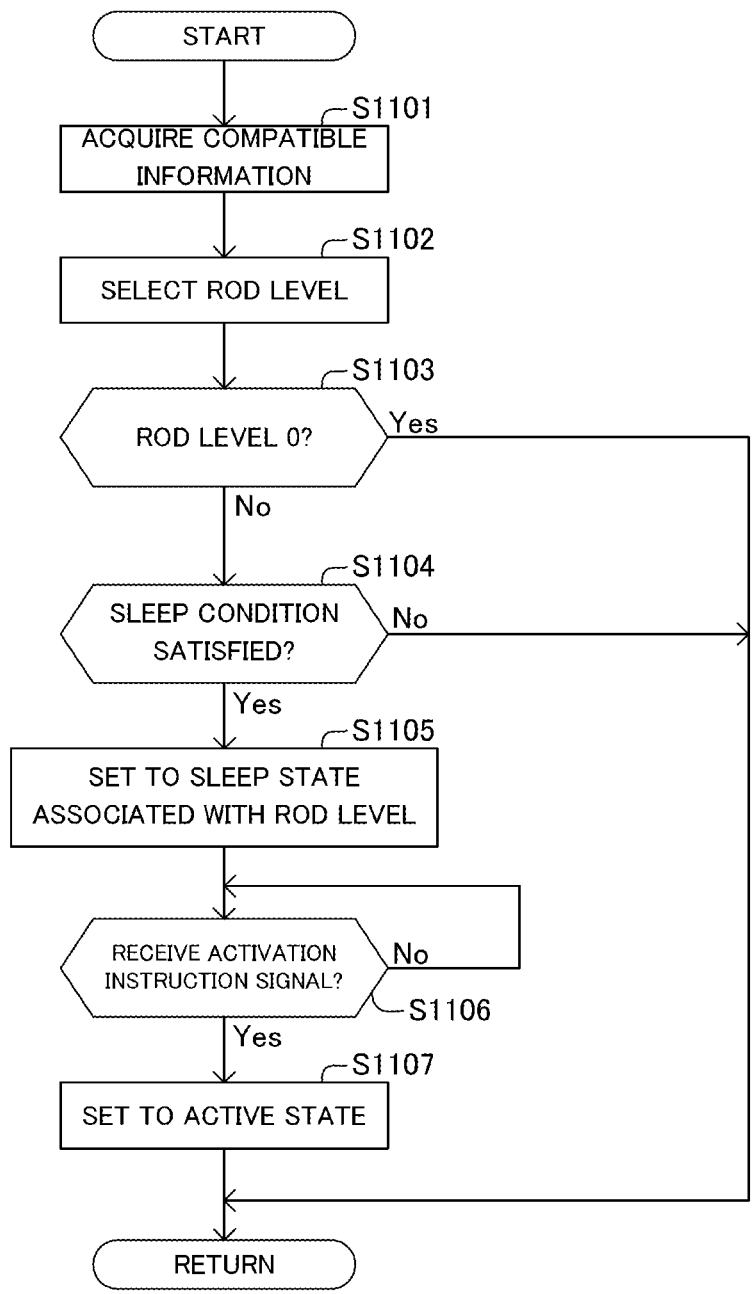
FIG. 19 is a flowchart showing an operation state setting process executed by the wireless base station according to the fifth exemplary embodiment of the present invention.

The wireless base station 10 is configured to execute an operation state setting process shown by a flowchart in FIG. 19 every time a preset execution period passes. Alternatively, the wireless base station 10 may be configured to execute the operation state setting process every time wireless communication with the wireless terminal 20, 30 ends (at a moment that the wireless communication ends).

To be specific, upon starting the operation state setting process, the wireless base station 10 acquires all of the stored compatible information (step S1101). Then, the wireless base station 10 selects one ROD level from among a plurality of ROD levels (in this exemplary embodiment, ROD levels indicating values from 0 to 3, respectively) based on the acquired compatible information (step S1102).

For example, the wireless base station 10 selects a ROD level indicating a smaller value as values indicated by requirement level information become smaller. The wireless base station 10 may select a ROD level indicating a smaller value as the average of values indicated by requirement level information becomes smaller.

The wireless base station 10 selects a ROD level indicating a value that is the closest to the average value of requirement level information. Alternatively, the wireless base station 10 may select a ROD level based on a ROD compatibility ratio, which is a ratio of the number of ROD information representing "ROD allowed" (the number of ROD wireless terminals) to the total number of ROD information (the number of wireless terminals capable of performing wireless communication with the wireless base station 10).

The ROD compatibility ratio has a strong correlation with QoS for the users of all the wireless terminals 20 and 30 capable of performing wireless communication with the wireless base station 10. Therefore, according to the abovementioned configuration, it is possible to properly select a ROD level so as to sufficiently increase QoS for the users of all the wireless terminals 20 and 30 capable of performing wireless communication with the wireless base station 10.

To be specific, it is favorable that the wireless base station 10 selects a ROD level indicating a larger value (i.e., a ROD level with smaller power consumption) as the ROD compatibility ratio becomes larger.

Even if QoS for the user of the non-ROD wireless terminal 30 decreases as the ROD compatibility ratio increases, QoS for the users of all the wireless terminals 20 and 30 capable of performing wireless communication with the wireless base station 10 can be kept sufficiently high. Therefore, according to the abovementioned configuration, it is possible to reduce power consumption while keeping QoS for the users of all the wireless terminals 20 and 30 capable of performing wireless communication with the wireless base station 10 sufficiently high.

For example, the wireless base station 10 may select the ROD level indicating 3 in a case where the ROD compatibility ratio is equal to or more than 80%, select the ROD level indicating 2 in a case where the ROD compatibility ratio is equal to or more than 50% and less than 80%, select the ROD level indicating 1 in a case where the ROD compatibility ratio is equal to or more than 20% and less than 50%, and select the ROD level indicating 0 in a case where the ROD compatibility ratio is less than 20%.

Further, the wireless base station 10 may be configured to select a ROD level indicating a larger value as a communication amount represented by communication amount information becomes smaller. Alternatively, the wireless base station 10 may select a ROD level indicating a larger value as the average of communication amounts represented by communication amount information becomes smaller.

Further, the wireless base station 10 may select a ROD level based on all of requirement level information, ROD information and communication amount information, or based on any combination of two of them.

Next, the wireless base station 10 determines whether the selected ROD level indicates 0 or not (step S1103). In a case where the selected ROD level indicates 0, the wireless base station 10 determines "Yes" and ends the operation state setting process. That is, in this case, the wireless base station 10 keeps the state of the wireless base station 10 to the active state.

On the other hand, in a case where the selected ROD level indicates a value other than 0, the wireless base station 10 determines "No" in step S1103 and proceeds to step S1104. Then, the wireless base station 10 determines whether the sleep condition is satisfied or not.

In a case where the sleep condition is not satisfied, the wireless base station 10 determines "No" and ends the operation state setting process. That is, in this case, the wireless base station 10 keeps the state of the wireless base station 10 to the active state.

On the other hand, in a case where the sleep condition is satisfied, the wireless base station 10 determines "Yes" in step S1104 and proceeds to step S1105. Then, the wireless base station 10 sets (changes) the state of the wireless base station 10 to a sleep state associated with the selected ROD level.

After that, the wireless base station 10 keeps the state of the wireless base station 10 to the sleep state until receiving an activation instruction signal (step S1106). Then, upon receiving an activation instruction signal, the wireless base station 10 determines "Yes" in step S1106, and proceeds to step S1107 to set the state of the wireless base station 10 to the active state.

After that, the wireless base station 10 ends the operation state setting process.

As described above, the wireless base station 10 according to the first exemplary embodiment is configured to select one ROD level from among a plurality of ROD levels and set the state of the wireless base station 10 based on the selected ROD level.

According to this, by properly selecting the ROD level depending on the situation, it is possible to properly set the state of the wireless base station 10 depending on the situation.

Further, the wireless base station 10 according to the first exemplary embodiment is configured to execute the non-ROD control in a case where a selected ROD level indicates the ROD incompatibility value (in this exemplary embodiment, 0), and on the other hand, execute the ROD control in a case where a selected ROD level indicates a value other than the ROD incompatibility value.

According to this, by selecting a ROD level indicating the ROD incompatibility value, it is possible to securely perform wireless communication with a wireless terminal incapable of transmitting an activation instruction signal (the non-ROD wireless terminal 30). Moreover, by selecting a ROD level that indicates a value other than the ROD incompatibility value, it is possible to reduce the amount of electric power consumed by the wireless base station 10.

In addition, for the wireless base station 10 according to the first exemplary embodiment, the ROD control is control of, when the state of the wireless base station 10 is the active state and the sleep condition is satisfied, setting the state of the wireless base station 10 to a sleep state previously associated with a selected ROD level.

It is usual that it is possible to change the state of the wireless base station 10 to the active state more speedily from a sleep state that power consumption, which is the amount of electric power consumed by the wireless base station 10, is larger. Therefore, it is usual that QoS (Quality of Service) for the user of the wireless terminal 20, 30 is higher in a sleep state with larger power consumption.

Therefore, according to the wireless base station 10, by selecting a ROD level associated with a proper sleep state depending on the situation, it is possible to reduce power consumption while making QoS for the user of the wireless terminal 20, 30 sufficiently high.

Figure 20:
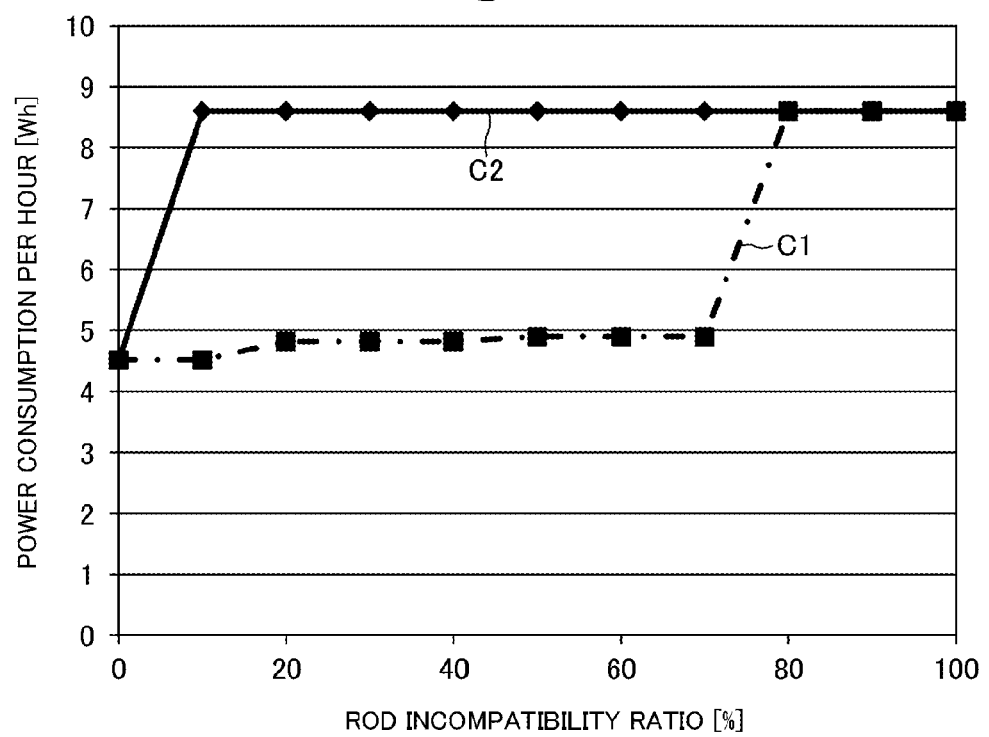
FIG. 20 is a graph showing change of the power consumption of a wireless base station per hour with respect to a ROD incompatibility ratio.

FIG. 20 is a graph showing change of power consumption of the wireless base station 10 per hour with respect to a ROD incompatibility ratio. The ROD incompatibility ratio is a ratio of the number of non-ROD wireless terminals to the number of wireless terminals capable of performing wireless communication with the wireless base station 10. A dashed-dotted line C1 is a graph for the wireless base station 10 relating to a first operation example. A solid line C2 is a graph for the wireless base station 10 relating to a second operation example.

The wireless base station 10 relating to the second operation example is configured to select the ROD level indicating 0 at all times in a case where the ROD incompatibility ratio is larger than 0. That is, the wireless base station 10 relating to the second operation example can securely perform wireless communication with the wireless terminal 20, 30.

The wireless base station 10 relating to the first operation example is configured to select the ROD levels indicating values from 0 to 3 in a case where the ROD incompatibility ratio is less than 20%. In this case, it is assumed that the wireless base station 10 is kept to the active state for 50% of one hour, kept to the light sleep state for 10%, kept to the middle sleep state for 10%, and kept to the deep sleep state for 30%.

Further, the wireless base station 10 relating to the first operation example is configured to select the ROD levels indicating values from 0 to 2 in a case where the ROD incompatibility ratio is equal to or more than 20% and less than 50%. In this case, it is assumed that the wireless base station 10 is kept to the active state for 50% of one hour, kept to the light sleep state for 10%, and kept to the middle sleep state for 40%.

Further, the wireless base station 10 relating to the first operation example is configured to select the ROD levels indicating values from 0 to 1 in a case where the ROD incompatibility ratio is equal to or more than 50% and less than 80%. In this case, it is assumed that the wireless base station 10 is kept to the active state for 50% of one hour, and kept to the light sleep state for 50%.

Further, the wireless base station 10 relating to the first operation example is configured to select the ROD level indicating 0 at all times in a case where the ROD incompatibility ratio is equal to or more than 80%.

Herein, it is assumed that the wireless base station 10 consumes electric power of 8.6 W when the state is set to the active state, consumes electric power of 1.2 W when the state is set to the light sleep state, consumes electric power of 1.0 W when the state is set to the middle sleep state, and consumes electric power of 0.0001 W when the state is set to the deep sleep state.

The state of the wireless base station 10 relating to the second operation example is set to the sleep state only when the ROD incompatibility ratio is 0%. Therefore, only in this case, it is possible to reduce power consumption. On the other hand, the wireless base station 10 relating to the first operation example can reduce power consumption in a case where the ROD incompatibility ratio is less than 80%.

Modified Example 1 of Fifth Exemplary Embodiment

Next, a wireless communication system according to a modified example 1 of the fifth exemplary embodiment of the present invention will be described. The wireless communication system according to the modified example 1 is different from the wireless communication system according to the fifth exemplary embodiment in selecting a ROD level based on policy information. Therefore, a description will be made below focusing on the different point.

Figure 21:
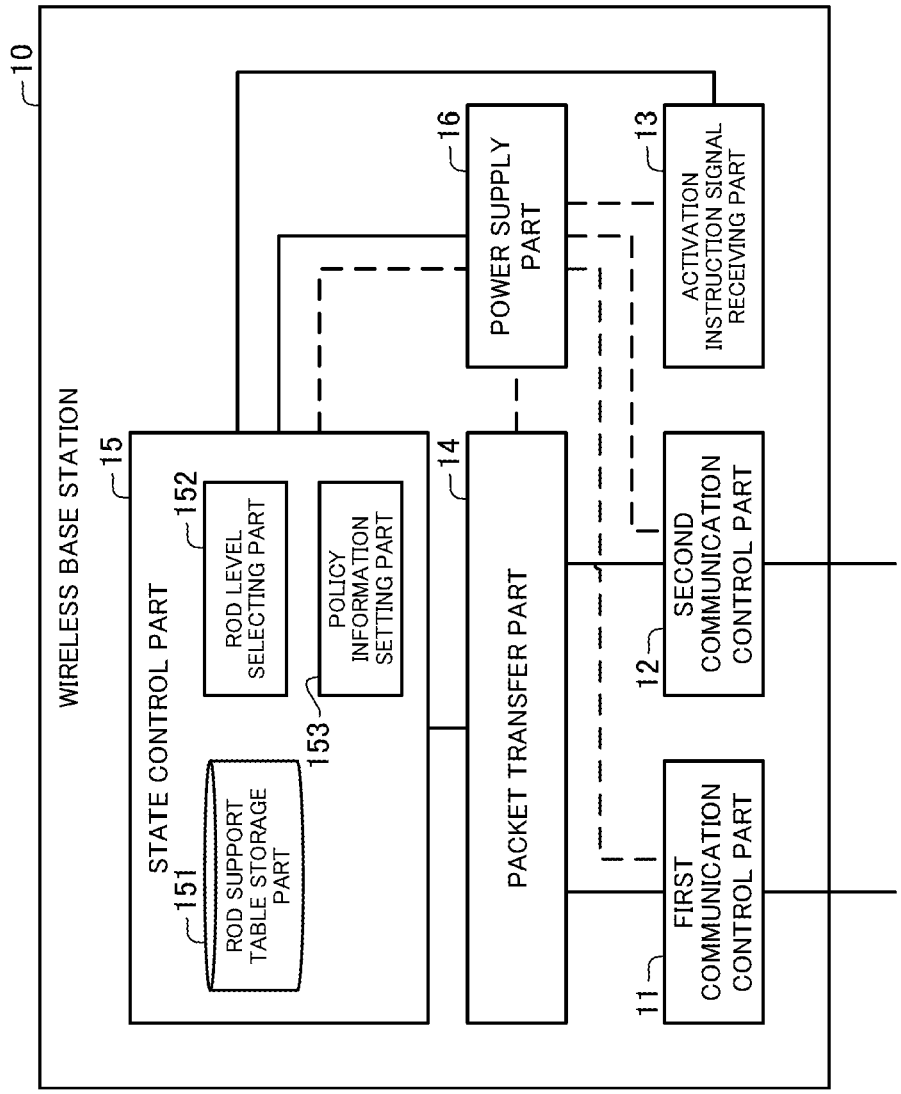
FIG. 21 is a block diagram showing the configuration of a wireless base station according to a modified example 1 of the fifth exemplary embodiment of the present invention.

As shown in FIG. 21, the wireless base station 10 according to the modified example 1 has the same configuration as the wireless base station 10 according to the fifth exemplary embodiment. Moreover, the state control part 15 according to the modified example 1 includes a policy information setting part 153.

The policy information setting part 153 accepts policy information inputted by the user of the wireless base station 10, and stores the accepted policy information. In this example, the policy information setting part 153 stores only one policy information.

Alternatively, the policy information setting part 153 may be configured to receive policy information inputted by a user of an external device (e.g., the wireless terminal 20, 30, the communication terminal 40, or the like) and store the received polity information.

Policy information is information for determining the order of preferentially selecting a ROD level. For example, the policy information is information representing "non-ROD support first," "deep sleep first" or "light sleep first."

The policy information representing "non-ROD support first" represents most preferentially selecting the ROD level indicating 0 in order to securely perform wireless communication with the non-ROD wireless terminal 30 without reducing power consumption.

The policy information representing "deep sleep first" represents, in the case of setting the state of the wireless base station 10 to the sleep state, most preferentially selecting the ROD level indicating 3 in order to reduce power consumption more largely by setting the state to the deep sleep state.

The policy information representing "light sleep first" represents, in the case of setting the state of the wireless base station 10 to the sleep state, most preferentially selecting the ROD level indicating 1 in order to shortening a delay time at the time of change of the state to the active state by setting the state to the light sleep state.

Alternatively, the policy information may be information representing "power reduction first." The policy information representing "power reduction first" represents setting the state of the wireless base station 10 to the sleep state at all times during a period that wireless communication is not performed. In this case, it is favorable that the state control part 15 is configured to set the state of the wireless base station 10 to the sleep state at all times during a period that wireless communication is not performed in the case of storing the policy information representing "power reduction first."

The state control part 15 selects a ROD level based on the policy information stored in the policy information setting part 153.

According to the wireless base station 10 of the modified example 1, it is possible to properly select a ROD level by properly setting policy information.

The policy information setting part 153 may be configured to store a plurality of policy information. In this case, it is favorable that the state control part 15 is configured to select a ROD level based on the plurality of stored policy information.

Modified Example 2 of Fifth Exemplary Embodiment

Next, a wireless communication system according to a modified example 2 of the fifth exemplary embodiment of the present invention will be described. The wireless communication system according to the modified example 2 is different from the wireless communication system according to the modified example 1 described above in selecting a ROD level based on both policy information and compatible information. Therefore, a description will be made below focusing on the different point.

The state control part 15 according to the modified example 2 selects a ROD level based on both the compatible information stored in the ROD support table storage part 151 and the policy information stored in the policy information setting part 153.

Figure 22:
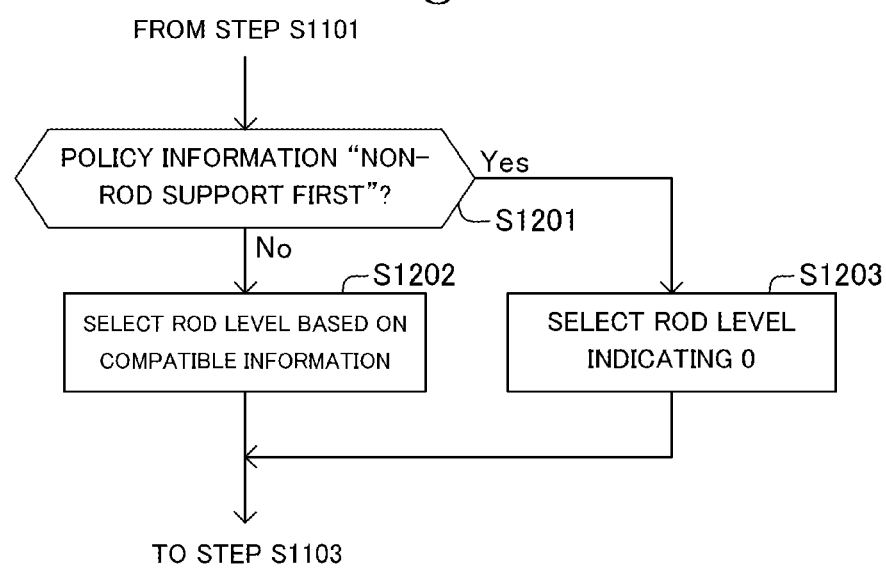
FIG. 22 is a flowchart showing part of an operation state setting process executed by a wireless base station according to a modified example 2 of the fifth exemplary embodiment of the present invention.

In this example, the wireless base station 10 executes, instead of the operation state setting process shown in FIG. 19, a process in which step S1102 of FIG. 19 is replaced with steps S1201 to S1203 of FIG. 22.

To be specific, in step S1201, the wireless base station 10 determines whether the stored policy information represents "non-ROD support first" or not.

In a case where the stored policy information represents "non-ROD support first," the wireless base station 10 determines "Yes" and proceeds to step S1203 to select the ROD level representing 0, and thereafter, proceeds to step S1103.

In a case where the stored policy information does not represent "non-ROD support first," the wireless base station 10 determines "No" in step S1201 and proceeds to step S1202 to select a ROD level based on the acquired compatible information as in step S1102, and thereafter, proceeds to step S1103.

The wireless base station 10 with such a configuration can also exert the same effect as the wireless base station 10 according to the modified example 1.

Modified Example 3 of Fifth Exemplary Embodiment

Next, a wireless communication system according to a modified example 3 of the fifth exemplary embodiment of the present invention will be described. The wireless communication system according to the modified example 3 is different from the wireless communication system according to the modified example 1 described above in selecting a ROD level based on a plurality of policy information. Therefore, a description will be made below focusing on the different point.

The policy information setting part 153 accepts a plurality of policy information and stores the plurality of accepted policy information.

Moreover, the policy information setting part 153 accepts selection basis information for selecting policy information and stores the accepted selection basis information.

For example, the selection basis information represents selecting the policy information representing "non-ROD support first" in a case where the ROD compatibility ratio is equal to or less than a preset reference value, and on the other hand, selecting the policy information representing "deep sleep first" in a case where the ROD compatibility ratio is larger than the preset reference value.

The state control part 15 selects one policy information from among the stored policy information based on the stored selection basis information, and selects a ROD level based on the selected policy information.

According to this, it is possible to set policy information with more flexibility. Therefore, it is possible to properly select a ROD level.

Modified Example 4 of Fifth Exemplary Embodiment

Next, a wireless communication system according to a modified example 4 of the fifth exemplary embodiment of the present invention will be described. The wireless communication system according to the modified example 4 is different from the wireless communication system according to the fifth exemplary embodiment described above in, when shifting from the active state to the sleep state, gradually changing the sleep state so as to gradually decrease power consumption. Therefore, a description will be made below focusing on the different point.

When shifting from the active state to the sleep state, the state control part 15 according to the modified example 4 gradually changes the sleep state so as to gradually decrease power consumption.

To be specific, in a case where a sleep state previously associated with a selected ROD level is the deep sleep state, when the sleep condition is satisfied, the state control part 15 changes the state of the wireless base station 10 from the active state to the light sleep state, the middle sleep state, and the deep sleep state in this order.

For example, as shown in FIG. 23, in a case where the sleep condition is satisfied at a moment t1 and the ROD level associated with the deep sleep state is selected, the state control part 15 changes the state of the wireless base station 10 from the active state to the light sleep state. Then, the state control part 15 maintains the light sleep state for a preset standby time, and thereafter, changes the state of the wireless base station 10 from the light sleep state to the middle sleep state.

Next, the state control part 15 maintains the middle sleep state for a preset standby time, and thereafter, changes the state of the wireless base station 10 from the middle sleep state to the deep sleep state. After that, when the wireless base station 10 receives an activation instruction signal, the state control part 15 changes the state of the wireless base station 10 from the deep sleep state to the active state.

Further, in a case where a sleep state previously associated with a selected ROD level is the middle sleep state, when the sleep condition is satisfied, the state control part 15 changes the state of the wireless base station 10 from the active state to the light sleep state and the middle sleep state in this order.

For example, as shown in FIG. 23, in a case where the sleep condition is satisfied at a moment t2 and the ROD level associated with the middle sleep state is selected, the state control part 15 changes the state of the wireless base station 10 from the active state to the light sleep state. Then, the state control part 15 maintains the light sleep state for a preset standby time, and thereafter, changes the state of the wireless base station 10 from the light sleep state to the middle sleep state.

After that, when the wireless base station 10 receives an activation instruction signal, the state control part 15 changes the state of the wireless base station 10 from the deep sleep state to the active state.

According to this, in a case where the wireless base station 10 receives an activation instruction signal immediately after the sleep condition is satisfied, it is possible to make a delay time required to change the state of the wireless base station 10 to the active state relatively short. Therefore, it is possible to increase QoS for the users of the wireless terminals 20 and 30.

Modified Example 5 of Fifth Exemplary Embodiment

Next, a wireless communication system according to a modified example 5 of the fifth exemplary embodiment of the present invention will be described. The wireless communication system according to the modified example 5 is different from the wireless communication system according to the fifth exemplary embodiment in, when shifting from the sleep state to the active state, gradually changing the sleep state so as to gradually increase power consumption. Therefore, a description will be made below focusing on the different point.

The state control part 15 according to the modified example 5 gradually changes the sleep state so as to gradually increase power consumption when shifting from the sleep state to the active state.

To be specific, the wireless base station 10 estimates a moment when next wireless communication starts (a next communication starting moment). For example, the wireless base station 10 estimates the next communication starting moment by using a method disclosed in Non-Patent Document 1.

In a case where the state of the wireless base station 10 is the deep sleep state, the state control part 15 changes the state of the wireless base station 10 from the deep sleep state to the middle sleep state, the light sleep state and the active state in this order, at a moment that is a present preparation time before the estimated next communication starting moment.

For example, as shown in FIG. 24, in a case where the state of the wireless base station 10 is the deep sleep state, the state control part 15 changes the state of the wireless base station 10 from the deep sleep state to the middle sleep state, at a moment that is the preparation time before a next communication starting moment t1. Then, the state control part 15 maintains the middle sleep state for a preset standby time, and thereafter, changes the state of the wireless base station 10 from the middle sleep state to the light sleep state.

After that, when the wireless base station 10 receives an activation instruction signal, the state control part 15 changes the state of the wireless base station 10 from the light sleep state to the active state.

Further, in a case where the state of the wireless base station 10 is the middle sleep state, the state control part 15 changes the state of the wireless base station 10 from the middle sleep state to the light sleep state and the active state in this order, at a moment that is a preset preparation time before the estimated next communication starting moment.

For example, as shown in FIG. 24, in a case where the state of the wireless base station 10 is the middle sleep state, the state control part 15 changes the state of the wireless base station 10 from the middle sleep state to the light sleep state, at a moment that is the preparation time before a next communication starting moment t2.

After that, when the wireless base station 10 receives an activation instruction signal, the state control part 15 changes the state of the wireless base station 10 from the light sleep state to the active state.

It is usual that it is possible to change the state of the wireless base station 10 to the active state more speedily from a sleep state with larger power consumption. Therefore, according to the above configuration, it is possible to speedily change the state of the wireless base station 10 to the active state when the wireless base station 10 receives an activation instruction signal.

Modified Example 6 of Fifth Exemplary Embodiment

Next, a wireless communication system according to a modified example 6 of the fifth exemplary embodiment of the present invention will be described. The wireless communication system according to the modified example 6 is different from the wireless communication system according to the fifth exemplary embodiment in gradually changing the sleep state so as to gradually decrease power consumption when shifting from the active state to the sleep state, and gradually changing the sleep state so as to gradually increase power consumption when shifting from the sleep state to the active state. Therefore, a description will be made below focusing on the different point.

The state control part 15 according to the modified example 6 gradually changes the sleep state so as to gradually decrease power consumption when shifting from the active state to the sleep state, and gradually changes the sleep state so as to gradually increase power consumption when shifting from the sleep state to the active state. That is, the state control part 15 according to the modified example 6 has a function of combination of the state control part 15 according to the modified example 4 and the state control part 15 according to the modified example 5.

Therefore, for example, as shown in FIG. 25, in a case where the sleep condition is satisfied at a moment t1 and the ROD level associated with the deep sleep state is selected, the state control part 15 changes the state of the base station 10 from the active state to the light sleep state. Then, the state control part 15 maintains the light sleep state for a preset standby time, and thereafter, changes the state of the wireless base station 10 from the light sleep state to the middle sleep state.

Next, the state control part 15 maintains the middle sleep state for a preset standby time, and thereafter, changes the state of the wireless base station 10 from the middle sleep state to the deep sleep state.

After that, at a moment that is the preparation time before a next communication starting moment t2, the state control part 15 changes the state of the wireless base station 10 from the deep sleep state to the middle sleep state. Then, the state control part 15 maintains the middle sleep state for a preset standby time, and thereafter, changes the state of the wireless base station 10 from the middle sleep state to the light sleep state.

After that, when the wireless base station 10 receives an activation instruction signal, the state control part 15 changes the state of the wireless base station 10 from the light sleep state to the active state.

Further, for example, as shown in FIG. 25, in a case where the sleep condition is satisfied at a moment t3 and the ROD level associated with the middle sleep state is selected, the state control part 15 changes the state of the base station 10 from the active state to the light sleep state. Then, the state control part 15 maintains the light sleep state for a preset standby time, and thereafter, changes the state of the wireless base station 10 from the light sleep state to the middle sleep state.

After that, at a moment that is the preparation time before a next communication starting moment t4, the state control part 15 changes the state of the wireless base station 10 from the middle sleep state to the light sleep state. After that, when the wireless base station 10 receives an activation instruction signal, the state control part 15 changes the state of the wireless base station 10 from the light sleep state to the active state.

According to this, it is possible to exert both the effect exerted by the wireless base station 10 according to the modified example 4 and the effect exerted by the wireless base station 10 according to the modified example 5.

Sixth Exemplary Embodiment

Next, a wireless communication system according to a sixth exemplary embodiment of the present invention will be described. The wireless communication system according to the sixth exemplary embodiment is different from the wireless communication system according to the fifth exemplary embodiment in estimating an idle time and a next communication time and setting the state of the wireless base station based on the estimated idle time and next communication time. Therefore, a description will be made below focusing on the different point.

The state control part 15 estimates an idle time at a moment of end of wireless communication with the wireless terminal 20, 30. The idle time is a time of a period from a moment when wireless communication between the wireless terminal 20, 30 and the wireless base station 10 ends to a moment when next wireless communication starts. For example, the state control part 15 estimates the idle time by using a method disclosed in Non-Patent Document 1.

In a case where the state of the wireless base station 10 is the active state, when an estimated idle time is longer than a preset first threshold, the state control part 15 sets the state of the wireless base station 10 to a sleep state associated with a selected ROD level.

On the other hand, in a case where the state of the wireless base station 10 is the active state, when the estimated idle time is shorter than the first threshold, the state control part 15 keeps the wireless base station 10 to the active state.

In other words, in this exemplary embodiment, the sleep condition is a condition that an estimated idle time is longer than the preset first threshold.

Therefore, for example, it is assumed that the state control part 15 estimates an idle time T1 at a moment t1 when wireless communication with the wireless terminal 20, 30 ends as shown in FIG. 26. Moreover, it is assumed that the state control part 15 estimates an idle time T2 at a moment t3 when wireless communication with the wireless terminal 20, 30 ends. Herein, it is assumed that the idle time T1 is shorter than the first threshold and the idle time T2 is longer than the first threshold.

In this case, the state control part 15 keeps the state of the wireless base station 10 to the active state at the moment t1. That is, the state control part 15 keeps the state of the wireless base station 10 to the active state during a period from the moment t1 to a moment t2.

On the other hand, the state control part 15 changes the state of the wireless base station 10 to the sleep state at the time t3. That is, the state control part 15 sets the state of the wireless base station 10 to the sleep state during a period from the moment t3 to a moment t4.

Further, when the wireless base station 10 receives an activation instruction signal, the state control part 15 estimates a next communication time. Alternatively, the state control part 15 may be configured to estimate a next communication time at a moment when wireless communication with the wireless terminal 20, 30 ends.

The next communication time is a time of a period from start of next communication, which is next wireless communication, to end of the next communication in a case where wireless communication between the wireless terminal 20, 30 and the wireless base station 10 ends. For example, the state control part 15 estimates the next communication time by using a method disclosed in Non-Patent Document 1.

In a case where an estimated next communication time is shorter than a preset second threshold, the state control part 15 keeps the state of the wireless base station 10 to the sleep state when receiving an activation instruction signal transmitted by the ROD wireless terminal 20 to start next communication.

On the other hand, in a case where an estimated next communication time is longer than the second threshold, the state control part 15 sets the state of the wireless base station 10 to the active state when receiving an activation instruction signal transmitted by the ROD wireless terminal 20 to start next communication.

Therefore, for example, it is assumed that, as shown in FIG. 27, in a case where the state of the wireless base station 10 is set to the sleep state, the state control part 15 estimates a next communication time T3 at a moment t5 when an activation instruction signal is received. Moreover, it is assumed that, in a case where the state of the wireless base station 10 is set to the sleep state, the state control part 15 estimates a next communication time T4 at a moment when an activation instruction signal is received. Herein, it is assumed that the next communication time T3 is shorter than the second threshold and the next communication time T4 is longer than the second threshold.

In this case, the state control part 15 keeps the state of the wireless base station 10 to the sleep state at the moment t5. That is, the state control part 15 keeps the state of the wireless base station 10 to the sleep state during a period from the moment t5 to a moment t6.

On the other hand, the state control part 15 changes the state of the wireless base station 10 to the active state at a moment t7. That is, the state control part 15 sets the state of the wireless base station 10 to the active state during a period from the moment t7 to a moment t8.

(Operation)

Next, the operation of the abovementioned wireless communication system 1 will be described more specifically.

Figure 28:
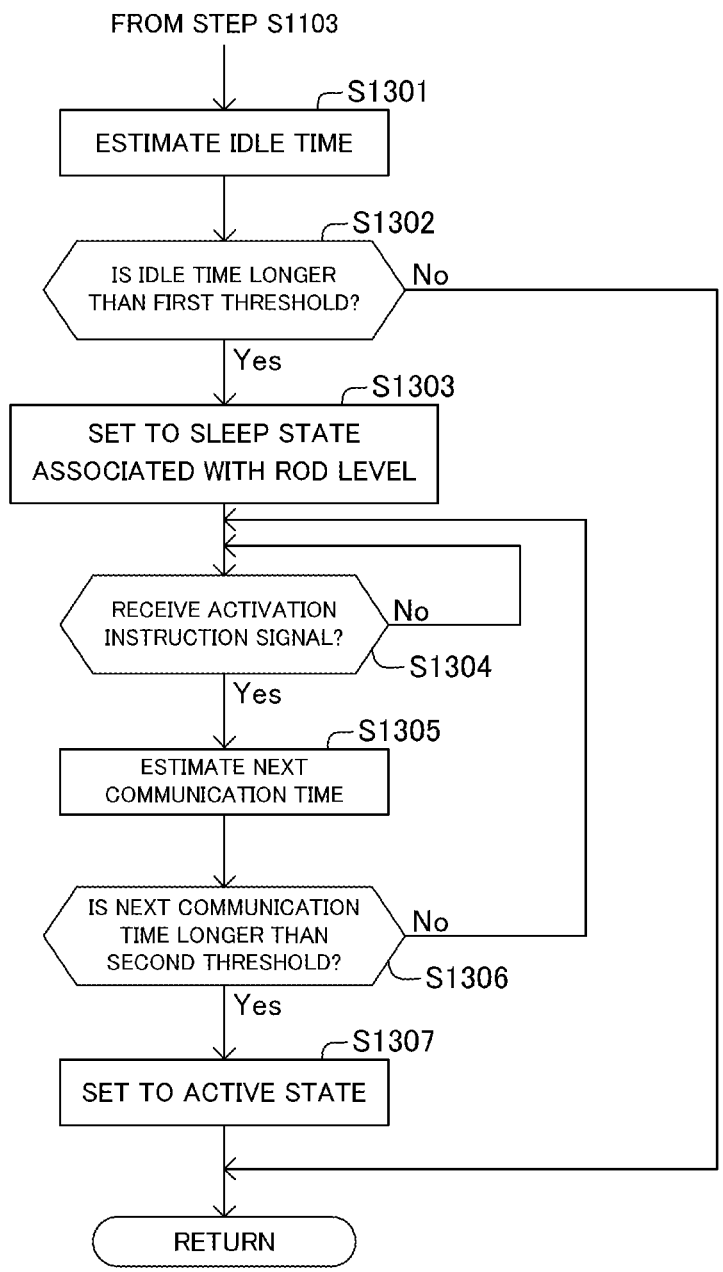
FIG. 28 is a flowchart showing part of an operation state setting process executed by the wireless base station according to the sixth exemplary embodiment of the present invention.

In this exemplary embodiment, the wireless base station 10 executes, instead of the operation state setting process shown in FIG. 19, a process in which steps S1104 to S1107 of FIG. 19 are replaced with steps S1301 to S1307 in FIG. 28.

Further, the wireless base station 10 executes the operation state setting process every time wireless communication with the wireless terminal 20, 30 ends (at a moment when the wireless communication ends).

Therefore, when determining "No" in step S1103, the wireless base station 10 proceeds to step S1301. Then, the wireless base station 10 estimates the idle time. Next, the wireless base station 10 determines whether the estimated idle time is longer than a first threshold or not (step S1302).

When the estimated idle time is equal to or less than the first threshold, the wireless base station 10 determines "No" and ends the operation state setting process.

On the other hand, when the estimated idle time is longer than the first threshold, the wireless base station 10 determines "Yes" and proceeds to step S1303.

Then, the wireless base station 10 sets the state of the wireless base station 10 to a sleep state associated with the selected ROD level. Next, the wireless base station 10 stands by until receiving an activation instruction signal (step S304).

Then, upon receiving an activation instruction signal, the wireless base station 10 determines "Yes" and proceeds to step S1305 to estimate a next communication time. Subsequently, the wireless base station 10 determines whether the estimated next communication time is longer than a second threshold or not (step S1306).

When the estimated next communication time is equal to or less than the second threshold, the wireless base station 10 determines "No" and returns to step S1304 to stand by until receiving an activation instruction signal again.

On the other hand, when the estimated next communication time is longer than the second threshold, the wireless base station 10 determines "Yes" in step S1306 and proceeds to step S1307 to set the state of the wireless base station 10 to the active state. After that, the wireless base station 10 ends the operation state setting process.

As described above, the wireless base station 10 according to the sixth exemplary embodiment sets the state of the wireless base station 10 to the sleep state when the estimated idle time is longer than the preset first threshold.

It requires a given delay time to change the state of the wireless base station 10. Therefore, in a case where an idle time is relatively short, there is a relatively high possibility that power consumption cannot be reduced sufficiently even if the state of the wireless base station 10 is set to the sleep state. Thus, according to the abovementioned configuration, it is possible to avoid that the state of the wireless base station 10 is wastefully changed to the sleep state.

In addition, in a case where the estimated next communication time is shorter than the second threshold, the wireless base station 10 according to the sixth exemplary embodiment keeps the state of the wireless base station 10 to the sleep state when receiving an activation instruction signal transmitted by the ROD wireless terminal 20 to start next communication.

It requires a given delay time to change the state of the wireless base station 10. Therefore, in a case where a next communication time is relatively short, there is a relatively high possibility that next communication cannot be executed. Moreover, in this case, the amount of data transmitted in the next communication is relatively small. Thus, according to the abovementioned configuration, it is possible to avoid that the state of the wireless base station 10 is wastefully changed to the active state.

Modified Example 1 of Sixth Exemplary Embodiment

Next, a wireless communication system according to a modified example 1 of the sixth exemplary embodiment of the present invention will be described. The wireless communication system according to the modified example 1 is different from the wireless communication system according to the sixth exemplary embodiment in setting the first threshold and the second threshold based on a selected ROD level. Therefore, a description will be made below focusing on the different point.

The state control part 15 uses a value previously associated with a selected ROD level, as the first threshold. In this example, the state control part 15 uses a value becoming smaller as a value represented by a selected ROD level becomes larger, as the first threshold.

As the first threshold becomes smaller, a period that the state of the wireless base station 10 is set to the sleep state becomes longer. Therefore, according to the abovementioned configuration, it is possible to make power consumption less as a value represented by a selected ROD level becomes larger.

Further, the state control part 15 uses a value previously associated with a selected ROD level, as the second threshold. In this example, the state control part 15 uses a value becoming larger as a value represented by a selected ROD level becomes larger, as the second threshold.

As the second threshold becomes larger, a period that the state of the wireless base station 10 is set to the sleep state becomes longer. Therefore, according to the abovementioned configuration, it is possible to make power consumption less as a value represented by a selected ROD level becomes larger.

The wireless base station 10 may be configured to determine only one of the first and second thresholds based on a ROD level.

Seventh Exemplary Embodiment

Next, a wireless base station according to a seventh exemplary embodiment of the present invention will be described referring to FIG. 29.

A wireless base station 110 according to the seventh exemplary embodiment is a wireless base station configured to be capable of performing wireless communication with at least one wireless terminal 120.

Moreover, this wireless base station 110 includes an operation state setting part (an operation state setting means) 111 for setting a state of the wireless base station to an operation state, either an active state or at least one sleep state.

The active state is a state in which the wireless base station can perform wireless communication compliant with a predetermined first communication scheme with the wireless terminal.

The sleep state is a state in which the wireless base station can receive an activation instruction signal compliant with a second communication scheme requiring smaller electric power to receive a signal than the first communication scheme and cannot perform wireless communication compliant with the first communication scheme with the wireless terminal.

The operation state setting part 111 is configured to select one ROD (Radio on Demand) level from among a plurality of ROD levels and set the state of the wireless base station based on the selected ROD level.

According to this, by properly selecting a ROD level depending on the situation, it is possible to properly set the state of the wireless base station 110 depending on the situation.

Although the present invention is described above referring to the exemplary embodiments, the present invention is not limited to the exemplary embodiments described above. The configurations and details of the present invention can be modified in various manners that can be understood by one skilled in the art within the scope of the present invention.

The respective functions of the wireless communication system or the wireless base station are realized by hardware like circuits in the exemplary embodiments. The wireless communication system or the wireless base station may include a processing device and a storage device storing a program (software), and may be configured to realize the respective functions by execution of the program by the processing device. In this case, the program may be stored on a computer-readable recording medium. For example, the recording medium is a portable medium such as a flexible disk, an optical disk, a magneto-optical disk and a semiconductor memory.

Further, as another modified example of the exemplary embodiments, any combination of the exemplary embodiments and modified examples described above may be employed.

<Supplementary Note>

The whole or part of the exemplary embodiments disclosed above can be described as, but not limited to, the following supplementary notes.

(Supplementary Note 1)

A wireless communication device configured to be capable of performing wireless communication with at least one communication destination device, the wireless communication device being configured to operate in an operation mode, either a ROD (Radio on Demand) mode or a non-ROD mode, wherein:

the non-ROD mode is configured to set a state of the wireless communication device to an active state in which the wireless communication device can perform wireless communication compliant with a predetermined first communication scheme with the communication destination device; and the ROD mode is configured to: set the state of the wireless communication device to either the active state or a sleep state in which the wireless communication device can receive an activation instruction signal compliant with a second communication scheme requiring smaller electric power to receive a signal than the first communication scheme and cannot perform wireless communication compliant with the first communication scheme with the communication destination device; in a case where the state of the wireless communication device is the active state and a predetermined sleep condition is satisfied, set the state of the wireless communication device to the sleep state; and in a case where the state of the wireless communication device is the sleep state and the wireless communication device receives the activation instruction signal, set the state of the wireless communication device to the active state.

According to this, even when a communication destination device capable of transmitting an activation instruction signal and a communication destination device incapable of transmitting an activation instruction signal both exist, it is possible to securely perform wireless communication with the communication destination devices while reducing the amount of electric power consumed by the wireless communication device.

(Supplementary Note 2)

The wireless communication device according to Supplementary Note 1, comprising a compatible information acquiring means for acquiring compatible information with respect to each of the communication destination devices, the compatible information representing whether the communication destination device is a ROD compatible device capable of transmitting the activation instruction signal or a ROD incompatible device incapable of transmitting the activation instruction signal, wherein the wireless communication device is configured to operate in the ROD mode in a case where the acquired compatible information represents that all of the communication destination devices are the ROD compatible devices and, on the other hand, operate in the non-ROD mode in a case where the acquired compatible information represents that at least one of the communication destination devices is the ROD incompatible device.

(Supplementary Note 3)

The wireless communication device according to Supplementary Note 1 or 2, wherein the compatible information acquiring means is configured to: transmit, to each of the communication destination devices, a notification transmission request that is a request for transmission of compatibility notification representing that the communication destination device can transmit the activation instruction signal; and acquire, with respect to the communication destination device, compatible information representing that the communication destination device is the ROD compatible device when receiving the compatibility notification from the communication destination device in response to the transmitted notification transmission request, whereas acquire, with respect to the communication destination device, compatible information representing that the communication destination device is the ROD incompatible device when not receiving the compatibility notification from the communication destination device in response to the transmitted notification transmission request.

According to this, it is possible to securely acquire compatible information with respect to all of the communication destination devices.

(Supplementary Note 4)

The wireless communication device according to any of Supplementary Notes 1 to 3, configured to, in a case where the state of the wireless communication device is set to the active state, transmit a beacon signal for notifying that wireless communication with the wireless communication device is allowed, every time a preset transmission period passes.

(Supplementary Note 5)

The wireless communication device according to Supplementary Note 4, wherein the non-ROD mode is configured to set the transmission period to a first transmission period in a case where a predetermined first power-saving condition is not satisfied, whereas set the transmission period to a second transmission period that is longer than the first transmission period in a case where the first power-saving condition is satisfied.

According to this, even when the wireless communication device is operating in the non-ROD mode, it is possible to reduce the amount of electric power consumed by the wireless communication device.

(Supplementary Note 6)

The wireless communication device according to any of Supplementary Notes 1 to 5, wherein, in a case where a predetermined second power-saving condition is satisfied, the non-ROD mode is configured to transmit operation stop notification for notifying that the wireless communication device is due to stop operation, and shut off supply of electric power to the wireless communication device.

According to this, even when the wireless communication device is operating in the non-ROD mode, it is possible to reduce the amount of electric power consumed by the wireless communication device.

(Supplementary Note 7)

The wireless communication device according to any of Supplementary Notes 1 to 6, the wireless communication device being a wireless base station.

(Supplementary Note 8)

The wireless communication device according to Supplementary Note 7, wherein at least one of the communication destination devices is a wireless terminal (Supplementary Note 9)

The wireless communication device according to Supplementary Note 7 or 8, wherein at least one of the communication destination devices is a device configuring, in addition to a first communication network configured by the wireless communication device and the communication destination devices, a second communication network different from the first communication network.

(Supplementary Note 10)

A wireless communication device control method applied to a wireless communication device configured to be capable of performing wireless communication with at least one communication destination device, the wireless communication device control method comprising causing the wireless communication device to operate in an operation mode, either a ROD (Radio on Demand) mode or a non-ROD mode, wherein:

the non-ROD mode is configured to set a state of the wireless communication device to an active state in which the wireless communication device can perform wireless communication compliant with a predetermined first communication scheme with the communication destination device; and the ROD mode is configured to: set the state of the wireless communication device to either the active state or a sleep state in which the wireless communication device can receive an activation instruction signal compliant with a second communication scheme requiring smaller electric power to receive a signal than the first communication scheme and cannot perform wireless communication compliant with the first communication scheme with the communication destination device; in a case where the state of the wireless communication device is the active state and a predetermined sleep condition is satisfied, set the state of the wireless communication device to the sleep state; and in a case where the state of the wireless communication device is the sleep state and the wireless communication device receives the activation instruction signal, set the state of the wireless communication device to the active state.

(Supplementary Note 11)

The wireless communication device control method according to Supplementary Note 10, comprising:

with respect to each of the communication destination devices, acquiring compatible information representing whether the communication destination device is a ROD compatible device capable of transmitting the activation instruction signal or a ROD incompatible device incapable of transmitting the activation instruction signal; and causing the wireless communication device to operate in the ROD mode in a case where the acquired compatible information represents that all of the communication destination devices are the ROD compatible devices and, on the other hand, causing the wireless communication device to operate in the non-ROD mode in a case where the acquired compatible information represents that at least one of the communication destination devices is the ROD incompatible device.

(Supplementary Note 12)

A wireless communication device control program executed by a wireless communication device configured to be capable of performing wireless communication with at least one communication destination device, the wireless communication device control program comprising instructions for causing the wireless communication device to perform operations including causing the wireless communication device to operate in an operation mode, either a ROD (Radio on Demand) mode or a non-ROD mode, wherein:

the non-ROD mode is configured to set a state of the wireless communication device to an active state in which the wireless communication device can perform wireless communication compliant with a predetermined first communication scheme with the communication destination device; and the ROD mode is configured to: set the state of the wireless communication device to either the active state or a sleep state in which the wireless communication device can receive an activation instruction signal compliant with a second communication scheme requiring smaller electric power to receive a signal than the first communication scheme and cannot perform wireless communication compliant with the first communication scheme with the communication destination device; in a case where the state of the wireless communication device is the active state and a predetermined sleep condition is satisfied, set the state of the wireless communication device to the sleep state; and in a case where the state of the wireless communication device is the sleep state and the wireless communication device receives the activation instruction signal, set the state of the wireless communication device to the active state.

(Supplementary Note 13)

The wireless communication device control program according to Supplementary Note 12, comprising instructions for causing the wireless communication device to perform operations including:

with respect to each of the communication destination devices, acquiring compatible information representing whether the communication destination device is a ROD compatible device capable of transmitting the activation instruction signal or a ROD incompatible device incapable of transmitting the activation instruction signal; and causing the wireless communication device to operate in the ROD mode in a case where the acquired compatible information represents that all of the communication destination devices are the ROD compatible devices and, on the other hand, causing the wireless communication device to operate in the non-ROD mode in a case where the acquired compatible information represents that at least one of the communication destination devices is the ROD incompatible device.

(Supplementary Note 14)

A wireless communication system comprising a plurality of wireless communication devices each configured to be capable of performing wireless communication with at least one communication destination device, wherein:

each of the wireless communication devices is a ROD (Radio on Demand) device or a non-ROD device;

the ROD device is configured to operate in an operation mode, either a ROD mode or a non-ROD mode;

the non-ROD device is configured to operate in the non-ROD mode;

the non-ROD mode is configured to set a state of the wireless communication device to an active state in which the wireless communication device can perform wireless communication compliant with a predetermined first communication scheme with the communication destination device; and the ROD mode is configured to: set the state of the wireless communication device to either the active state or a sleep state in which the wireless communication device can receive an activation instruction signal compliant with a second communication scheme requiring smaller electric power to receive a signal than the first communication scheme and cannot perform wireless communication compliant with the first communication scheme with the communication destination device; in a case where the state of the wireless communication device is the active state and a predetermined sleep condition is satisfied, set the state of the wireless communication device to the sleep state; and in a case where the state of the wireless communication device is the sleep state and the wireless communication device receives the activation instruction signal, set the state of the wireless communication device to the active state.

(Supplementary Note 15)

The wireless communication system according to Supplementary Note 14, comprising a control device configured to be capable of performing communication with each of the wireless communication device, wherein the control device includes an operation mode setting means for setting the operation mode of each of the ROD devices among the wireless communication devices.

(Supplementary Note 16)

The wireless communication system according to Supplementary Note 15, wherein:

the control device includes a compatible information acquiring means for, with respect to each of the ROD devices among the wireless communication devices, acquiring compatible information for each of the communication destination devices capable of performing wireless communication with the ROD device, the compatible information representing whether the communication destination device is a ROD compatible device capable of transmitting the activation instruction signal or a ROD incompatible device incapable of transmitting the activation instruction signal; and the operation mode setting means is configured to set the operation mode of each of the ROD devices among the wireless communication devices, based on the acquired compatible information.

(Supplementary Note 17)

The wireless communication system according to Supplementary Note 16, wherein the operation mode setting means is configured to set the operation mode of each of the ROD devices among the wireless communication devices to the ROD mode in a case where the compatible information acquired with respect to the ROD device represents that all of the communication destination devices capable of performing wireless communication with the ROD device are the ROD compatible devices and, on the other hand, set to the non-ROD mode in a case where the compatible information represents that at least one of the communication destination devices capable of performing wireless communication with the ROD device is the ROD incompatible device.

(Supplementary Note 18)

The wireless communication system according to Supplementary Note 17, wherein the operation mode setting means is configured to, in a case where the wireless communication device capable of performing wireless communication with the ROD incompatible device changes from a first wireless communication device to a second wireless communication device, when the second wireless communication device is the ROD device, set the operation mode of the ROD device to the non-ROD mode and, when the first wireless communication device is the ROD device, set the operation mode of the ROD device to the ROD mode.

According to this, for example, in a case where the ROD incompatible device moves and thereby becomes capable of performing wireless communication with the second wireless communication device, the ROD incompatible device can securely perform wireless communication with the second wireless communication device. Moreover, it is possible to reduce the amount of electric power consumed by the first wireless communication device.

(Supplementary Note 19)

The wireless communication system according to Supplementary Note 17 or 18, wherein;

the control device includes a location information acquiring means for acquiring location information representing a location of each of the ROD devices among the wireless communication devices; and the operation mode setting means is configured to, in setting the operation mode of the ROD device that is a first ROD device to the non-ROD mode, specify a second ROD device that is the ROD device located near the first ROD device based on the acquired location information, and also set the operation mode of the specified second ROD device to the non-ROD mode.

According to this, for example, in a case where the ROD incompatible device that is performing wireless communication with the first ROD device moves and thereby becomes capable of performing wireless communication with the second wireless ROD device, the ROD incompatible device can securely perform wireless communication with the second ROD device.

(Supplementary Note 20)

The wireless communication system according to Supplementary Note 16, wherein the operation mode setting means is configured to set the operation mode of each of the ROD devices among the wireless communication devices to the ROD mode in a case where the acquired compatible information represents that all of the communication destination devices capable of performing wireless communication with any of the ROD devices are the ROD compatible devices and, on the other hand, set the operation mode of each of the ROD devices among the wireless communication devices to the non-ROD mode in a case where the acquired compatible information represents that at least one of the communication destination devices capable of performing wireless communication with any of the ROD devices is the ROD incompatible device.

According to this, whenever the ROD incompatible device becomes capable of performing wireless communication with any of the ROD devices, the ROD incompatible device can securely perform wireless communication with the ROD device.

(Supplementary Note 21)

A wireless communication system control method applied to a wireless communication system comprising a plurality of wireless communication devices each configured to be capable of performing wireless communication with at least one communication destination device, each of the wireless communication devices being a ROD (Radio on Demand) device or a non-ROD device, the wireless communication system control method comprising:

causing the ROD device to operate in an operation mode, either a ROD mode or a non-ROD mode; and
causing the non-ROD device to operate in the non-ROD mode, wherein:
the non-ROD mode is configured to set a state of the wireless communication device to an active state in which the wireless communication device can perform wireless communication compliant with a predetermined first communication scheme with the communication destination device; and
the ROD mode is configured to: set the state of the wireless communication device to either the active state or a sleep state in which the wireless communication device can receive an activation instruction signal compliant with a second communication scheme requiring smaller electric power to receive a signal than the first communication scheme and cannot perform wireless communication compliant with the first communication scheme with the communication destination device; in a case where the state of the wireless communication device is the active state and a predetermined sleep condition is satisfied, set the state of the wireless communication device to the sleep state; and in a case where the state of the wireless communication device is the sleep state and the wireless communication device receives the activation instruction signal, set the state of the wireless communication device to the active state.

(Supplementary Note 22)

The wireless communication system control method according to Supplementary Note 21, wherein:
the wireless communication system includes a control device configured to be capable of performing communication with each of the wireless communication devices; and
the control device is configured to set the operation mode of each of the ROD devices among the wireless communication devices.

(Supplementary Note 23)

The wireless communication system control method according to Supplementary Note 22, wherein:
with respect to each of the ROD devices among the wireless communication devices, the control device acquires compatible information for each of the communication destination devices capable of performing wireless communication with the ROD device, the compatible information representing whether the communication destination device is a ROD compatible device capable of transmitting the activation instruction signal or a ROD incompatible device incapable of transmitting the activation instruction signal; and
the control device is configured to set the operation mode of each of the ROD devices among the wireless communication devices, based on the acquired compatible information.

(Supplementary Note 24)

A control device configured to be capable of performing communication with each of a plurality of wireless communication devices each configured to be capable of performing wireless communication with at least one communication destination device, wherein:
each of the wireless communication devices is a ROD (Radio on Demand) device or a non-ROD device;
the ROD device is configured to operate in an operation mode, either a ROD mode or a non-ROD mode;
the non-ROD device is configured to operate in the non-ROD mode;
the non-ROD mode is configured to set a state of the wireless communication device to an active state in which the wireless communication device can perform wireless communication compliant with a predetermined first communication scheme with the communication destination device; and
the ROD mode is configured to: set the state of the wireless communication device to either the active state or a sleep state in which the wireless communication device can receive an activation instruction signal compliant with a second communication scheme requiring smaller electric power to receive a signal than the first communication scheme and cannot perform wireless communication compliant with the first communication scheme with the communication destination device; in a case where the state of the wireless communication device is the active state and a predetermined sleep condition is satisfied, set the state of the wireless communication device to the sleep state; and in a case where the state of the wireless communication device is the sleep state and the wireless communication device receives the activation instruction signal, set the state of the wireless communication device to the active state,
the control device comprising an operation mode setting means for setting the operation mode of each of the ROD devices among the wireless communication devices.

(Supplementary Note 25)

The control device according to Supplementary Note 24, comprising a compatible information acquiring means for, with respect to each of the ROD devices among the wireless communication devices, acquiring compatible information for each of the communication destination devices capable of performing wireless communication with the ROD device, the compatible information representing whether the communication destination device is a ROD compatible device capable of transmitting the activation instruction signal or a ROD incompatible device incapable of transmitting the activation instruction signal,
wherein the operation mode setting means is configured to set the operation mode of each of the ROD devices among the wireless communication devices, based on the acquired compatible information.

(Supplementary Note 26)

A control device control method applied to a control device configured to be capable of performing communication with each of a plurality of wireless communication devices each configured to be capable of performing wireless communication with at least one communication destination device, wherein:
each of the wireless communication devices is a ROD (Radio on Demand) device or a non-ROD device;
the ROD device is configured to operate in an operation mode, either a ROD mode or a non-ROD mode;
the non-ROD device is configured to operate in the non-ROD mode;
the non-ROD mode is configured to set a state of the wireless communication device to an active state in which the wireless communication device can perform wireless communication compliant with a predetermined first communication scheme with the communication destination device;
the ROD mode is configured to: set the state of the wireless communication device to either the active state or a sleep state in which the wireless communication device can receive an activation instruction signal compliant with a second communication scheme requiring smaller electric power to receive a signal than the first communication scheme and cannot perform wireless communication compliant with the first communication scheme with the communication destination device; in a case where the state of the wireless communication device is the active state and a predetermined sleep condition is satisfied, set the state of the wireless communication device to the sleep state; and in a case where the state of the wireless communication device is the sleep state and the wireless communication device receives the activation instruction signal, set the state of the wireless communication device to the active state; and the control device sets the operation mode of each of the ROD devices among the wireless communication devices.

(Supplementary Note 27)

The control device control method according to Supplementary Note 26, wherein:

with respect to each of the ROD devices among the wireless communication devices, the control device acquires compatible information for each of the communication destination devices capable of performing wireless communication with the ROD device, the compatible information representing whether the communication destination device is a ROD compatible device capable of transmitting the activation instruction signal or a ROD incompatible device incapable of transmitting the activation instruction signal; and the control device is configured to set the operation mode of each of the ROD devices among the wireless communication devices, based on the acquired compatible information.

(Supplementary Note 28)

A control device control program executed by a control device configured to be capable of performing communication with each of a plurality of wireless communication devices each configured to be capable of performing wireless communication with at least one communication destination device, wherein:

each of the wireless communication devices is a ROD (Radio on Demand) device or a non-ROD device;

the ROD device is configured to operate in an operation mode, either a ROD mode or a non-ROD mode;

the non-ROD device is configured to operate in the non-ROD mode;

the non-ROD mode is configured to set a state of the wireless communication device to an active state in which the wireless communication device can perform wireless communication compliant with a predetermined first communication scheme with the communication destination device; and the ROD mode is configured to: set the state of the wireless communication device to either the active state or a sleep state in which the wireless communication device can receive an activation instruction signal compliant with a second communication scheme requiring smaller electric power to receive a signal than the first communication scheme and cannot perform wireless communication compliant with the first communication scheme with the communication destination device; in a case where the state of the wireless communication device is the active state and a predetermined sleep condition is satisfied, set the state of the wireless communication device to the sleep state; and in a case where the state of the wireless communication device is the sleep state and the wireless communication device receives the activation instruction signal, set the state of the wireless communication device to the active state, the control device control program including instructions for causing the control device to perform operations including setting the operation mode of each of the ROD devices among the wireless communication devices.

(Supplementary Note 29)

The control device control program according to Supplementary Note 28, comprising instructions for causing the control device to perform operations including:

with respect to each of the ROD devices among the wireless communication devices, for each of the communication destination devices capable of performing wireless communication with the ROD device, acquiring compatible information representing whether the communication destination device is a ROD compatible device capable of transmitting the activation instruction signal or a ROD incompatible device incapable of transmitting the activation instruction signal; and setting the operation mode of each of the ROD devices among the wireless communication devices, based on the acquired compatible information.

(Supplementary Note 30)

A wireless communication system comprising a plurality of wireless communication devices configured to be capable of performing wireless communication, wherein:

each of the wireless communication devices configures a node in a mesh-type communication network;

each of the wireless communication devices is a ROD (Radio on Demand) device or a non-ROD device;

the ROD device is configured to operate in an operation mode, either a ROD mode or a non-ROD mode;

the non-ROD device is configured to operate in the non-ROD mode;

the non-ROD mode is configured to set a state of the node to an active state in which the node can perform wireless communication compliant with a predetermined first communication scheme with an adjacent node that is adjacent to the node in the communication network; and the ROD mode is configured to: set the state of the node to either the active state or a sleep state in which the node can receive an activation instruction signal compliant with a second communication scheme requiring smaller electric power to receive a signal than the first communication scheme and cannot perform wireless communication compliant with the first communication scheme with the adjacent node; in a case where the state of the node is the active state and a predetermined sleep condition is satisfied, set the state of the node to the sleep state; and in a case where the state of the node is the sleep state and the node receives the activation instruction signal, set the state of the node to the active state.

(Supplementary Note 31)

The wireless communication system according to Supplementary Note 30, wherein:

each of the ROD devices is configured to be capable of transmitting the activation instruction signal;

each of the non-ROD devices is configured to be incapable of transmitting the activation instruction signal; and each of the ROD devices: includes a compatible information acquiring means for acquiring compatible information with respect to each of the adjacent nodes adjacent to the node in the communication network, the compatible information representing whether the adjacent node is the ROD device or the non-ROD device; and is configured to operate in the ROD mode in a case where the acquired compatible information represents that all of the adjacent nodes are the ROD devices and, on the other hand, operate in the non-ROD mode in a case where the acquired compatible information represents that at least one of the adjacent nodes is the non-ROD device.

(Supplementary Note 32)

The wireless communication system according to Supplementary Note 30 or 31, wherein:
the compatible information acquiring means is configured to: transmit, to each of the adjacent nodes, a notification transmission request that is a request for transmission of compatibility notification representing that the adjacent node can transmit the activation instruction signal; and acquire, with respect to the adjacent node, compatible information representing that the adjacent node is the ROD device when receiving the compatibility notification from the adjacent node in response to the transmitted notification transmission request, whereas acquire, with respect to the adjacent node, compatible information representing that the adjacent node is the non-ROD device when not receiving the compatibility notification from the adjacent node in response to the transmitted notification transmission request; and
each of the ROD devices includes a compatibility notification transmitting means for, when receiving the notification transmission request from the adjacent node, transmitting the compatibility notification to the adjacent node.

(Supplementary Note 33)

The wireless communication system according to any of Supplementary Notes 30 to 32, configured to determine a path for transmitting data so as to pass through the non-ROD device more preferentially than the ROD device.

A non-ROD device is set to the active state at all times. On the other hand, a ROD device can be set to the sleep state. Therefore, according to the abovementioned configuration, it is possible to increase the number of ROD devices whose states are set to the sleep state. As a result, it is possible to avoid that the amount of electric power consumed by the wireless communication system uselessly increases.

(Supplementary Note 34)

The wireless communication system according to any of Supplementary Notes 30 to 33, configured to determine a path for transmitting data so as to pass through a node that has the non-ROD device as the adjacent node more preferentially than a node that does not have the non-ROD device as the adjacent node.

A node having a non-ROD device as an adjacent node is set to the active state at all times. On the other hand, a node having no non-ROD device as an adjacent node can be set to the sleep state. Therefore, according to the abovementioned configuration, it is possible to increase the number of ROD devices whose states are set to the sleep state. As a result, it is possible to avoid that the amount of electric power consumed by the wireless communication system uselessly increases.

(Supplementary Note 35)

A wireless communication system control method applied to a wireless communication system including a plurality of wireless communication devices configured to be capable of performing wireless communication, wherein:
each of the wireless communication devices configures a node in a mesh-type communication network;
each of the wireless communication devices is a ROD (Radio on Demand) device or a non-ROD device;
the wireless communication system control method comprises causing the ROD device to operate in an operation mode, either a ROD mode or a non-ROD mode, and causing the non-ROD device to operate in the non-ROD mode;
the non-ROD mode is configured to set a state of the node to an active state in which the node can perform wireless communication compliant with a predetermined first communication scheme with an adjacent node that is adjacent to the node in the communication network; and
the ROD mode is configured to: set the state of the node to either the active state or a sleep state in which the node can receive an activation instruction signal compliant with a second communication scheme requiring smaller electric power to receive a signal than the first communication scheme and cannot perform wireless communication compliant with the first communication scheme with the adjacent node; in a case where the state of the node is the active state and a predetermined sleep condition is satisfied, set the state of the node to the sleep state; and in a case where the state of the node is the sleep state and the node receives the activation instruction signal, set the state of the node to the active state.

(Supplementary Note 36)

The wireless communication system control method according to Supplementary Note 35, wherein:
each of the ROD devices is configured to be capable of transmitting the activation instruction signal;
each of the non-ROD devices is configured to be incapable of transmitting the activation instruction signal;
each of the ROD devices acquires compatible information with respect to each of the adjacent nodes adjacent to the node in the communication network, the compatible information representing whether the adjacent node is the ROD device or the non-ROD device; and
each of the ROD devices operates in the ROD mode in a case where the acquired compatible information represents that all of the adjacent nodes are the ROD devices and, on the other hand, operates in the non-ROD mode in a case where the acquired compatible information represents that at least one of the adjacent nodes is the non-ROD device.

(Supplementary Note 37)

A wireless communication device configuring a node in a mesh-type communication network and configured to be capable of performing wireless communication with an adjacent node that is adjacent to the node in the communication network, the wireless communication device being configured to operate in an operation mode, either a ROD (Radio on Demand) mode or a non-ROD mode, wherein:
the non-ROD mode is configured to set a state of the node to an active state in which the node can perform wireless communication compliant with a predetermined first communication scheme with the adjacent node; and the ROD mode is configured to: set the state of the node to either the active state or a sleep state in which the node can receive an activation instruction signal compliant with a second communication scheme requiring smaller electric power to receive a signal than the first communication scheme and cannot perform wireless communication compliant with the first communication scheme with the adjacent node; in a case where the state of the node is the active state and a predetermined sleep condition is satisfied, set the state of the node to the sleep state; and in a case where the state of the node is the sleep state and the node receives the activation instruction signal, set the state of the node to the active state.

(Supplementary Note 38)

The wireless communication device according to Supplementary Note 37, configured to be capable of transmitting the activation instruction signal, the wireless communication device comprising a compatible information acquiring means for acquiring compatible information with respect to each of the adjacent nodes adjacent to the node in the communication network, the compatible information representing whether the adjacent node is a ROD device capable of transmitting the activation instruction signal or a non-ROD device incapable of transmitting the activation instruction signal, and the wireless communication device being configured to operate in the ROD mode in a case where the acquired compatible information represents that all of the adjacent nodes are the ROD devices and, on the other hand, operate in the non-ROD mode in a case where the acquired compatible information represents that at least one of the adjacent nodes is the non-ROD device.

(Supplementary Note 39)

A wireless communication device control method applied to a wireless communication device configuring a node in a mesh-type communication network and configured to be capable of performing wireless communication with an adjacent node that is adjacent to the node in the communication network, the wireless communication device control method including causing the wireless communication device to operate in an operation mode, either a ROD (Radio on Demand) mode or a non-ROD mode, wherein:

the non-ROD mode is configured to set a state of the node to an active state in which the node can perform wireless communication compliant with a predetermined first communication scheme with the adjacent node; and the ROD mode is configured to: set the state of the node to either the active state or a sleep state in which the node can receive an activation instruction signal compliant with a second communication scheme requiring smaller electric power to receive a signal than the first communication scheme and cannot perform wireless communication compliant with the first communication scheme with the adjacent node; in a case where the state of the node is the active state and a predetermined sleep condition is satisfied, set the state of the node to the sleep state; and in a case where the state of the node is the sleep state and the node receives the activation instruction signal, set the state of the node to the active state.

(Supplementary Note 40)

The wireless communication device control method according to Supplementary Note 39, comprising:

transmitting the activation instruction signal, by the wireless communication device;

with respect to each of the adjacent nodes adjacent to the node in the communication network, acquiring compatible information representing whether the adjacent node is a ROD device capable of transmitting the activation instruction signal or a non-ROD device incapable of transmitting the activation instruction signal; and causing the wireless communication device to operate in the ROD mode in a case where the acquired compatible information represents that all of the adjacent nodes are the ROD devices and, on the other hand, causing the wireless communication device to operate in the non-ROD mode in a case where the acquired compatible information represents that at least one of the adjacent nodes is the non-ROD device.

(Supplementary Note 41)

A wireless communication device control program executed by a wireless communication device configuring a node in a mesh-type communication network and configured to be capable of performing wireless communication with an adjacent node that is adjacent to the node in the communication network, the wireless communication device control program comprising instructions for causing the wireless communication device to perform operations including causing the wireless communication device to operate in an operation mode, either a ROD (Radio on Demand) mode or a non-ROD mode, wherein:

the non-ROD mode is configured to set a state of the node to an active state in which the node can perform wireless communication compliant with a predetermined first communication scheme with the adjacent node; and the ROD mode is configured to: set the state of the node to either the active state or a sleep state in which the node can receive an activation instruction signal compliant with a second communication scheme requiring smaller electric power to receive a signal than the first communication scheme and cannot perform wireless communication compliant with the first communication scheme with the adjacent node; in a case where the state of the node is the active state and a predetermined sleep condition is satisfied, set the state of the node to the sleep state; and in a case where the state of the node is the sleep state and the node receives the activation instruction signal, set the state of the node to the active state.

(Supplementary Note 42)

The wireless communication device control program according to Supplementary Note 41, comprising instructions for causing the wireless communication device to perform operations including:

transmitting the activation instruction signal;

with respect to each of the adjacent nodes adjacent to the node in the communication network, acquiring compatible information representing whether the adjacent node is a ROD device capable of transmitting the activation instruction signal or a non-ROD device incapable of transmitting the activation instruction signal; and causing the wireless communication device to operate in the ROD mode in a case where the acquired compatible information represents that all of the adjacent nodes are the ROD devices and, on the other hand, causing the wireless communication device to operate in the non- ROD mode in a case where the acquired compatible information represents that at least one of the adjacent nodes is the non-ROD device.

(Supplementary Note 2-1)

A wireless base station configured to be capable of performing wireless communication with at least one wireless terminal, the wireless base station comprising an operation state setting means for setting a state of the wireless base station to an operation state, either an active state or at least one sleep state, wherein:

the active state is a state in which the wireless base station can perform wireless communication compliant with a predetermined first communication scheme with the wireless terminal;

the sleep state is a state in which the wireless base station can receive an activation instruction signal compliant with a second communication scheme requiring smaller electric power to receive a signal than the first communication scheme and cannot perform wireless communication compliant with the first communication scheme with the wireless terminal; and the operation state setting means is configured to select one ROD (Radio on Demand) level from among a plurality of ROD levels and set the state of the wireless base station based on the selected ROD level.

According to this, by properly selecting a ROD level depending on the situation, it is possible to properly set the state of the wireless base station according to the situation.

(Supplementary Note 2-2)

The wireless base station according to Supplementary Note 2-1, wherein:

the operation state setting means is configured to execute non-ROD control when the selected ROD level indicates a ROD incompatibility value and, on the other hand, execute ROD control when the selected ROD level indicates a value other than the ROD incompatibility value;

the non-ROD control includes setting the state of the wireless base station to the active state; and the ROD control includes: in a case where the state of the wireless base station is the active state and a predetermined sleep condition is satisfied, setting the state of the wireless base station to the sleep state; and in a case where the state of the wireless base station is the sleep state and the wireless base station receives the activation instruction signal, setting the state of the wireless base station to the active state.

According to this, by selecting a ROD level that indicates a ROD incompatibility value, it is possible to securely perform wireless communication with a wireless terminal incapable of transmitting an activation instruction signal. Moreover, by selecting a ROD level that indicates a value other than the ROD incompatibility value, it is possible to reduce the amount of electric power consumed by the wireless base station.

(Supplementary Note 2-3)

The wireless base station according to Supplementary Note 2-2, wherein:

the operation state setting means is configured to set the state of the wireless base station to an operation state, either the active state or one of a plurality of sleep states;

the sleep states are different from each other in power consumption, which is an amount of electric power consumed by the wireless base station; and the ROD control includes, in a case where the state of the wireless base station is the active state and the sleep condition is satisfied, setting the state of the wireless base station to a sleep state previously associated with the selected ROD level.

It is usual that it is possible to change the state of the wireless base station to the active state more speedily from a sleep state with larger power consumption, which is the amount of electric power consumed by the wireless base station. Therefore, it is usual that QoS (Quality of Service) for the user of the wireless terminal is higher in a sleep state with larger power consumption.

Thus, according to the abovementioned configuration, by selecting a ROD level associated with a proper sleep state for the situation, it is possible to reduce power consumption while making QoS for the user of the wireless terminal sufficiently high.

(Supplementary Note 2-4)

The wireless base station according to Supplementary Note 2-3, comprising a plurality of modules operating when electric power is supplied, the wireless base station being configured to be capable of stopping supply of electric power to each of the modules, wherein each of the sleep states is a state in which supply of electric power to a module previously associated with the sleep state is stopped.

(Supplementary Note 2-5)

The wireless base station according to Supplementary Note 2-3 or 2-4, wherein the operation state setting means is configured to, in changing the state of the wireless base station from the active state to a sleep state previously associated with the selected ROD level, change the state of the wireless base station so that the power consumption gradually decreases.

According to this, in a case where the wireless base station receives an activation instruction signal immediately after the sleep condition is satisfied, it is possible to make a delay time required to change the state of the wireless base station to the active state relatively short. Therefore, it is possible to increase QoS for the user of the wireless terminal (Supplementary Note 2-6)

The wireless base station according to any of Supplementary Notes 2-3 to 2-5, wherein the operation state setting means is configured to, in changing the state of the wireless base station from the sleep state to the active state, change the state of the wireless base station so that the power consumption gradually increases.

It is usual that it is possible to change the state of the wireless base station to the active state more speedily from a sleep state with larger power consumption, which is the amount of electric power consumed by the wireless base station. Therefore, according to the abovementioned configuration, it is possible to speedily change the state of the wireless base station to the active state, for example, by estimating a moment that the state shifts from the sleep state to the active state and, toward the estimated moment, sequentially changing the state of the wireless base station to sleep states with larger power consumption.

(Supplementary Note 2-7)

The wireless base station according to any of Supplementary Notes 2-2 to 2-6, wherein:

the operation state setting means is configured to, when wireless communication between the wireless terminal and the wireless base station ends, estimate an idle time from a moment that the wireless communication ends to start of next wireless communication; and the sleep condition is a condition that the estimated idle time is longer than a preset first threshold.

It requires a given delay time to change the state of the wireless base station. Therefore, in a case where an idle time is relatively short, there is a relatively high possibility that power consumption cannot be reduced sufficiently even if the state of the wireless base station is set to the sleep state. Thus, according to the abovementioned configuration, it is possible to avoid that the state of the wireless base station is uselessly changed to the sleep state.
(Supplementary Note 2-8)

The wireless base station according to Supplementary Note 2-7, wherein the operation state setting means is configured to use a value previously associated with the selected ROD level, as the first threshold.

As the first threshold becomes smaller, a period that the state of the wireless base station is set to the sleep state becomes longer. Therefore, according to the abovementioned configuration, it is possible to differentiate power consumption for every ROD level.
(Supplementary Note 2-9)

The wireless base station according to any of Claims 2-2 to 2-8, wherein:
  the operation state setting means is configured to, when wireless communication between the wireless terminal and the wireless base station ends, estimate a next communication time from start of next communication that is next wireless communication to end of the next communication; and
  the operation state setting means is configured to, in a case where the estimated next communication time is shorter than a preset second threshold, keep the state of the wireless base station to the sleep state when the wireless base station receives the activation instruction signal transmitted by the wireless terminal to start the next communication.

It requires a given delay time to change the state of the wireless base station. Therefore, in a case where a next communication time is relatively short, there is a relatively high possibility that it is impossible to perform next communication. Moreover, in this case, the amount of data transmitted in the next communication is relatively small. Therefore, according to the abovementioned configuration, it is possible to avoid that the state of the wireless base station is uselessly changed to the active state.
(Supplementary Note 2-10)

The wireless base station according to Supplementary Note 2-9, wherein the operation state setting means is configured to use a value previously associated with the selected ROD level, as the second threshold.

As the second threshold becomes larger, a period that the state of the wireless base station is set to the sleep state becomes longer. Therefore, according to the abovementioned configuration, it is possible to differentiate power consumption for every ROD level.
(Supplementary Note 2-11)

The wireless base station according to any of Supplementary Notes 2-1 to 2-10, wherein the operation state setting means is configured to receive wireless terminal information transmitted by the wireless terminal, and select the ROD level based on the received wireless terminal information.

According to this, it is possible to select a ROD level, for example, in accordance with the performance of the wireless terminal or a request by the user of the wireless terminal
(Supplementary Note 2-12)

The wireless base station according to any of Supplementary Notes 2-1 to 2-11, wherein the operation state setting means is configured to accept policy information for determining an order of preferentially selecting the ROD level, and select the ROD level based on the accepted policy information.

According to this, it is possible to properly select a ROD level by properly setting policy information.
(Supplementary Note 2-13)

The wireless base station according to Supplementary Note 2-12, wherein the operation state setting means is configured to accept a plurality of policy information and also accept selection basis information for selecting the policy information, select one policy information from among the plurality of accepted policy information based on the accepted selection basis information, and select the ROD level based on the selected policy information.

According to this, it is possible to set policy information more flexibly. Therefore, it is possible to properly set a ROD level.
(Supplementary Note 2-14)

The wireless base station according to any of Supplementary Notes 2-1 to 2-13, wherein:
  the wireless terminal is a ROD wireless terminal capable of transmitting the activation instruction signal or a non-ROD wireless terminal incapable of transmitting the activation instruction signal; and
  the operation state setting means is configured to select the ROD level based on a ROD compatibility ratio, which is a ratio of the number of the ROD wireless terminals to the number of the wireless terminals capable of performing wireless communication with the wireless base station.

A ROD compatibility ratio has a strong correlation with QoS for the users of all of the wireless terminals capable of performing wireless communication with the wireless base station. Therefore, according to the abovementioned configuration, it is possible to properly select a ROD level so as to sufficiently increase QoS for the users of all of the wireless terminals capable of performing wireless communication with the wireless base station.
(Supplementary Note 2-15)

The wireless base station according to Supplementary Note 2-14, wherein the operation state setting means is configured to: set the state of the wireless base station so that power consumption is different for every ROD level, the power consumption being an amount of electric power consumed by the wireless base station; and select a ROD level with smaller power consumption as the ROD compatibility ratio becomes larger.

As a ROD compatibility ratio becomes larger, QoS for the users of all of the wireless terminals capable of performing wireless communication with the wireless terminal can be kept more sufficiently high even if QoS for the user of the non-ROD wireless terminal decreases. Therefore, according to the abovementioned configuration, it is possible to reduce power consumption while keeping QoS for the users of all of the wireless terminals capable of performing wireless communication with the wireless base station sufficiently high.
(Supplementary Note 2-16)

The wireless base station according to any of Supplementary Notes 2-1 to 2-15, the wireless base station being configured to, when the state of the wireless base station is set to the active state, transmit a beacon signal for notifying that wireless communication with the wireless base station is allowed, every time a preset transmission period passes.
(Supplementary Note 2-17)

A wireless base station control method applied to a wireless base station configured to be capable of performing wireless communication with at least one wireless terminal, the wireless base station control method comprising setting a state of the wireless base station to an operation state, either an active state or at least one sleep state, wherein:

the active state is a state in which the wireless base station can perform wireless communication compliant with a predetermined first communication scheme with the wireless terminal;

the sleep state is a state in which the wireless base station can receive an activation instruction signal compliant with a second communication scheme requiring smaller electric power to receive a signal than the first communication scheme and cannot perform wireless communication compliant with the first communication scheme with the wireless terminal; and the wireless base station control method is configured to select one ROD (Radio on Demand) level from among a plurality of ROD levels and set the state of the wireless base station based on the selected ROD level.

(Supplementary Note 2-18)

The wireless base station control method according to Supplementary Note 2-17, comprising:

executing non-ROD control when the selected ROD level indicates a ROD incompatibility value and, on the other hand, executing ROD control when the selected ROD level indicates a value other than the ROD incompatibility value;

in the non-ROD control, setting the state of the wireless base station to the active state; and in the ROD control: in a case where the state of the wireless base station is the active state and a predetermined sleep condition is satisfied, setting the state of the wireless base station to the sleep state; and in a case where the state of the wireless base station is the sleep state and the wireless base station receives the activation instruction signal, setting the state of the wireless base station to the active state.

(Supplementary Note 2-19)

The wireless base station control method according to Supplementary Note 2-18, comprising:

setting the state of the wireless base station to an operation state, either the active state or one of a plurality of sleep states, the sleep states being different from each other in power consumption, which is an amount of electric power consumed by the wireless base station; and in the ROD control, in a case where the state of the wireless base station is the active state and the sleep condition is satisfied, setting the state of the wireless base station to a sleep state previously associated with the selected ROD level.

(Supplementary Note 2-20)

A wireless base station control program executed by a wireless base station configured to be capable of performing wireless communication with at least one wireless terminal, the wireless base station control program comprising instructions for causing the wireless base station to perform operations including setting a state of the wireless base station to an operation state, either an active state or at least one sleep state, wherein:

the active state is a state in which the wireless base station can perform wireless communication compliant with a predetermined first communication scheme with the wireless terminal;

the sleep state is a state in which the wireless base station can receive an activation instruction signal compliant with a second communication scheme requiring smaller electric power to receive a signal than the first communication scheme and cannot perform wireless communication compliant with the first communication scheme with the wireless terminal; and the operations include selecting one ROD (Radio on Demand) level from among a plurality of ROD levels and setting the state of the wireless base station based on the selected ROD level.

(Supplementary Note 2-21)

The wireless base station control program according to Supplementary Note 2-20, wherein:

the operations include executing non-ROD control when the selected ROD level indicates a ROD incompatibility value and, on the other hand, executing ROD control when the selected ROD level indicates a value other than the ROD incompatibility value;

the non-ROD control includes setting the state of the wireless base station to the active state; and the ROD control includes: in a case where the state of the wireless base station is the active state and a predetermined sleep condition is satisfied, setting the state of the wireless base station to the sleep state; and in a case where the state of the wireless base station is the sleep state and the wireless base station receives the activation instruction signal, setting the state of the wireless base station to the active state.

(Supplementary Note 2-22)

The wireless base station control program according to Supplementary Note 2-21, wherein:

the operations include setting the state of the wireless base station to an operation state, either the active state or one of a plurality of sleep states, the sleep states being different from each other in power consumption, which is an amount of electric power consumed by the wireless base station; and the ROD control includes, in a case where the state of the wireless base station is the active state and the sleep condition is satisfied, setting the state of the wireless base station to a sleep state previously associated with the selected ROD level.

(Supplementary Note 3-1)

A wireless communication device configured to be capable of performing wireless communication with at least one communication destination device, the wireless communication device being configured to set a state of the wireless communication device to either an active state in which the wireless communication device can perform wireless communication compliant with a predetermined first communication scheme with the communication destination device, or a sleep state in which the wireless communication device can receive an activation instruction signal compliant with a second communication scheme requiring smaller electric power to receive a signal than the first communication scheme and cannot perform wireless communication compliant with the first communication scheme with the communication destination device, and the wireless communication device being configured to set the state of the wireless communication device depending on a communication setting of the communication destination device.

(Supplementary Note 3-2)

A wireless communication device control method applied to a wireless communication device configured to be capable of performing wireless communication with at least one communication destination device, the wireless communication device control method comprising: setting a state of the wireless communication device to either an active state in which the wireless communication device can perform wireless communication compliant with a predetermined first communication scheme with the communication destination device, or a sleep state in which the wireless communication device can receive an activation instruction signal compliant with a second communication scheme requiring smaller electric power to receive a signal than the first communication scheme and cannot perform wireless communication compliant with the first communication scheme with the communication destination device; and setting the state of the wireless communication device depending on a communication setting of the communication destination device.

(Supplementary Note 3-3)

A wireless communication device control program executed by a wireless communication device configured to be capable of performing wireless communication with at least one communication destination device, the wireless communication device control program comprising instructions for causing the wireless communication device to perform operations including: setting a state of the wireless communication device to either an active state in which the wireless communication device can perform wireless communication compliant with a predetermined first communication scheme with the communication destination device, or a sleep state in which the wireless communication device can receive an activation instruction signal compliant with a second communication scheme requiring smaller electric power to receive a signal than the first communication scheme and cannot perform wireless communication compliant with the first communication scheme with the communication destination device; and setting the state of the wireless communication device depending on a communication setting of the communication destination device.

The present invention is based upon and claims the benefit of priority from Japanese patent application No. 2011-257263, filed on Nov. 25, 2011 and Japanese patent application No. 2011-267603, filed on Dec. 7, 2011, the disclosure of which is incorporated herein in its entirety by reference.

INDUSTRIAL APPLICABILITY

The present invention can be applied to a wireless communication device, and the like (a wireless base station, and the like), configured to be capable of performing wireless communication with at least one communication destination device (wireless terminal).

DESCRIPTION OF REFERENCE NUMERALS 1 wireless communication system
10 wireless base station
11 first communication control part
12 second communication control part
13 activation instruction signal receiving part
14 packet transfer part
15 state control part
151 ROD support table storage part
152 ROD level selecting part
153 policy information setting part
16 power supply part
1A wireless communication system
2 wireless communication system
20 ROD wireless terminal
30 non-ROD wireless terminal
2A wireless communication system
2C wireless communication system
3 wireless communication system
40 communication terminal
51 home gateway
52 television
53 portable game machine
54 router
55 fire alarm
56 gas leak detector
61 control device
61a ROD support table receiving part
61b operation mode determining part
61c operation mode setting information transmitting part
62a to 62e wireless base station
63a, 63b, 63c wireless terminal
71 to 76 wireless communication device
81 wireless communication device
82 communication destination device
110 wireless base station
111 operation state setting part
NW communication network
NW1 first communication network
NW2 second communication network
NW3 communication network
NWW Internet network

The invention claimed is:

1. A wireless communication device configured to be capable of performing wireless communication with at least one communication destination device, the wireless communication device being configured to operate in an operation mode, either a ROD (Radio on Demand) mode or a non-ROD mode, wherein:

the non-ROD mode is configured to set a state of the wireless communication device to an active state in which the wireless communication device can perform wireless communication compliant with a predetermined first communication scheme with the communication destination device;

the ROD mode is configured to: set the state of the wireless communication device to either the active state or a sleep state in which the wireless communication device can receive an activation instruction signal compliant with a second communication scheme requiring smaller electric power to receive a signal than the first communication scheme and cannot perform wireless communication compliant with the first communication scheme with the communication destination device; in a case where the state of the wireless communication device is the active state and a predetermined sleep condition is satisfied, set the state of the wireless communication device to the sleep state; and in a case where the state of the wireless communication device is the sleep state and the wireless communication device receives the activation instruction signal, set the state of the wireless communication device to the active state, wherein the wireless communication device comprises a compatible information acquiring unit for acquiring compatible information with respect to each of the at least one communication destination devices, the compatible information representing whether the communication destination device is a ROD compatible device capable of transmitting the activation instruction signal or a ROD incompatible device incapable of transmitting the activation instruction signal and wherein the wireless communication device is configured to operate in the ROD mode in a case where the acquired compatible information represents that all of the communication destination devices are ROD compatible devices and, on the other hand, operate in the non-ROD mode in a case where the acquired compatible information represents that at least one of the communication destination devices is a ROD incompatible device, wherein the compatible information acquiring unit is configured to:

transmit, to each of the at least one communication destination devices, a notification transmission request that is a request for transmission of compatibility notification representing that the communication destination device receiving the request can transmit the activation instruction signal; and acquire, with respect to each of the at least one communication destination devices, compatible information, wherein the compatible information is one of:

compatible information representing that the communication destination device is a ROD compatible device when receiving the compatibility notification from the communication destination device in response to the transmitted notification transmission request, and compatible information representing that the communication destination device is a ROD incompatible device when not receiving the compatibility notification from the communication destination device in response to the transmitted notification transmission request.

2. The wireless communication device according to claim 1, configured to, in a case where the state of the wireless communication device is set to the active state, transmit a beacon signal for notifying that wireless communication with the wireless communication device is allowed, every time a preset transmission period passes.

3. The wireless communication device according to claim 2, wherein the non-ROD mode is configured to set the transmission period to a first transmission period in a case where a predetermined first power-saving condition is not satisfied, whereas set the transmission period to a second transmission period that is longer than the first transmission period in a case where the first power-saving condition is satisfied.

4. The wireless communication device according to claim 1, wherein, in a case where a predetermined second power-saving condition is satisfied, the non-ROD mode is configured to transmit operation stop notification for notifying that the wireless communication device is due to stop operation, and shut off supply of electric power to the wireless communication device.

5. A wireless communication system comprising a plurality of wireless communication devices each configured to be capable of performing wireless communication with at least one communication destination device, wherein:

each of the wireless communication devices is a ROD (Radio on Demand) device or a non-ROD device;

the ROD device is configured to operate in an operation mode, either a ROD mode or a non-ROD mode;

the non-ROD device is configured to operate in the non-ROD mode;

the non-ROD mode is configured to set a state of the wireless communication device to an active state in which the wireless communication device can perform wireless communication compliant with a predetermined first communication scheme with the communication destination device; and the ROD mode is configured to: set the state of the wireless communication device to either the active state or a sleep state in which the wireless communication device can receive an activation instruction signal compliant with a second communication scheme requiring smaller electric power to receive a signal than the first communication scheme and cannot perform wireless communication compliant with the first communication scheme with the communication destination device; in a case where the state of the wireless communication device is the active state and a predetermined sleep condition is satisfied, set the state of the wireless communication device to the sleep state; and in a case where the state of the wireless communication device is the sleep state and the wireless communication device receives the activation instruction signal, set the state of the wireless communication device to the active state, wherein each ROD device comprises a compatible information acquiring unit for acquiring compatible information with respect to each of the at least one communication destination devices, the compatible information representing whether the communication destination device is a ROD compatible device capable of transmitting the activation instruction signal or a ROD incompatible device incapable of transmitting the activation instruction signal and wherein the ROD device is configured to operate in the ROD mode in a case where the acquired compatible information represents that all of the communication destination devices are ROD compatible devices and, on the other hand, operate in the non-ROD mode in a case where the acquired compatible information represents that at least one of the communication destination devices is a ROD incompatible device, wherein the compatible information acquiring unit is configured to:

transmit, to each of the at least one communication destination devices, a notification transmission request that is a request for transmission of compatibility notification representing that the communication destination device receiving the request can transmit the activation instruction signal; and acquire, with respect to each of the at least one communication destination devices, compatible information, wherein the compatible information is one of:

compatible information representing that the communication destination device is a ROD compatible device when receiving the compatibility notification from the communication destination device in response to the transmitted notification transmission request, and compatible information representing that the communication destination device is a ROD incompatible device when not receiving the compatibility notification from the communication destination device in response to the transmitted notification transmission request.

6. A control device configured to be capable of performing communication with each of a plurality of wireless communication devices each configured to be capable of performing wireless communication with at least one communication destination device, wherein:

each of the wireless communication devices is a ROD (Radio on Demand) device or a non-ROD device;

the ROD device is configured to operate in an operation mode, either a ROD mode or a non-ROD mode;

the non-ROD device is configured to operate in the non-ROD mode;

the non-ROD mode is configured to set a state of the wireless communication device to an active state in which the wireless communication device can perform wireless communication compliant with a predetermined first communication scheme with the communication destination device; and the ROD mode is configured to: set the state of the wireless communication device to either the active state or a sleep state in which the wireless communication device can receive an activation instruction signal compliant with a second communication scheme requiring smaller electric power to receive a signal than the first communication scheme and cannot perform wireless communication compliant with the first communication scheme with the communication destination device; in a case where the state of the wireless communication device is the active state and a predetermined sleep condition is satisfied, set the state of the wireless communication device to the sleep state; and in a case where the state of the wireless communication device is the sleep state and the wireless communication device receives the activation instruction signal, set the state of the wireless communication device to the active state, the control device comprising:

an operation mode setting unit for setting the operation mode of each of the ROD devices among the wireless communication devices; and comprises a compatible information acquiring unit for acquiring compatible information with respect to each of the communication destination devices, the compatible information representing whether the communication destination device is a ROD compatible device capable of transmitting the activation instruction signal or a ROD incompatible device incapable of transmitting the activation instruction signal and wherein the ROD device is configured to operate in the ROD mode in a case where the acquired compatible information represents that all of the communication destination devices are ROD compatible devices and, on the other hand, operate in the non-ROD mode in a case where the acquired compatible information represents that at least one of the communication destination devices is a ROD incompatible device, wherein the compatible information acquiring unit is configured to:

transmit, to each of the at least one communication destination devices, a notification transmission request that is a request for transmission of compatibility notification representing that the communication destination device receiving the request can transmit the activation instruction signal; and acquire, with respect to each of the at least one communication destination devices, compatible information, wherein the compatible information is one of:

compatible information representing that the communication destination device is a ROD compatible device when receiving the compatibility notification from the communication destination device in response to the transmitted notification transmission request, and compatible information representing that the communication destination device is a ROD incompatible device when not receiving the compatibility notification from the communication destination device in response to the transmitted notification transmission request.

7. A wireless communication system comprising a plurality of wireless communication devices configured to be capable of performing wireless communication, wherein:

each of the wireless communication devices configures a node in a mesh-type communication network;

each of the wireless communication devices is a ROD (Radio on Demand) device or a non-ROD device;

the ROD device is configured to operate in an operation mode, either a ROD mode or a non-ROD mode;

the non-ROD device is configured to operate in the non-ROD mode;

the non-ROD mode is configured to set a state of the node to an active state in which the node can perform wireless communication compliant with a predetermined first communication scheme with an adjacent node that is adjacent to the node in the communication network; and the ROD mode is configured to: set the state of the node to either the active state or a sleep state in which the node can receive an activation instruction signal compliant with a second communication scheme requiring smaller electric power to receive a signal than the first communication scheme and cannot perform wireless communication compliant with the first communication scheme with the adjacent node; in a case where the state of the node is the active state and a predetermined sleep condition is satisfied, set the state of the node to the sleep state; and in a case where the state of the node is the sleep state and the node receives the activation instruction signal, set the state of the node to the active state wherein each ROD device of the plurality of wireless communication devices is configured to be to be capable of performing wireless communication with at least one communication destination device, wherein the at least one communication destination device is at least one of the plurality of wireless communication devices in the mesh network, and wherein each ROD device comprises a compatible information acquiring unit for acquiring compatible information with respect to each of the communication destination devices, the compatible information representing whether the communication destination device is a ROD compatible device capable of transmitting the activation instruction signal or a ROD incompatible device incapable of transmitting the activation instruction signal and wherein the ROD device is configured to operate in the ROD mode in a case where the acquired compatible information represents that all of the communication destination devices are ROD compatible devices and, on the other hand, operate in the non-ROD mode in a case where the acquired compatible information represents that at least one of the communication destination devices is a ROD incompatible device, wherein the compatible information acquiring unit is configured to:

transmit, to each of the at least one communication destination devices, a notification transmission request that is a request for transmission of compatibility notification representing that the communication destination device receiving the request can transmit the activation instruction signal; and acquire, with respect to each of the at least one communication destination devices, compatible information, wherein the compatible information is one of:
compatible information representing that the communication destination device is a ROD compatible device when receiving the compatibility notification from the communication destination device in response to the transmitted notification transmission request, and
compatible information representing that the communication destination device is a ROD incompatible device when not receiving the compatibility notification from the communication destination device in response to the transmitted notification transmission request.

8. A wireless communication device configuring a node in a mesh-type communication network and configured to be capable of performing wireless communication with at least one adjacent node that is adjacent to the node in the communication network,
the wireless communication device being configured to operate in an operation mode, either a ROD (Radio on Demand) mode or a non-ROD mode, wherein:
the non-ROD mode is configured to set a state of the node to an active state in which the node can perform wireless communication compliant with a predetermined first communication scheme with the adjacent node; and
the ROD mode is configured to: set the state of the node to either the active state or a sleep state in which the node can receive an activation instruction signal compliant with a second communication scheme requiring smaller electric power to receive a signal than the first communication scheme and cannot perform wireless communication compliant with the first communication scheme with the adjacent node; in a case where the state of the node is the active state and a predetermined sleep condition is satisfied, set the state of the node to the sleep state; and in a case where the state of the node is the sleep state and the node receives the activation instruction signal, set the state of the node to the active state
wherein the wireless communication device comprises:
a compatible information acquiring unit for acquiring compatible information with respect to the adjacent node, the compatible information representing whether the adjacent node is a ROD compatible device capable of transmitting the activation instruction signal or a ROD incompatible device incapable of transmitting the activation instruction signal and wherein the ROD device is configured to operate in the ROD mode in a case where the acquired compatible information represents that all of the adjacent nodes are ROD compatible devices and, on the other hand, operate in the non-ROD mode in a case where the acquired compatible information represents that at least one of the adjacent nodes is a ROD incompatible device,
wherein the compatible information acquiring unit is configured to:
transmit, to each of the at least one adjacent nodes, a notification transmission request that is a request for transmission of compatibility notification representing that the adjacent node receiving the request can transmit the activation instruction signal; and
acquire, with respect to each of the at least one adjacent nodes, compatible information, wherein the compatible information is one of:
compatible information representing that the adjacent node is a ROD compatible device when receiving the compatibility notification from the adjacent node in response to the transmitted notification transmission request, and
compatible information representing that the adjacent node is a ROD incompatible device when not receiving the compatibility notification from the adjacent node in response to the transmitted notification transmission request.

9. A wireless base station configured to be capable of performing wireless communication with at least one wireless terminal, the wireless base station comprising an operation state setting unit for setting a state of the wireless base station to an operation state, either an active state or at least one sleep state, wherein:
the active state is a state in which the wireless base station can perform wireless communication compliant with a predetermined first communication scheme with the wireless terminal;
the sleep state is a state in which the wireless base station can receive an activation instruction signal compliant with a second communication scheme requiring smaller electric power to receive a signal than the first communication scheme and cannot perform wireless communication compliant with the first communication scheme with the wireless terminal; and
the operation state setting unit is configured to select one ROD (Radio on Demand) level from among a plurality of ROD levels and set the state of the wireless base station based on the selected ROD level,
wherein the wireless base station comprises a compatible information acquiring unit for acquiring compatible information with respect to each of the wireless terminals, the compatible information representing whether the wireless terminal is a ROD compatible device capable of transmitting the activation instruction signal or a ROD incompatible device incapable of transmitting the activation instruction signal and wherein the ROD device is configured to operate in the ROD mode in a case where the acquired compatible information represents that all of the wireless terminals are ROD compatible devices and, on the other hand, operate in the non-ROD mode in a case where the acquired compatible information represents that at least one of the wireless terminals is a ROD incompatible device,
wherein the compatible information acquiring unit is configured to:
transmit, to each of the at least one wireless terminals, a notification transmission request that is a request for transmission of compatibility notification representing that the wireless terminal receiving the request can transmit the activation instruction signal; and
acquire, with respect to each of the at least one wireless terminals, compatible information, wherein the compatible information is one of:
compatible information representing that the wireless terminal is a ROD compatible device when receiving the compatibility notification from the wireless terminal in response to the transmitted notification transmission request, and compatible information representing that the wireless terminal is a ROD incompatible device when not receiving the compatibility notification from the wireless terminal in response to the transmitted notification transmission request.

10. The wireless base station according to claim 9, wherein:
the operation state setting unit is configured to execute non-ROD control when the selected ROD level indicates a ROD incompatibility value and, on the other hand, execute ROD control when the selected ROD level indicates a value other than the ROD incompatibility value;
the non-ROD control includes setting the state of the wireless base station to the active state; and
the ROD control includes: in a case where the state of the wireless base station is the active state and a predetermined sleep condition is satisfied, setting the state of the wireless base station to the sleep state; and in a case where the state of the wireless base station is the sleep state and the wireless base station receives the activation instruction signal, setting the state of the wireless base station to the active state.

11. The wireless base station according to claim 10, wherein:
the operation state setting unit is configured to set the state of the wireless base station to an operation state, either the active state or one of a plurality of sleep states;
the sleep states are different from each other in power consumption, which is an amount of electric power consumed by the wireless base station; and
the ROD control includes, in a case where the state of the wireless base station is the active state and the sleep condition is satisfied, setting the state of the wireless base station to a sleep state previously associated with the selected ROD level.

12. The wireless base station according to claim 11, comprising a plurality of modules operating when electric power is supplied, the wireless base station being configured to be capable of stopping supply of electric power to each of the modules,
wherein each of the sleep states is a state in which supply of electric power to a module previously associated with the sleep state is stopped.

13. The wireless base station according to claim 11, wherein the operation state setting unit is configured to, in changing the state of the wireless base station from the active state to a sleep state previously associated with the selected ROD level, change the state of the wireless base station so that the power consumption gradually decreases.

14. The wireless base station according to claim 11, wherein the operation state setting unit is configured to, in changing the state of the wireless base station from the sleep state to the active state, change the state of the wireless base station so that the power consumption gradually increases.

15. The wireless base station according to claim 10, wherein:
the operation state setting unit is configured to, when wireless communication between the wireless terminal and the wireless base station ends, estimate an idle time from a moment that the wireless communication ends to start of next wireless communication; and
the sleep condition is a condition that the estimated idle time is longer than a preset first threshold.

16. The wireless base station according to claim 10, wherein:

the operation state setting unit is configured to, when wireless communication between the wireless terminal and the wireless base station ends, estimate a next communication time from start of next communication that is next wireless communication to end of the next communication; and
the operation state setting unit is configured to, in a case where the estimated next communication time is shorter than a preset second threshold, keep the state of the wireless base station to the sleep state when the wireless base station receives the activation instruction signal transmitted by the wireless terminal to start the next communication.

17. A wireless base station control method applied to a wireless base station configured to be capable of performing wireless communication with at least one wireless terminal, the wireless base station control method comprising:
setting a state of the wireless base station to an operation state, either an active state or at least one sleep state, wherein:
the active state is a state in which the wireless base station can perform wireless communication compliant with a predetermined first communication scheme with the wireless terminal; and
the sleep state is a state in which the wireless base station can receive an activation instruction signal compliant with a second communication scheme requiring smaller electric power to receive a signal than the first communication scheme and cannot perform wireless communication compliant with the first communication scheme with the wireless terminal;
transmitting, to each of the at least one wireless terminals, a notification transmission request that is a request for transmission of compatibility notification representing that the wireless terminal receiving the request can transmit the activation instruction signal;
acquiring compatible information with respect to each of the at least one wireless terminals, the compatible information representing whether the wireless terminal is a Radio On Demand (ROD) compatible device capable of transmitting the activation instruction signal or a ROD incompatible device incapable of transmitting the activation instruction signal, wherein the compatible information is one of:
compatible information representing that the wireless terminal is a ROD compatible device when receiving the compatibility notification from the wireless terminal in response to the transmitted notification transmission request, and
compatible information representing that the wireless terminal is a ROD incompatible device when not receiving the compatibility notification from the wireless terminal in response to the transmitted notification transmission request;
selecting one ROD level from among a plurality of ROD levels, wherein the ROD level is selected in a case where the acquired compatible information represents that all of the wireless terminals are ROD compatible devices; and
setting the state of the wireless base station based on the selected ROD level.

18. A non-transitory computer-readable medium storing a wireless base station control program executed by a wireless base station configured to be capable of performing wireless communication with at least one wireless terminal, the wireless base station control program comprising instructions for causing the wireless base station to perform operations including:
  setting a state of the wireless base station to an operation state, either an active state or at least one sleep state, wherein:
    the active state is a state in which the wireless base station can perform wireless communication compliant with a predetermined first communication scheme with the wireless terminal; and
    the sleep state is a state in which the wireless base station can receive an activation instruction signal compliant with a second communication scheme requiring smaller electric power to receive a signal than the first communication scheme and cannot perform wireless communication compliant with the first communication scheme with the wireless terminal;
  transmitting, to each of the wireless terminals, a notification transmission request that is a request for transmission of compatibility notification representing that the wireless terminal can transmit the activation instruction signal;
  acquiring compatible information with respect to each of the at least one wireless terminals, the compatible information representing whether the wireless terminal is a Radio On Demand (ROD) compatible device capable of transmitting the activation instruction signal or a ROD incompatible device incapable of transmitting the activation instruction signal, wherein the compatible information is one of:
    compatible information representing that the wireless terminal is a ROD compatible device when receiving the compatibility notification from the wireless terminal in response to the transmitted notification transmission request, and
    compatible information representing that the wireless terminal is a ROD incompatible device when not receiving the compatibility notification from the wireless terminal in response to the transmitted notification transmission request;
  selecting one ROD level from among a plurality of ROD levels; and
  setting the state of the wireless base station based on the selected ROD level.

* * * * *